(12) United States Patent
Chen et al.

(10) Patent No.: US 10,634,873 B2
(45) Date of Patent: Apr. 28, 2020

(54) ELECTRONIC DEVICE

(71) Applicant: LARGAN PRECISION CO., LTD., Taichung (TW)

(72) Inventors: Hung-Shuo Chen, Taichung (TW); Chien-Hsun Wu, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 209 days.

(21) Appl. No.: 15/869,314

(22) Filed: Jan. 12, 2018

(65) Prior Publication Data

US 2019/0101724 A1  Apr. 4, 2019

Related U.S. Application Data

(60) Provisional application No. 62/565,173, filed on Sep. 29, 2017.

(51) Int. Cl.
| | |
|---|---|
| *G02B 9/34* | (2006.01) |
| *G02B 13/14* | (2006.01) |
| *H04N 5/33* | (2006.01) |
| *G01B 11/24* | (2006.01) |
| *H04N 13/225* | (2018.01) |
| *H04N 13/254* | (2018.01) |
| *G02B 13/00* | (2006.01) |

(52) U.S. Cl.
CPC ............... *G02B 9/34* (2013.01); *G01B 11/24* (2013.01); *G02B 13/004* (2013.01); *G02B 13/14* (2013.01); *H04N 5/33* (2013.01); *H04N 13/225* (2018.05); *H04N 13/254* (2018.05)

(58) Field of Classification Search
CPC .............. G02B 13/001; G02B 13/0015; G02B 13/002; G02B 13/004
See application file for complete search history.

(56) References Cited

U.S. PATENT DOCUMENTS

| | | |
|---|---|---|
| 5,986,816 A | 11/1999 | Shikama |
| 6,950,246 B2 | 9/2005 | Amanai |
| 8,179,616 B1 | 5/2012 | Hsu et al. |
| 8,730,590 B1 | 5/2014 | Tsai et al. |
| 9,507,124 B2 | 11/2016 | Huang et al. |

(Continued)

FOREIGN PATENT DOCUMENTS

| | | |
|---|---|---|
| CN | 201903687 U | 7/2011 |
| CN | 106959500 A | 7/2017 |

(Continued)

*Primary Examiner* — Robert E. Tallman
(74) *Attorney, Agent, or Firm* — McClure, Qualey & Rodack, LLP

(57) ABSTRACT

An electronic device includes at least one optical lens assembly. The optical lens assembly includes four lens elements, and the four lens elements are, in order from an outside to an inside, a first lens element, a second lens element, a third lens element and a fourth lens element. The first lens element has an outside surface being convex in a paraxial region thereof. The second lens element has an inside surface being convex in a paraxial region thereof. The fourth lens element has an inside surface being concave in a paraxial region thereof, wherein at least one of an outside surface and the inside surface of the fourth lens element includes at least one critical point in an off-axis region thereof.

26 Claims, 30 Drawing Sheets

(56) References Cited

U.S. PATENT DOCUMENTS

| | | | |
|---|---|---|---|
| 9,618,727 B2 | 4/2017 | Jang et al. | |
| 2013/0279024 A1 | 10/2013 | Kubota et al. | |
| 2014/0036133 A1 | 2/2014 | Sekine et al. | |
| 2014/0146400 A1 | 5/2014 | Ko | |
| 2014/0184880 A1 | 7/2014 | Ahn et al. | |
| 2015/0286032 A1 | 10/2015 | Hsueh et al. | |
| 2017/0176716 A1 | 6/2017 | Lai et al. | |
| 2017/0176717 A1 | 6/2017 | Lai et al. | |
| 2019/0011669 A1* | 1/2019 | Tsai | G02B 13/008 |

FOREIGN PATENT DOCUMENTS

| | | |
|---|---|---|
| CN | 109212716 A | 1/2019 |
| JP | 2005208236 A | 8/2005 |
| JP | 2009008956 A | 1/2009 |
| JP | 2009104082 A | 5/2009 |
| JP | 2009210923 A | 9/2009 |
| TW | I634361 B | 9/2018 |

\* cited by examiner

ELECTRONIC DEVICE

RELATED APPLICATIONS

This application claims priority to U.S. Provisional Application Ser. No. 62/565,173, filed Sep. 29, 2017, which is herein incorporated by reference.

BACKGROUND

Technical Field

The present disclosure relates to an electronic device. More particularly, the present disclosure relates to an electronic device with at least one optical lens assembly.

Description of Related Art

With rapid developments of technologies, the application of photographing modules is becoming wider and wider, and the application technologies of three-dimensional space observation are also increasingly mature. Conventional three-dimensional space identification technologies are mostly limited to two-dimensional images, and can achieve three-dimensional spatial analysis functions with algorithms, however, when information of three-dimensional space of information is simplified into the two-dimensional space image, it will always result in information gaps, and limit restore results of calculation.

Thus, a three-dimensional image capture technology is developed, which projects light with particular characteristics (such as specific wavelengths and patterns, etc.) onto an object, the light is reflected by the object, and then received by a lens assembly and be calculated so as to obtain the distance between each position of the object and the lens assembly, and determine information of the three-dimensional image. The technology is widely applied to electronic device, such as somatosensory games, virtual reality, augmented reality, three-dimensional image capturing, dynamic capturing, face recognitions, driving assisting systems, various kinds of smart electronic products, multi-lens devices, wearable devices, surveillance equipments, digital cameras, identification systems, entertainment devices, sports devices and intelligent home assisting systems, presently.

Nowadays, three-dimensional image capturing technologies mostly adopts infrared in a specific wavelength band to reduce interference so as to achieve more accurate measurements. However, with applications, such as face recognition and augmented reality, being used in portable devices, such as smart phones are gradually developed, the sensing module thereof needs to be more precise and compact, but conventional technologies are still difficult to achieve the balance between the two.

SUMMARY

According to one aspect of the present disclosure, an electronic device includes at least one optical lens assembly. The optical lens assembly includes four lens elements, and the four lens elements are, in order from an outside to an inside, a first lens element, a second lens element, a third lens element and a fourth lens element. The first lens element has an outside surface being convex in a paraxial region thereof. The second lens element has an inside surface being convex in a paraxial region thereof. The fourth lens element has an inside surface being concave in a paraxial region thereof, wherein at least one of an outside surface and the inside surface of the fourth lens element includes at least one critical point in an off-axis region thereof. When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, a focal length of the optical lens assembly is fd, a focal length of the third lens element is fd3, and a focal length of the fourth lens element is fd4, the following conditions are satisfied:

$0.65 < Vd1/Vd2 < 1.54;$ $0.65 < Vd1/Vd3 < 1.54;$ $0.65 < Vd1/Vd4 < 1.54;$ $10.0 < Vd1 < 38.0;$ and $0.69 < |fd/fd3| + |fd/fd4|.$ According to one aspect of the present disclosure, an electronic device includes at least one optical lens assembly. The optical lens assembly includes four lens elements, and the four lens elements are, in order from an outside to an inside, a first lens element, a second lens element, a third lens element and a fourth lens element. The second lens element has an outside surface being concave in a paraxial region thereof and an inside surface being convex in a paraxial region thereof. The third lens element has an outside surface being concave in a paraxial region thereof. The fourth lens element has an outside surface being convex in a paraxial region thereof and an inside surface being concave in a paraxial region thereof, wherein the outside surface of the fourth lens element includes at least one critical point in an off-axis region thereof. At least one of the third lens element and the fourth lens element has positive refractive power, and the other one has negative refractive power. When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, a focal length of the optical lens assembly is fd, a focal length of the third lens element is fd3, and a focal length of the fourth lens element is fd4, the following conditions are satisfied:

$0.65 < Vd1/Vd2 < 1.54;$ $0.65 < Vd1/Vd3 < 1.54;$ $0.65 < Vd1/Vd4 < 1.54;$ and $0.69 < |fd/fd3| + |fd/fd4| < 2.65.$ According to one aspect of the present disclosure, an electronic device is includes a sensing module, which includes a projection apparatus and a receiving apparatus. The projection apparatus includes an optical lens assembly and at least one light source, wherein the optical lens assembly includes four to six lens elements, and the light source is disposed on an inside conjugation surface of the optical lens assembly. The receiving apparatus includes an optical lens assembly and an image sensor, wherein the optical lens assembly includes four to six lens elements, and the image sensor is disposed on an inside conjugation surface of the optical lens assembly. The light source of the projection apparatus is projected on a sensed object and is received by the receiving apparatus after a reflection, and is imaged on the image sensor. When a measurement is made in accordance with a reference wavelength as a d-line, at least six lens elements of the lens elements of the optical lens assembly of the projection apparatus and the lens elements of the optical lens assembly of the receiving apparatus have Abbe numbers smaller than 38. In the optical lens assembly of each of the projection apparatus and the receiving apparatus, an axial distance between an outside surface of one of the lens elements closest to the outside and an inside surface of one of the lens elements closest to the inside is TD, and the following condition is satisfied:

1 mm<TD<5 mm.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
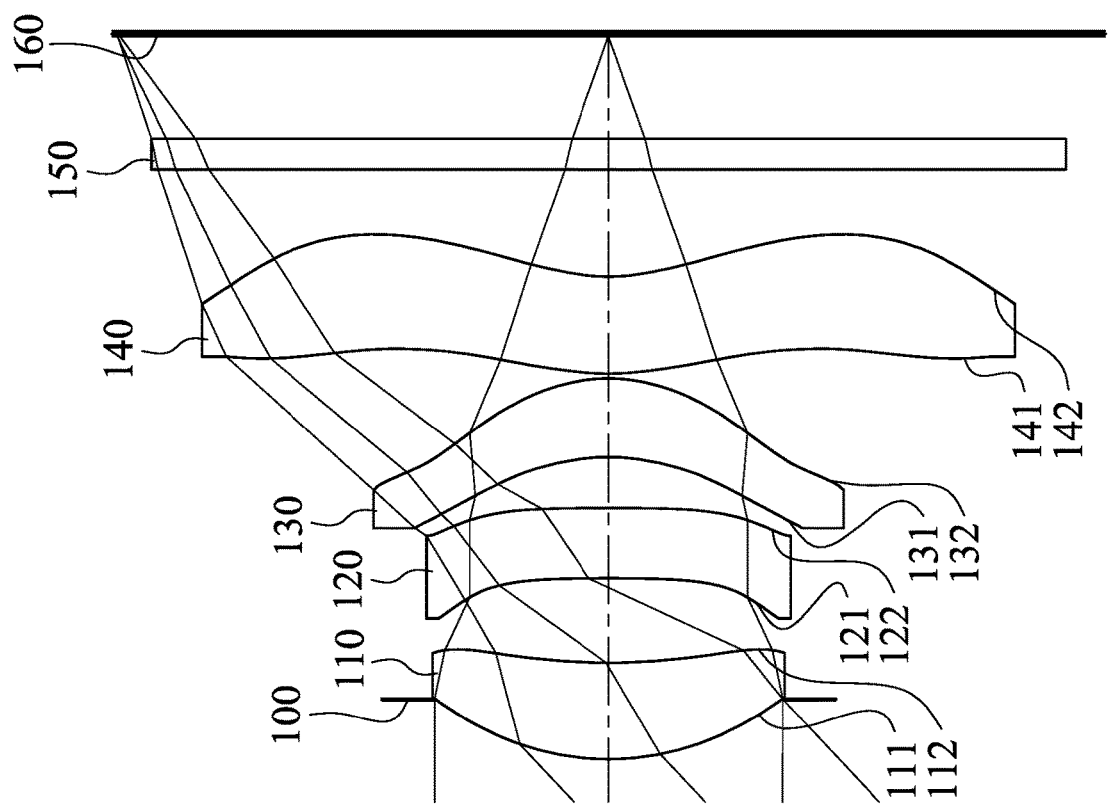
FIG. 1 is a schematic view of an electronic device according to the 1st embodiment of the present disclosure.

An electronic device includes at least one optical lens assembly, which can be applied to an infrared band, especially for the application of infrared projection and reception. Thus, it is favorable for adapting to three-dimensional image capturing technologies by obtaining high precision of projection ability and high image quality and also maintaining compactness.

The optical lens assembly can include four to six lens elements, so that it is favorable for obtaining higher precision of projection ability and higher image quality, and also maintaining compactness of the optical lens assembly. Preferably, the optical lens assembly can include four lens elements, which are, in order from an outside to an inside, a first lens element, a second lens element, a third lens element, and a fourth lens element.

The first lens element can have an outside surface being convex in a paraxial region thereof, so that it is favorable for reducing the incident angle of the light from wide field of view so as to be applicable to the design of wide field of view in the optical lens assembly. The first lens element can have positive refractive power, so that the demand of compact size can be obtained by reducing the total track length of the optical lens assembly. The first lens element can have an inside surface being concave in a paraxial region thereof, so that the generation of astigmatism can be reduced.

The second lens element can have an outside surface being concave in a paraxial region thereof, so that it is favorable for increasing field of view by arranging sufficient space between the first lens element and the second lens element. The second lens element can have an inside surface being convex in a paraxial region thereof, so that it is favorable for correcting off-axis aberrations by adjusting the path of exiting light. The second lens element can have positive refractive power, so that it is favorable for reducing spherical aberrations by balancing the distribution of positive refractive power of the optical lens assembly.

The third lens element can have an outside surface being concave in a paraxial region thereof, so that off-axis aberrations can be reduced. The third lens element can have positive refractive power, so that the positive refractive power of the optical lens assembly can be diverged, which can be favorable for avoiding excessive spherical aberrations generated by the optical lens assembly during the total track length is reduced, and also favorable for reducing the sensitivity. The third lens element can have an inside surface being convex in a paraxial region thereof, so that it is favorable for lessening the stray light by reducing the surface reflection of light.

The fourth lens element can have an outside surface being convex in a paraxial region thereof, so that it is favorable for enhancing the image quality in a peripheral region by correcting field curvature in the off-axis region thereof. The fourth lens element can have an inside surface being concave in a paraxial region thereof, so that the back focal length and the total track length can be reduced. Furthermore, at least one of the outside surface and the inside surface of the fourth lens element can include at least critical point in an off-axis region thereof, so that it is favorable for correcting off-axis aberrations, and also favorable for reducing the surface reflection by adjusting the incident angle and exiting angle of light in a peripheral region. The outside surface of the fourth lens element can include at least one critical point in the off-axis region thereof which can further correct off-axis aberrations. The inside surface of the fourth lens element can include at least one critical point in the off-axis region thereof so as to further reduce the surface reflection of light in a peripheral region.

Furthermore, one of the third lens element and the fourth lens element can have positive refractive power, the other one thereof can have negative refractive power. Therefore, it is favorable for reducing the generation of aberrations by complementary effect of the third lens element and the fourth lens element.

One of the outside surface and the inside surface of each of the first lens element, the second lens element, the third lens element and the fourth lens element can be concave in a paraxial region thereof, and the other one thereof can be convex in a paraxial region thereof. Therefore, it is favorable for obtaining compactness and increasing the optical effective region of an inside conjugation surface.

When a measurement is made in accordance with a reference wavelength as a d-line, an Abbe number of the first lens element is Vd1, an Abbe number of the second lens element is Vd2, an Abbe number of the third lens element is Vd3, and an Abbe number of the fourth lens element is Vd4, the following conditions are satisfied: $0.65<Vd1/Vd2<1.54$; $0.65<Vd1/Vd3<1.54$; and $0.65<Vd1/Vd4<1.54$. Therefore, it is favorable for correcting aberrations by matching the materials of the lens elements. Especially, correction of chromatic aberrations is not that important when the optical lens assembly is applied to the infrared band, so that the complexity thereof can be reduced, and it is favorable for correcting other kind of aberrations and reducing the size thereof so as to obtain compact optical lens assembly with high image quality. Preferably, the following conditions can be satisfied: $0.70<Vd1/Vd2<1.44$; $0.70<Vd1/Vd3<1.44$; and $0.70<Vd1/Vd4<1.44$. More preferably, the following conditions can be satisfied: $0.75<Vd1/Vd2<1.35$; $0.75<Vd1/Vd3<1.35$; and $0.75<Vd1/Vd4<1.35$. In detail, the Abbe numbers are calculated by $Vd=(Nd-1)/(NF-NC)$, wherein Nd is the refractive index measured with a wavelength as helium d-line (587.6 nm), NF is the refractive index measured with a wavelength as hydrogen F-line (486.1 nm), and NC is the refractive index measured with a wavelength as hydrogen C-line (656.3 nm).

When the measurement is made in accordance with the reference wavelength as the d-line, the Abbe number of the first lens element is Vd1, the following condition is satisfied: $10.0<Vd1<38.0$. Therefore, chromatic aberrations of the optical lens assembly can be reduced, and it is favorable for correcting aberrations and obtaining compactness by utilizing the material with low Abbe number which has more excellent ability of light refraction. Preferably, the following condition can be satisfied: $12.0<Vd1<34.0$. More preferably, the following condition can be satisfied: $14.0<Vd1<30.0$.

When the measurement is made in accordance with the reference wavelength as the d-line, a focal length of the optical lens assembly is fd, a focal length of the third lens element is fd3, and a focal length of the fourth lens element is fd4, the following condition is satisfied: $0.69<|fd/fd3|+|fd/fd4|$. Therefore, it is favorable for correcting off-axis aberrations and reducing the total track length of the optical lens assembly by matching the refractive power of the third lens element and the fourth lens element. Preferably, the following condition can be satisfied: $0.69<|fd/fd3|+|fd/fd4|<5.0$. Thus, it is favorable for avoiding excessive spherical aberrations and reducing the size by avoiding excessive refractive power of the lens elements. More preferably, the following condition can be satisfied: $0.69<|fd/fd3|+|fd/fd4|<2.65$.

When the measurement is made in accordance with the reference wavelength as the d-line, a refractive index of the first lens element is Nd1, the following condition is satisfied: $1.650 \leq Nd1<1.750$. Therefore, it is favorable for correcting aberrations by arranging the material with high refractive index so as to reduce the size of the optical lens assembly, especially for the infrared, which is hard to be refracted.

When the measurement is made in accordance with the reference wavelength as the d-line, a sum of the Abbe numbers of the first lens element, the second lens element, the third lens element and the fourth lens element is $\Sigma Vd$, the following condition is satisfied: $40.0<\Sigma Vd<155.0$. Therefore, it is favorable for reducing the size and correcting aberrations by adjusting the arrangement of materials of the lens elements, especially the application in the infrared band which provides more obvious effect. Preferably, the following condition can be satisfied: $45.0<\Sigma Vd<125.0$. More preferably, the following condition can be satisfied: $50.0<\Sigma Vd<100.0$.

When a central thickness of the second lens element is CT2, and a central thickness of the fourth lens element is CT4, the following condition is satisfied: $0<CT2/CT4<1.04$. Therefore, it is favorable for reducing coma aberrations by obtaining proper thicknesses of the second lens element and the fourth lens element.

When a curvature radius of the outside surface of the first lens element is R1, and a curvature radius of the inside surface of the first lens element is R2, the following condition is satisfied: $0.32<R1/R2<1.64$. Therefore, it is favorable for reducing astigmatism by arranging proper surface shape of the first lens element.

When the curvature radius of the inside surface of the first lens element is R2, and a curvature radius of the outside surface of the fourth lens element is R7, the following condition is satisfied: $0.25<R2/R7<4.8$. Therefore, it is favorable for correcting off-axis field curvature by arranging proper surface shapes of the first lens element and the fourth lens element.

When the measurement is made in accordance with the reference wavelength as the d-line, the focal length of the optical lens assembly is fd, the focal length of the third lens element is fd3, the focal length of the fourth lens element is fd4, and a maximum of two values of |fd/fd3| and |fd/fd4| is max(|fd/fd3|, |fd/fd4|), and the following condition is satisfied: 0.43<max(|fd/fd3|, |fd/fd4|)<2.7. Therefore, it is favorable for correcting distortion by matching the refractive power of the third lens element and the fourth lens element, and avoiding too weak or excessive refractive power at the same time. Preferably, the following condition can be satisfied: 0.53<max(|fd/fd3|, |fd/fd4|)<1.8. When the measurement is made in accordance with the reference wavelength as the d-line, a focal length of the first lens element is fd1, a focal length of the second lens element is fd2, the focal length of the third lens element is fd3, and the focal length of the fourth lens element is fd4, the following condition is satisfied: 0.38<(|1/fd1|+|1/fd2|)/(|1/fd3|+|1/fd4|)<1.5. Therefore, it is favorable for correcting spherical aberration and distortion by properly adjusting the distribution of the refractive power on the inside and the outside of the optical lens assembly.

When an f-number of the optical lens assembly is Fno, the following condition is satisfied: 1.0<Fno<2.3. Therefore, when the optical lens assembly is applied to a projection apparatus, the illumination of an outside conjugation surface thereof can be enhanced; when the optical lens assembly is applied to an image capturing apparatus or a receiving apparatus, the illumination on a peripheral region of the inside conjugation surface thereof can be enhanced.

When half of a maximum field of view of the optical lens assembly is HFOV, the following condition is satisfied: 5 degrees<HFOV<50 degrees. Therefore, it is favorable for avoiding excessive field of view which would cause too much aberrations, such as distortions. Preferably, the following condition can be satisfied: 30 degrees<HFOV<50 degrees. Thus, it is favorable for avoiding too small field of view which would reduce the application range.

When an axial distance between an outside surface of one of the lens elements closest to the outside and an inside surface of one of the lens elements closest to the inside is TD, the following condition is satisfied: 1 mm<TD<5 mm. Therefore, it is favorable for wider application by maintaining the compact size of the optical lens assembly.

When an axial distance between the outside surface of the first lens element and the inside conjugation surface of the optical lens assembly is TL, and a maximum radius of the optical effective region of the inside conjugation surface of the optical lens assembly is IH, the following condition is satisfied: 1.0<TL/IH<4.0. Therefore, it is favorable for obtaining the balance between the enlargement of the optical effective region of the inside conjugation surface and shortening of the total track length.

When the curvature radius of the inside surface of the first lens element is R2, and when the measurement is made in accordance with the reference wavelength as the d-line, the focal length of the optical lens assembly is fd, the following condition is satisfied: 0<R2/fd<2.0. Therefore, it is favorable for obtaining the balance between the field of view and the total track length by adjusting the surface shape of the first lens element and the focal length of the optical lens assembly.

When a central thickness of the first lens element is CT1, and an axial distance between the first lens element and the second lens element is T12, the following condition is satisfied: 0.80<CT1/T12<3.5. Therefore, it is favorable for adapting to design of wide field of view by matching the first lens element and the second lens element.

When the measurement is made in accordance with the reference wavelength as the d-line, the focal length of the optical lens assembly is fd, and the focal length of the third lens element is fd3, the following condition is satisfied: −2.5<fd/fd3<1.1. Therefore, the refractive power of the third lens element would not be too strong so as to avoid excessive spherical aberrations during reducing the total track length. Preferably, the following condition can be satisfied: 0<fd/fd3<1.1. Thus, it is favorable for decreasing the incident angle or the exiting angle of light on the inside conjugation surface by adjusting the light path through the positive refractive power of the third lens element.

The optical lens assembly can further include an aperture stop disposed on an outside of the second lens element. Therefore, it is favorable for obtaining the compactness of the optical lens assembly, and decreasing the incident angle or exiting angle of light on the inside conjugation surface. When an axial distance between the aperture stop and the inside conjugation surface of the optical lens assembly is SL, and an axial distance between the outside surface of the first lens element and the inside conjugation surface of the optical lens assembly is IL, the following condition is satisfied: 0.70<SL/TL<1.1. Therefore, it is favorable for balancing the field of view and size of the optical lens assembly.

The optical lens assembly can be applied to the infrared band within a wavelength ranged from 780 nm to 1500 nm so as to decrease the interference from the visible light. Furthermore, the bandwidth of the infrared band can be smaller than 40 nm, so that the sensing precision can be enhanced.

When a curvature radius of the inside surface of the fourth lens element is R8, and when the measurement is made in accordance with the reference wavelength as the d-line, the focal length of the optical lens assembly is fd, the following condition is satisfied: 0<R8/fd<1.75. Therefore, it is favorable for reducing the back focal length by adjusting the surface shape of the fourth lens element and the focal length of the optical lens assembly.

The electronic device can include a projection apparatus, which can include the optical lens assembly and at least one light source, wherein the light source can be disposed on the inside conjugation surface of the optical lens assembly. The optical lens assembly of the projection apparatus can project the light from the light source onto the outside conjugation surface. The light from the light source can be within the infrared band (780 nm-1500 nm), the bandwidth of the infrared band can be smaller than 40 nm, and the optical lens assembly of the projection apparatus can be applied to an infrared band. The projection apparatus can include a diffraction element, a focus tunable component or a reflective element (like prism or mirror), wherein it is favorable for projecting the light onto the projection surface evenly by the arrangement of the diffraction element, it is favorable for perfecting the light converging ability by the arrangement of the focus tunable component, and it is favorable for increasing the flexibility of space configuration by the arrangement of the reflective element.

The electronic device can include a receiving apparatus, which can include the optical lens assembly and an image sensor, wherein the image sensor is disposed on the inside conjugation surface of the optical lens assembly. Preferably, the optical lens assembly of the receiving apparatus can be applied to an infrared band, wherein the image sensor can be utilized for detecting the light within the infrared band. The receiving apparatus can further include other element with filter function, such as a protecting plate (like glass, metal or plastic material), a filter, etc., or the optical lens assembly can include an element with filter function, such as a filter, a lens element with filter function, etc.

The electronic device can include an image capturing apparatus, which can include the optical lens assembly and an image sensor, wherein the image sensor is disposed on the inside conjugation surface of the optical lens assembly. Preferably, the optical lens assembly of the image capturing apparatus can be applied to an infrared band, wherein the image sensor can be utilized for detecting the light within the infrared band. The image capturing apparatus can further include other element with filter function, such as a protecting plate (like glass, metal or plastic material), a filter, etc., or the optical lens assembly can include an element with filter function, such as a filter, a lens element with filter function, etc.

The electronic device can include sensing module, which can include the aforementioned projection apparatus or the aforementioned receiving apparatus, or can include both of the aforementioned projection apparatus and the aforementioned receiving apparatus. The optical lens assembly of the projection apparatus can project the light of the light source onto the outside conjugation surface. The optical lens assembly of the receiving apparatus can be utilized for receiving the information on the outside conjugation surface of the optical lens assembly of the projection apparatus, and then imaging on the image sensor thereof.

When the measurement is made in accordance with the reference wavelength as the d-line, at least six lens elements of the lens elements of the optical lens assembly of the projection apparatus and the lens elements of the optical lens assembly of the receiving apparatus can have Abbe numbers smaller than 38. Therefore, it is favorable for enhancing the sensing precision and module compactness, especially applying to the infrared band, which can provide better effect. Preferably, at least seven lens elements of the lens elements can have Abbe numbers smaller than 38. More preferably, at least eight lens elements of the lens elements can have Abbe numbers smaller than 38.

In the optical lens assembly of each of the projection apparatus and the receiving apparatus, when an axial distance between an outside surface of one of the lens elements closest to the outside and an inside surface of one of the lens elements closest to the inside is TD, the following condition is satisfied: 1 mm<TD<5 mm. Therefore, it is favorable for obtaining the compactness of the sensing module so as to apply to portable devices.

A total number of the lens elements in the optical lens assembly of the projection apparatus can be four, so that it is favorable for balancing the projection quality and compactness. A total number of the lens elements in the optical lens assembly of the receiving apparatus can be four, so that it is favorable for balancing the imaging quality and compactness.

At least six of the lens elements of the optical lens assembly of the projection apparatus and the lens elements of the optical lens assembly of the receiving apparatus can be made of plastic materials. Therefore, finishing and manufacturing difficulty can be decreased.

In each of the aforementioned optical lens assemblies, at least one of the outside surface and the inside surface of one of the lens elements closest to an inside of each optical lens assembly can include at least one critical point. Therefore, it is favorable for correcting off-axis aberrations and reducing the size thereof.

The aforementioned light source can be composed by a laser array, which can be formed into a structured light through the optical lens assembly of the projection lens system, and projected on a sensed object. The optical lens assembly of the receiving apparatus can receive the reflective light from the sensed object, imaging on the image sensor, and the received information can be calculated by the processor so as to obtain the relative distance of each portion of the sensed object, further obtain the 3D-shaped variation on the surface of the sensed object. The structured light can utilize the structure, such as dot, spot or stripe, etc., but is not limited thereto. The three-dimensional sensing method can utilize time-of-flight (TOF), structured light or light coding, etc., but is not limited thereto.

Furthermore, the aforementioned projection apparatus can include a high directivity (low divergence) and a high intensity light source, wherein the light source can be a laser, SLED, Micro-LED, RCLED, a vertical cavity surface emitting laser (VCSEL), etc., and the light source can be a single light source or multiple light sources disposed on the inside conjugation surface of the optical lens assembly, so as to provide high projection quality. When the light source of the projection apparatus according to the present disclosure is a vertical cavity surface emitting laser and disposed on the inside conjugation surface of the optical lens assembly, it is favorable for providing a high directivity, a low divergence and a high intensity light source by proper light arrangement, so as to increase the illuminance of the outside conjugation surface of the optical lens assembly.

According to the electronic device of the present disclosure, the outside refers to outside of mechanism, the inside refers to inside of mechanism. Taking the image capturing apparatus as an example, the inside direction refers to an image-side direction, the inside surface refers to an image-side surface, the outside direction refers to an object-side direction, the outside surface refers to an object-side surface. Taking the projection apparatus as an example, the inside direction is a light source direction, that is, a reduction side, the inside surface is a light incident surface, the outside direction is a projection direction, that is, a magnification side, the outside surface is a light exiting surface. The inside conjugation surface is located on the focus surface inside of the mechanism, that is, the image surface of the image capturing apparatus, and the conjugation surface of the reduction side of the projection apparatus. IH represents the maximum radius of the optical effective region of the inside conjugation surface in the optical lens assembly, that is, the maximum image height of the image capturing apparatus, and the maximum radius of the light source of the projection apparatus.

According to the present disclosure, the electronic device can further include but not limited to a control unit, a display, a storage unit, a random access memory unit (RAM) or a combination thereof.

In the electronic device of the present disclosure, the optical lens assembly can be applied to the visible light band, or the infrared band. Preferably, the optical lens assembly can be applied to both of the visible light band and the infrared band.

According to the optical lens assembly of the present disclosure, the lens elements thereof can be made of glass or plastic materials. When the lens elements are made of glass materials, the distribution of the refractive power of the optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical lens assembly. Therefore, the total track length of the optical lens assembly can also be reduced.

According to the optical lens assembly of the present disclosure, when a lens surface is aspheric, which refers that the lens surface has an aspheric shape throughout its optically effective area, or a portion(s) thereof.

According to the optical lens assembly of the present disclosure, each of an outside surface and an inside surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the optical lens assembly of the present disclosure, the refractive power or the focal length of a lens element being positive or negative may refer to the refractive power or the focal length in a paraxial region of the lens element.

According to the optical lens assembly of the present disclosure, the optical lens assembly can include at least one stop, such as an aperture stop, a glare stop or a field stop. Said glare stop or said field stop is for eliminating the stray light and thereby improving the image resolution thereof.

According to the optical lens assembly of the present disclosure, the inside conjugation surface of the optical lens assembly, based on the corresponding image sensor or light source, can be flat or curved. In particular, the inside conjugation surface can be a concave curved surface facing towards the outside. According to the optical lens assembly of the present disclosure, at least one correcting element (such as a field flattener) can be selectively disposed between the lens element closest to the inside of the optical lens assembly and the inside conjugation surface so as to correct the image (such as the field curvature). Properties of the correcting element, such as curvature, thickness, refractive index, position, surface shape (convex/concave, spherical/aspheric/diffractive/Fresnel etc.) can be adjusted according to the requirements of the apparatus. In general, the correcting element is preferably a thin planoconcave element having a concave surface toward the outside and is disposed close to the inside conjugation surface.

According to the optical lens assembly of the present disclosure, an aperture stop can be configured as a front stop or a middle stop. A front stop disposed between an outside conjugation surface and the first lens element can provide a longer distance between an exit pupil of the optical lens assembly and the inside conjugation surface, and thereby obtains a telecentric effect and improves the image-sensing efficiency of the image sensor, such as CCD or CMOS, or improves the projective efficiency. A middle stop disposed between the first lens element and the inside conjugation surface is favorable for enlarging the field of view of the optical lens assembly and thereby provides a wider field of view for the same.

According to the optical lens assembly of the present disclosure, a critical point is a non-axial point of the lens surface where its tangent is perpendicular to the optical axis.

Each of the aforementioned features of the optical lens assembly can be utilized in various combinations for achieving the corresponding effects.

According to the above description of the present disclosure, the following specific embodiments are provided for further explanation.

1st Embodiment

Figure 2:
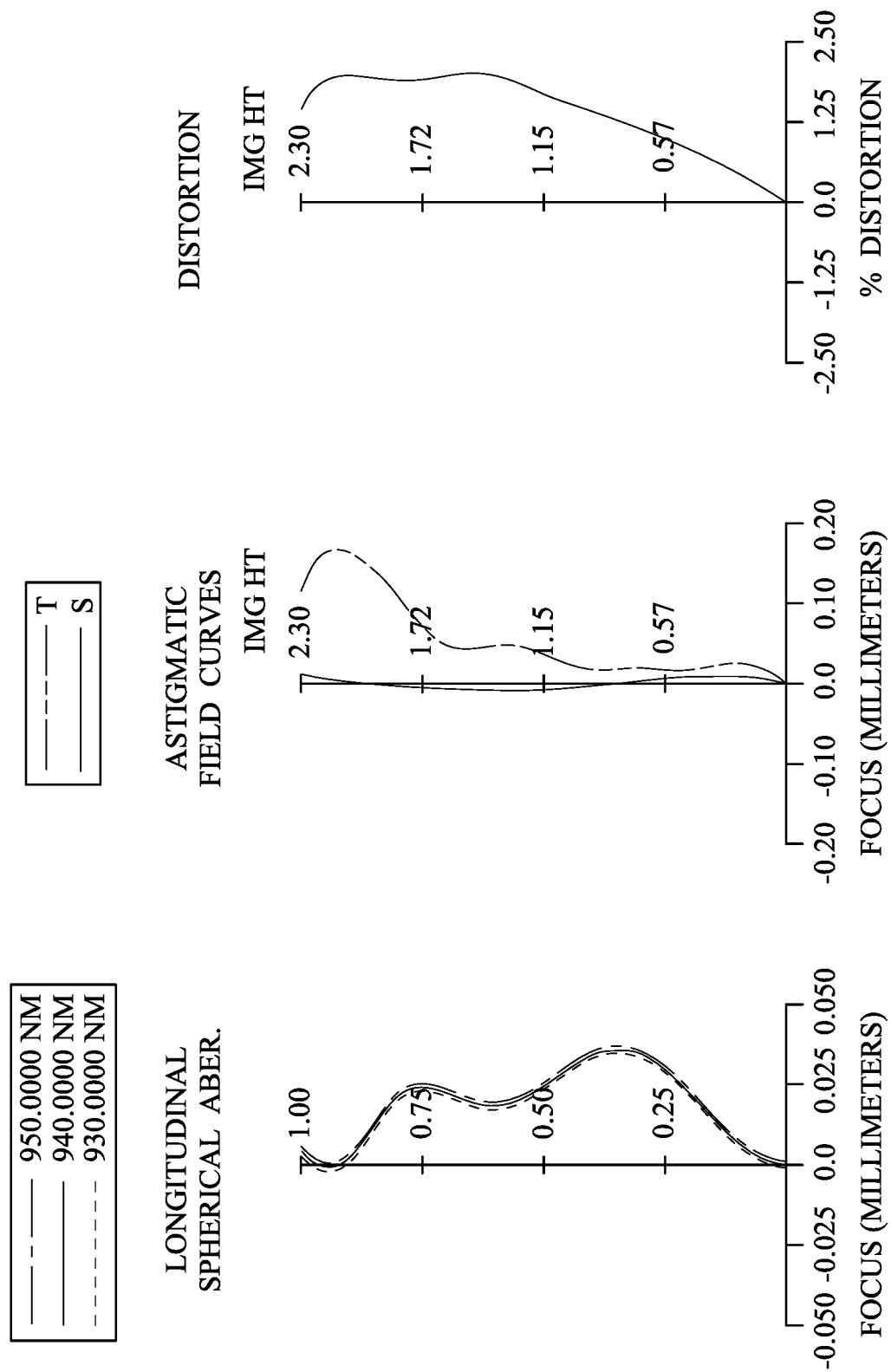
FIG. 2 shows spherical aberration curves, astigmatic field curves and a distortion curve of the electronic device according to the 1st embodiment.

FIG. 1 is a schematic view of an electronic device according to the 1st embodiment of the present disclosure. FIG. 2 shows spherical aberration curves, astigmatic field curves and a distortion curve of the electronic device according to the 1st embodiment. In FIG. 1, the electronic device includes an optical lens assembly (its reference numeral is omitted), wherein the optical lens assembly includes, in order from an outside to an inside, an aperture stop 100, a first lens element 110, a second lens element 120, a third lens element 130, a fourth lens element 140, a filter 150 and an inside conjugation surface 160. The optical lens assembly includes four lens elements (110, 120, 130 and 140) without additional one or more lens elements inserted between the first lens element 110 and the fourth lens element 140.

The first lens element 110 with positive refractive power has an outside surface 111 being convex in a paraxial region thereof and an inside surface 112 being concave in a paraxial region thereof. The first lens element 110 is made of a plastic material, and has the outside surface 111 and the inside surface 112 being both aspheric.

The second lens element 120 with negative refractive power has an outside surface 121 being concave in a paraxial region thereof and an inside surface 122 being convex in a paraxial region thereof. The second lens element 120 is made of a plastic material, and has the outside surface 121 and the inside surface 122 being both aspheric.

The third lens element 130 with positive refractive power has an outside surface 131 being concave in a paraxial region thereof and an inside surface 132 being convex in a paraxial region thereof. The third lens element 130 is made of a plastic material, and has the outside surface 131 and the inside surface 132 being both aspheric.

Figure 25:
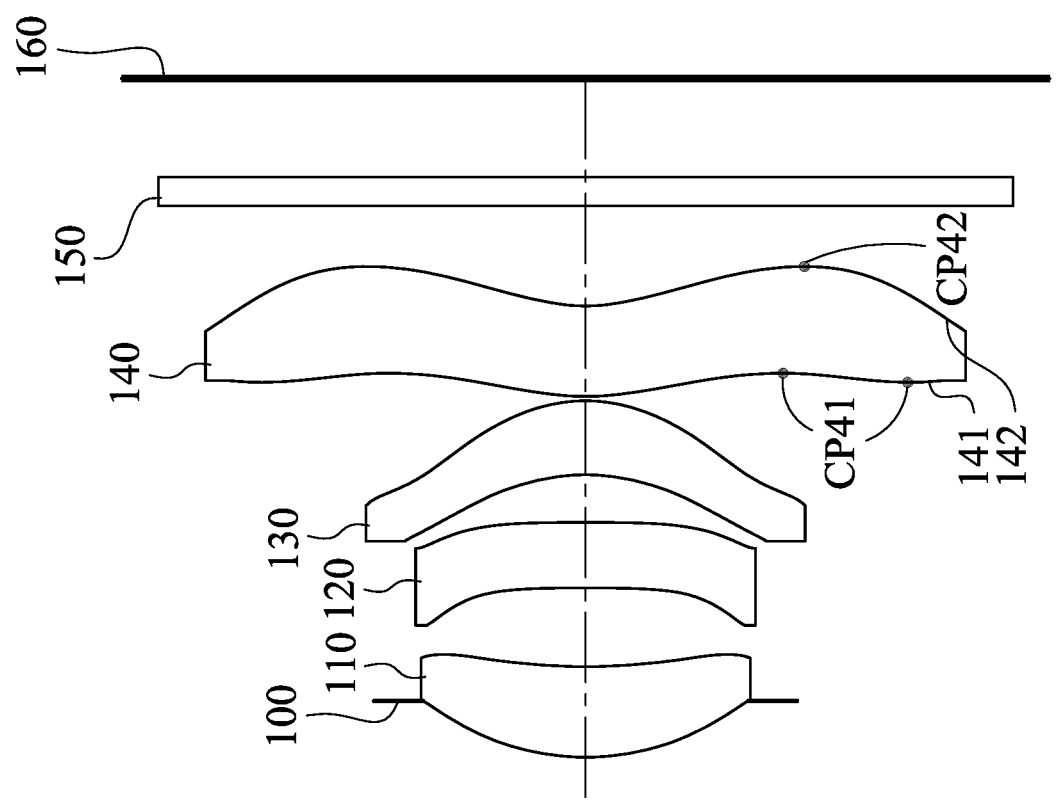
FIG. 25 is a schematic view of critical points according to the 1st embodiment of FIG. 1.

The fourth lens element 140 with negative refractive power has an outside surface 141 being convex in a paraxial region thereof and an inside surface 142 being concave in a paraxial region thereof. The fourth lens element 140 is made of a plastic material, and has the outside surface 141 and the inside surface 142 being both aspheric. Furthermore, each of the outside surface 141 and the inside surface 142 of the fourth lens element 140 includes at least one critical point CP41, CP42 (shown in FIG. 25) in an off-axis region thereof.

The filter 150 is made of a glass material and located between the fourth lens element 140 and the inside conjugation surface 160, and will not affect the focal length of the optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens assembly according to the 1st embodiment, when a focal length of the optical lens assembly is f, an f-number of the optical lens assembly is Fno, and half of a maximum field of view of the optical lens assembly is HFOV, these parameters have the following values: f=2.40 mm; Fno=1.48; and HFOV=43.2 degrees.

In the optical lens assembly according to the 1st embodiment, when a measurement is made in accordance with a reference wavelength as a d-line (587.6 nm), a refractive index of the first lens element 110 is Nd1, the following condition is satisfied: Nd1=1.614.

In the optical lens assembly according to the 1st embodiment, when the measurement is made in accordance with the reference wavelength as the d-line, an Abbe number of the first lens element 110 is Vd1, an Abbe number of the second lens element 120 is Vd2, an Abbe number of the third lens element 130 is Vd3, an Abbe number of the fourth lens element 140 is Vd4, and a sum of the Abbe numbers of the first lens element 110, the second lens element 120, the third lens element 130 and the fourth lens element 140 is ΣVd (that is, ΣVd=Vd1+Vd2+Vd3+Vd4), the following conditions are satisfied: Vd1=26.0; Vd1/Vd2=1.27; Vd1/Vd3=1.27; Vd1/Vd4=1.27; Vd2=20.4; Vd3=20.4; Vd4=20.4; and ΣVd=87.2.

In the optical lens assembly according to the 1st embodiment, when a central thickness of the first lens element 110 is CT1, and an axial distance between the first lens element 110 and the second lens element 120 is T12, the following condition is satisfied: CT1/T12=1.15.

In the optical lens assembly according to the 1st embodiment, when a central thickness of the second lens element 120 is CT2, and a central thickness of the fourth lens element 140 is CT4, the following condition is satisfied: CT2/CT4=0.72.

In the optical lens assembly according to the 1st embodiment, when an axial distance between an outside surface of one of the lens elements closest to the outside (that is, the outside surface 111 of the first lens element 110 in the 1st embodiment) and an inside surface of one of the lens elements closest to the inside (that is, the inside surface 142 of the fourth lens element 140 in the 1st embodiment) is TD, the following condition is satisfied: TD=2.26 mm.

In the optical lens assembly according to the 1st embodiment, when an axial distance between the outside surface 111 of the first lens element 110 and the inside conjugation surface 160 of the optical lens assembly is TL, and a maximum radius of an optical effective region of the inside conjugation surface 160 of the optical lens assembly is IH, the following condition is satisfied: TL/IH=1.48.

In the optical lens assembly according to the 1st embodiment, when a curvature radius of the outside surface 111 of the first lens element 110 is R1, a curvature radius of the inside surface 112 of the first lens element 110 is R2, and a curvature radius of the outside surface 141 of the fourth lens element 140 is R7, the following conditions are satisfied: R1/R2=0.42; and R2/R7=2.24.

In the optical lens assembly according to the 1st embodiment, when the curvature radius of the inside surface 112 of the first lens element 110 is R2, and when the measurement is made in accordance with the reference wavelength as the d-line, a focal length of the optical lens assembly is fd, the following condition is satisfied: R2/fd=1.32.

In the optical lens assembly according to the 1st embodiment, when a curvature radius of the inside surface 142 of the fourth lens element 140 is R8, and when the measurement is made in accordance with the reference wavelength as the d-line, the focal length of the optical lens assembly is fd, the following condition is satisfied: R8/fd=0.41.

In the optical lens assembly according to the 1st embodiment, when the measurement is made in accordance with the reference wavelength as the d-line, the focal length of the optical lens assembly is fd, a focal length of the third lens element 130 is fd3, a focal length of the fourth lens element 140 is fd4, and a maximum of two values of |fd/fd3| and |fd/fd4| is max(|fd/fd3|, |fd/fd4|), the following conditions are satisfied: fd/fd3=0.70; |fd/fd3|+|fd/fd4|=0.98; and max (|fd/fd3|, |fd/fd4|)=0.70.

In the optical lens assembly according to the 1st embodiment, when the measurement is made in accordance with the reference wavelength as the d-line, a focal length of the first lens element 110 is fd1, a focal length of the second lens element 120 is fd2, the focal length of the third lens element 130 is fd3, and the focal length of the fourth lens element 140 is fd4, the following condition is satisfied: (|1/fd1|+|1/fd2|)/(|1/fd3|+|1/fd4|)=0.75.

In the optical lens assembly according to the 1st embodiment, when an axial distance between the aperture stop 100 and the inside conjugation surface 160 of the optical lens assembly is SL, and an axial distance between the outside surface 111 of the first lens element 110 and the inside conjugation surface 160 of the optical lens assembly is TL, the following condition is satisfied: SL/TL=0.92.

The detailed optical data of the 1st embodiment are shown in Tables 1A and 1B, and the aspheric surface data are shown in Table 2 below.

TABLE 1A

1st Embodiment
f = 2.40 mm, Fno = 1.48, HFOV = 43.2 deg.

| Surface # | | Curvature Radius | | Thickness | Material | Index | Abbe # | Focal Length |
|---|---|---|---|---|---|---|---|---|
| 0 | Outside conjugation surface | Plano | | 600.000 | | | | |
| 1 | Ape. Stop | Plano | | −0.281 | | | | |
| 2 | Lens 1 | 1.274 | ASP | 0.453 | Plastic | 1.594 | 26.0 | 3.37 |
| 3 | | 3.048 | ASP | 0.394 | | | | |
| 4 | Lens 2 | −16.319 | ASP | 0.328 | Plastic | 1.634 | 20.4 | −88.86 |
| 5 | | −23.157 | ASP | 0.238 | | | | |
| 6 | Lens 3 | −1.035 | ASP | 0.370 | Plastic | 1.634 | 20.4 | 3.47 |

TABLE 1A-continued

1st Embodiment
f = 2.40 mm, Fno = 1.48, HFOV = 43.2 deg.

| Surface # | | Curvature Radius | | Thickness | Material | Index | Abbe # | Focal Length |
|---|---|---|---|---|---|---|---|---|
| 7 | | −0.801 | ASP | 0.022 | | | | |
| 8 | Lens 4 | 1.362 | ASP | 0.453 | Plastic | 1.634 | 20.4 | −8.24 |
| 9 | | 0.941 | ASP | 0.500 | | | | |
| 10 | Filter | Plano | | 0.145 | Glass | 1.508 | 64.2 | — |
| 11 | | Plano | | 0.492 | | | | |
| 12 | Inside conjugation surface | Plano | | — | | | | |

Reference wavelength is 940.0 nm
Effective radius of Surface 5 is 0.850 mm

TABLE 1B

1st Embodiment
fd = 2.30 mm

| Surface # | | Index | Focal Length |
|---|---|---|---|
| 0 | Outside conjugation surface | | |
| 1 | Ape. Stop | | |
| 2 | Lens 1 | 1.614 | 3.25 |
| 3 | | | |
| 4 | Lens 2 | 1.660 | −85.36 |
| 5 | | | |
| 6 | Lens 3 | 1.660 | 3.30 |
| 7 | | | |
| 8 | Lens 4 | 1.660 | −8.06 |
| 9 | | | |
| 10 | Filter | 1.517 | — |
| 11 | | | |
| 12 | Inside conjugation surface | | |

Reference wavelength is 587.6 nm (d-line).

TABLE 2

| Aspheric Coefficients | | | | |
|---|---|---|---|---|
| Surface # | 2 | 3 | 4 | 5 |
| k= | −1.3621E+00 | 9.8527E+00 | −6.2427E+01 | 1.0348E+01 |
| A4= | 5.2900E−02 | −5.1945E−02 | −3.6923E−01 | −3.4642E−01 |
| A6= | 1.9592E−01 | −1.8590E−01 | 7.1742E−01 | 1.1290E+00 |
| A8= | −7.9040E−02 | 7.7172E−01 | −7.1766E+00 | −6.3080E+00 |
| A10= | −1.4209E+00 | −3.5484E+00 | 3.1299E+01 | 1.8207E+01 |
| A12= | 3.3859E+00 | 6.3995E+00 | −8.0080E+01 | −2.8507E+01 |
| A14= | −2.4674E+00 | −6.2229E+00 | 1.0372E+02 | 2.1970E+01 |
| A16= | | 2.3645E+00 | −5.0614E+01 | −5.7753E+00 |

| Surface # | 6 | 7 | 8 | 9 |
|---|---|---|---|---|
| k= | 1.8953E−01 | −7.3447E+00 | −6.8788E−01 | −4.8628E+00 |
| A4= | 2.3972E−01 | −1.4078E+00 | −5.5202E−01 | −2.6074E−01 |
| A6= | 6.0228E−01 | 5.0381E+00 | 5.5329E−01 | 2.6091E−01 |
| A8= | −7.3869E+00 | −1.4183E+01 | −4.2818E−01 | −1.9719E−01 |
| A10= | 2.7483E+01 | 2.5531E+01 | 2.1197E−01 | 9.3754E−02 |
| A12= | −4.4540E+01 | −2.5622E+01 | −6.1912E−02 | −2.7309E−02 |
| A14= | 3.3950E+01 | 1.3254E+01 | 9.7621E−03 | 4.4423E−03 |
| A16= | −9.7250E+00 | −2.7856E+00 | −6.4485E−04 | −3.0510E−04 |

In Table 1A, the detailed optical data of the 1st embodiment in FIG. 1 are stated, and in Table 1B, the refractive indices and the focal lengths of the 1st embodiment in FIG. 1 when the measurement is made in accordance with the reference wavelength as the d-line are stated, wherein the curvature radii, the thicknesses and the focal lengths are shown in millimeters (mm). Surface numbers 0-12 represent the surfaces sequentially arranged from the outside to the inside along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1A, Table 1B and Table 2 of the 1st embodiment. Therefore, an explanation in this regard will not be provided again.

2nd Embodiment

Figure 3:
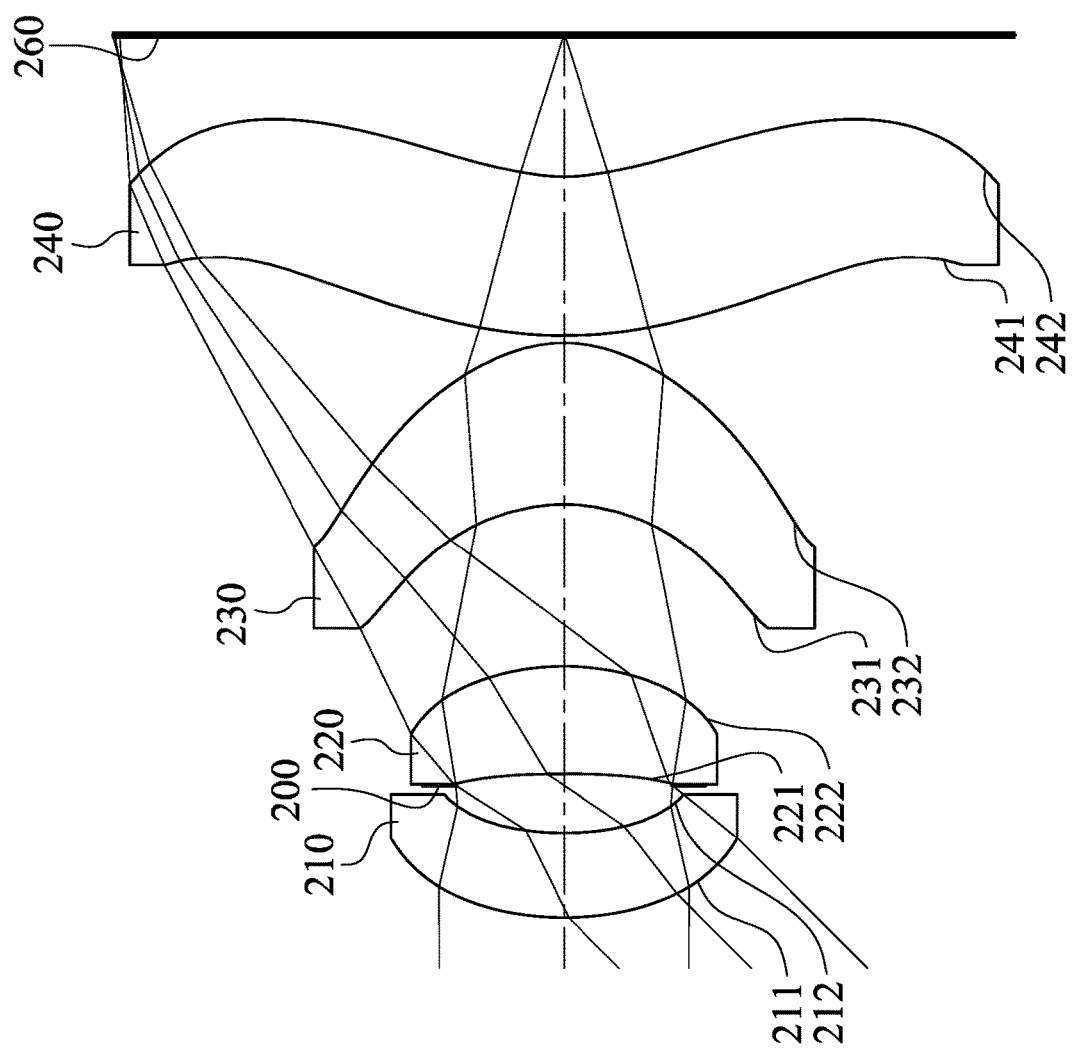
FIG. 3 is a schematic view of an electronic device according to the 2nd embodiment of the present disclosure.
Figure 4:
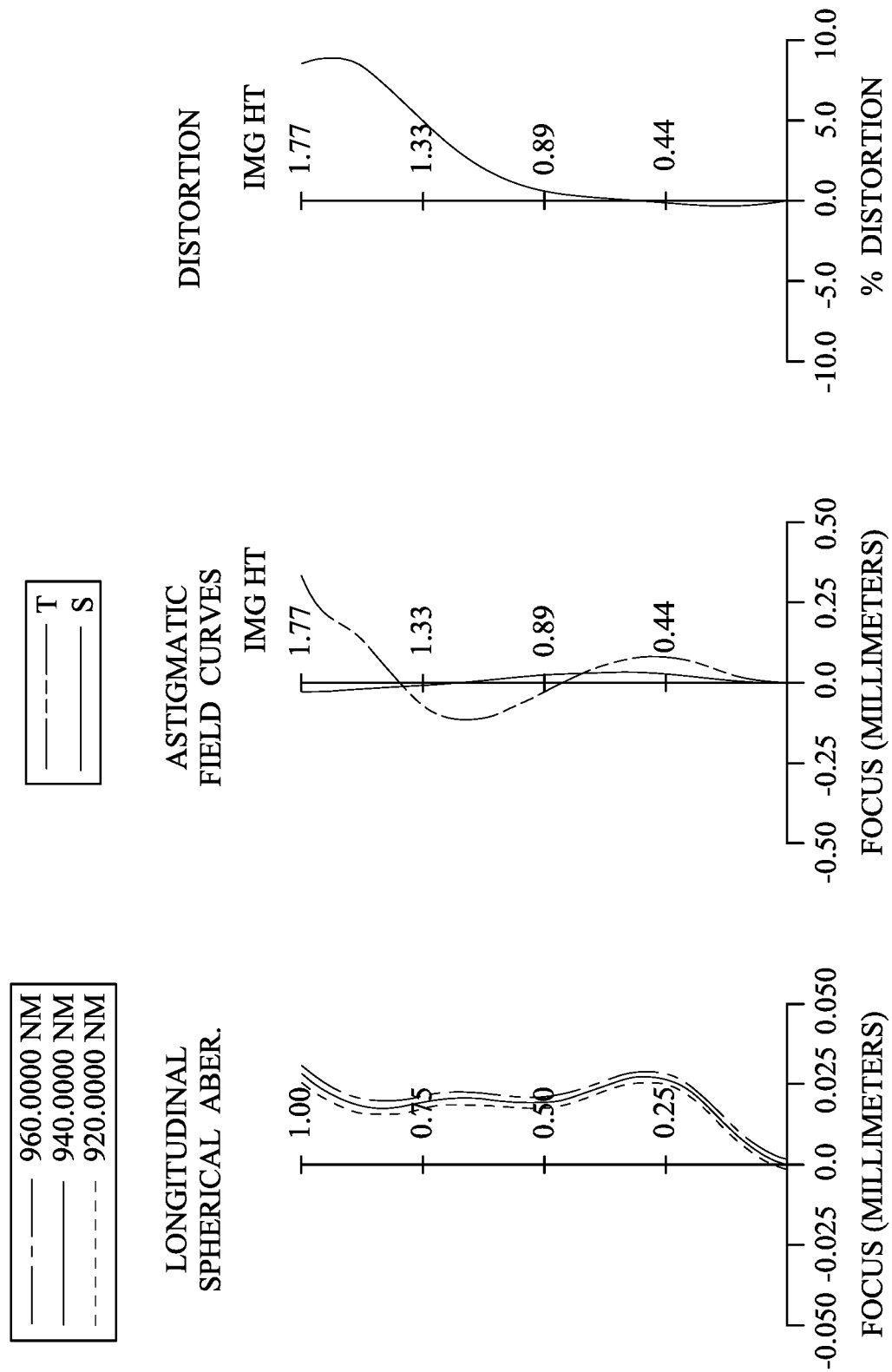
FIG. 4 shows spherical aberration curves, astigmatic field curves and a distortion curve of the electronic device according to the 2nd embodiment.

FIG. 3 is a schematic view of an electronic device according to the 2nd embodiment of the present disclosure. FIG. 4 shows spherical aberration curves, astigmatic field curves and a distortion curve of the electronic device according to the 2nd embodiment. In FIG. 3, the electronic device includes an optical lens assembly (its reference numeral is omitted), wherein the optical lens assembly includes, in order from an outside to an inside, a first lens element 210, an aperture stop 200, a second lens element 220, a third lens element 230, a fourth lens element 240 and an inside conjugation surface 260. The optical lens assembly includes four lens elements (210, 220, 230 and 240) without additional one or more lens elements inserted between the first lens element 210 and the fourth lens element 240.

The first lens element 210 with positive refractive power has an outside surface 211 being convex in a paraxial region thereof and an inside surface 212 being concave in a paraxial region thereof. The first lens element 210 is made of a plastic material, and has the outside surface 211 and the inside surface 212 being both aspheric.

The second lens element 220 with positive refractive power has an outside surface 221 being concave in a paraxial region thereof and an inside surface 222 being convex in a paraxial region thereof. The second lens element 220 is made of a plastic material, and has the outside surface 221 and the inside surface 222 being both aspheric.

The third lens element 230 with positive refractive power has an outside surface 231 being concave in a paraxial region thereof and an inside surface 232 being convex in a paraxial region thereof. The third lens element 230 is made of a plastic material, and has the outside surface 231 and the inside surface 232 being both aspheric.

The fourth lens element 240 with negative refractive power has an outside surface 241 being convex in a paraxial region thereof and an inside surface 242 being concave in a paraxial region thereof. The fourth lens element 240 is made of a plastic material, and has the outside surface 241 and the inside surface 242 being both aspheric. Furthermore, each of the outside surface 241 and the inside surface 242 of the fourth lens element 240 includes at least one critical point in an off-axis region thereof.

The detailed optical data of the 2nd embodiment are shown in Tables 3A and 3B, and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3A, Table 3B and Table 4 as the following values and satisfy the following conditions:

TABLE 3A

2nd Embodiment
f = 1.63 mm, Fno = 1.65, HFOV = 45.0 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | 1.237 | ASP | 0.336 | Plastic | 1.634 | 20.4 | 22.17 |
| 2 | | 1.213 | ASP | 0.187 | | | | |
| 3 | Ape. Stop | Plano | | 0.047 | | | | |
| 4 | Lens 2 | -3.277 | ASP | 0.423 | Plastic | 1.634 | 20.4 | 2.24 |
| 5 | | -1.041 | ASP | 0.642 | | | | |
| 6 | Lens 3 | -0.760 | ASP | 0.637 | Plastic | 1.634 | 20.4 | 1.67 |
| 7 | | -0.586 | ASP | 0.030 | | | | |
| 8 | Lens 4 | 1.806 | ASP | 0.629 | Plastic | 1.634 | 20.4 | -3.21 |
| 9 | | 0.828 | ASP | 0.558 | | | | |
| 10 | Inside conjugation surface | Plano | | — | | | | |

Reference wavelength is 940.0 nm.

TABLE 3B

2nd Embodiment
fd = 1.56 mm

| Surface # | | Index | Focal Length |
|---|---|---|---|
| 0 | Outside conjugation surface | | |
| 1 | Lens 1 | 1.660 | 20.66 |
| 2 | | | |
| 3 | Ape. Stop | | |
| 4 | Lens 2 | 1.660 | 2.15 |
| 5 | | | |
| 6 | Lens 3 | 1.660 | 1.58 |
| 7 | | | |
| 8 | Lens 4 | 1.660 | -3.11 |
| 9 | | | |
| 10 | Inside conjugation surface | | |

Reference wavelength is 587.6 nm (d-line).

TABLE 4

Aspheric Coefficients

| Surface # | 1 | 2 | 4 | 5 |
|---|---|---|---|---|
| k= | 4.6933E-01 | -1.6476E+01 | 3.2263E+00 | -3.7036E+01 |
| A4= | 1.4648E-01 | 1.4757E+00 | -1.0680E-01 | -3.1352E+00 |
| A6= | 6.8742E-01 | 8.1862E-01 | -3.3913E+00 | 1.9765E+01 |
| A8= | -1.6208E+00 | -1.3581E+01 | 3.1887E+01 | -9.7012E+01 |
| A10= | 3.2284E+00 | 6.8848E+01 | -1.6057E+02 | 2.6450E+02 |
| A12= | | | 2.6228E+02 | -3.6576E+02 |
| A14= | | | | 1.5985E+02 |

| Surface # | 6 | 7 | 8 | 9 |
|---|---|---|---|---|
| k= | -7.4296E-01 | -1.1011E+00 | -1.6752E+00 | -8.4235E+00 |
| A4= | -2.7963E-02 | 2.8536E-01 | 1.4233E-02 | -2.8891E-02 |
| A6= | -9.8170E-01 | -1.0091E+00 | -1.1356E-01 | -6.2469E-02 |
| A8= | 4.3964E-01 | 1.3120E+00 | 1.1321E-01 | 6.7605E-02 |
| A10= | -1.3214E+01 | -8.3178E-01 | -6.1698E-02 | -4.5801E-02 |
| A12= | 1.8931E+01 | -3.4680E-01 | 1.5626E-02 | 1.9327E-02 |
| A14= | -8.6942E+00 | 5.7728E-01 | -1.4251E-03 | -4.5935E-03 |
| A16= | | | | 4.5328E-04 |

| 2nd Embodiment | | | |
|---|---|---|---|
| f [mm] | 1.63 | CT2/CT4 | 0.67 |
| Fno | 1.65 | TD [mm] | 2.93 |
| HFOV [deg.] | 45.0 | TL/IH | 1.97 |
| Nd1 | 1.660 | R1/R2 | 1.02 |
| Vd1 | 20.4 | R2/R7 | 0.67 |
| Vd1/Vd2 | 1.00 | R2/fd | 0.78 |
| Vd1/Vd3 | 1.00 | R8/fd | 0.53 |
| Vd1/Vd4 | 1.00 | fd/fd3 | 0.99 |
| Vd2 | 20.4 | \|fd/fd3\| + \|fd/fd4\| | 1.49 |
| Vd3 | 20.4 | max(\|fd/fd3\|, \|fd/fd4\|) | 0.99 |
| Vd4 | 20.4 | (\|1/fd1\| + \|1/fd2\|)/(\|1/fd3\| + \|1/fd4\|) | 0.54 |
| ΣVd | 81.6 | SL/TL | 0.85 |
| CT1/T12 | 1.44 | | |

3rd Embodiment

Figure 5:
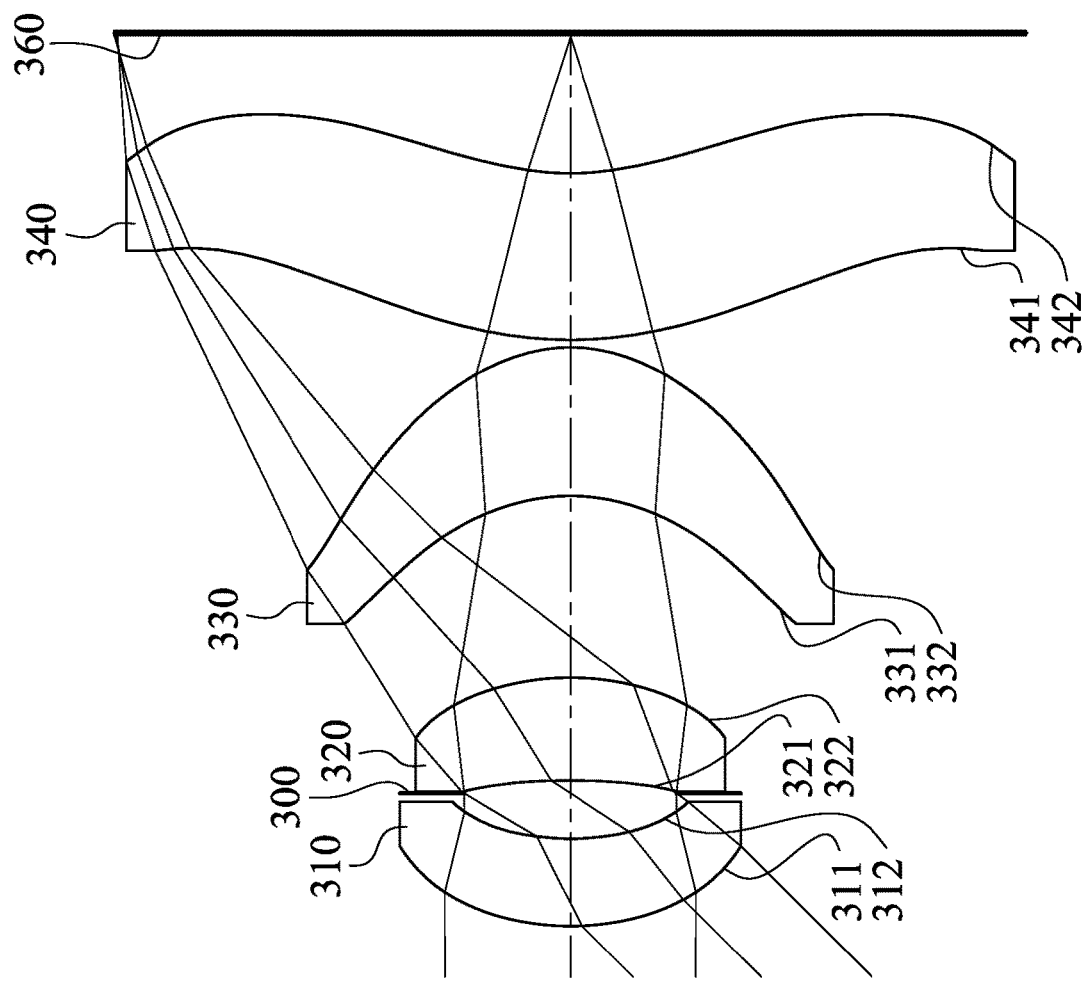
FIG. 5 is a schematic view of an electronic device according to the 3rd embodiment of the present disclosure.
Figure 6:
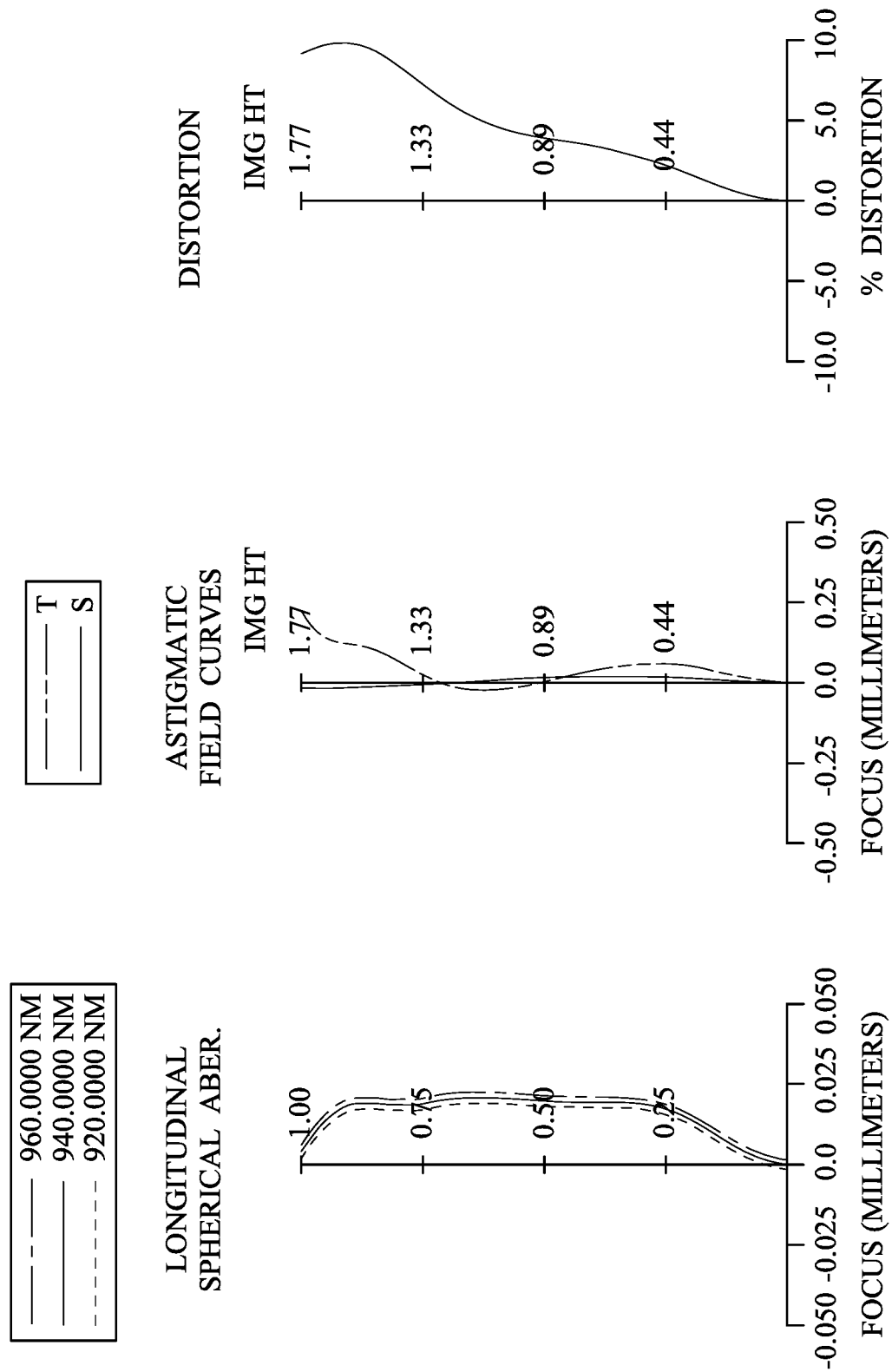
FIG. 6 shows spherical aberration curves, astigmatic field curves and a distortion curve of the electronic device according to the 3rd embodiment.

FIG. 5 is a schematic view of an electronic device according to the 3rd embodiment of the present disclosure. FIG. 6 shows spherical aberration curves, astigmatic field curves and a distortion curve of the electronic device according to the 3rd embodiment. In FIG. 5, the electronic device includes an optical lens assembly (its reference numeral is omitted), wherein the optical lens assembly includes, in order from an outside to an inside, a first lens element 310, an aperture stop 300, a second lens element 320, a third lens element 330, a fourth lens element 340 and an inside conjugation surface 360. The optical lens assembly includes four lens elements (310, 320, 330 and 340) without additional one or more lens elements inserted between the first lens element 310 and the fourth lens element 340.

The first lens element 310 with positive refractive power has an outside surface 311 being convex in a paraxial region thereof and an inside surface 312 being concave in a paraxial region thereof. The first lens element 310 is made of a plastic material, and has the outside surface 311 and the inside surface 312 being both aspheric.

The second lens element 320 with positive refractive power has an outside surface 321 being concave in a paraxial region thereof and an inside surface 322 being convex in a paraxial region thereof. The second lens element 320 is made of a plastic material, and has the outside surface 321 and the inside surface 322 being both aspheric.

The third lens element 330 with positive refractive power has an outside surface 331 being concave in a paraxial region thereof and an inside surface 332 being convex in a paraxial region thereof. The third lens element 330 is made of a plastic material, and has the outside surface 331 and the inside surface 332 being both aspheric.

The fourth lens element 340 with negative refractive power has an outside surface 341 being convex in a paraxial region thereof and an inside surface 342 being concave in a paraxial region thereof. The fourth lens element 340 is made of a plastic material, and has the outside surface 341 and the inside surface 342 being both aspheric. Furthermore, each of the outside surface 341 and the inside surface 342 of the fourth lens element 340 includes at least one critical point in an off-axis region thereof.

The detailed optical data of the 3rd embodiment are shown in Tables 5A and 5B, and the aspheric surface data are shown in Table 6 below.

TABLE 5A

3rd Embodiment
f = 1.62 mm, Fno = 1.65, HFOV = 45.0 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | 1.093 | ASP | 0.341 | Plastic | 1.634 | 20.4 | 14.75 |
| 2 | | 1.087 | ASP | 0.177 | | | | |
| 3 | Ape. Stop | Plano | | 0.050 | | | | |
| 4 | Lens 2 | −2.588 | ASP | 0.401 | Plastic | 1.634 | 20.4 | 2.63 |
| 5 | | −1.074 | ASP | 0.711 | | | | |
| 6 | Lens 3 | −0.806 | ASP | 0.581 | Plastic | 1.634 | 20.4 | 2.05 |
| 7 | | −0.637 | ASP | 0.030 | | | | |
| 8 | Lens 4 | 1.619 | ASP | 0.649 | Plastic | 1.634 | 20.4 | −10.20 |
| 9 | | 1.093 | ASP | 0.549 | | | | |
| 10 | Inside conjugation surface | Plano | | — | | | | |

Reference wavelength is 940.0 nm.

TABLE 5B

3rd Embodiment
fd = 1.56 mm

| Surface # | | Index | Focal Length |
|---|---|---|---|
| 0 | Outside conjugation surface | | |
| 1 | Lens 1 | 1.660 | 13.80 |
| 2 | | | |
| 3 | Ape. Stop | | |
| 4 | Lens 2 | 1.660 | 2.52 |
| 5 | | | |
| 6 | Lens 3 | 1.660 | 1.94 |
| 7 | | | |
| 8 | Lens 4 | 1.660 | −10.03 |
| 9 | | | |
| 10 | Inside conjugation surface | | |

Reference wavelength is 587.6 nm (d-line).

TABLE 6

Aspheric Coefficients

| Surface # | 1 | 2 | 4 | 5 |
|---|---|---|---|---|
| k= | −1.0215E−01 | −1.6051E+01 | 6.9732E+00 | −3.4932E+01 |
| A4= | 1.9975E−01 | 2.0097E+00 | −3.8666E−02 | −2.9353E+00 |
| A6= | 4.0285E−01 | −5.0791E+00 | −4.3589E+00 | 2.0386E+01 |
| A8= | −5.3972E−01 | 1.9253E+01 | 4.8798E+01 | −1.1270E+02 |
| A10= | 2.0449E+00 | −9.2315E+00 | −2.6927E+02 | 3.7089E+02 |
| A12= | | | 5.2560E+02 | −6.6034E+02 |
| A14= | | | | 4.6252E+02 |

| Surface # | 6 | 7 | 8 | 9 |
|---|---|---|---|---|
| k= | −5.1586E−01 | −1.0198E+00 | −1.2692E+00 | −6.9369E+00 |
| A4= | −7.8159E−02 | 8.9721E−02 | 1.1532E−02 | −1.7541E−03 |
| A6= | 9.6612E−01 | −4.3741E−01 | −1.5648E−01 | −5.9643E−02 |
| A8= | −3.9972E+00 | 7.0880E−01 | 1.4892E−01 | −1.4983E−01 |
| A10= | 8.4049E+00 | −1.0647E+00 | −7.0741E−02 | 4.8039E−02 |
| A12= | −7.9789E+00 | 7.9482E−01 | 1.6068E−02 | −2.5006E−02 |
| A14= | 2.9939E+00 | −1.5188E−01 | −1.3678E−03 | 5.2310E−03 |
| A16= | | | | −3.8834E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5A, Table 5B and Table 6 as the following values and satisfy the following conditions:

| 3rd Embodiment | | | |
|---|---|---|---|
| f [mm] | 1.62 | CT2/CT4 | 0.62 |
| Fno | 1.65 | TD [mm] | 2.94 |
| HFOV [deg.] | 45.0 | TL/IH | 1.97 |
| Nd1 | 1.660 | R1/R2 | 1.00 |
| Vd1 | 20.4 | R2/R7 | 0.67 |
| Vd1/Vd2 | 1.00 | R2/fd | 0.70 |
| Vd1/Vd3 | 1.00 | R8/fd | 0.70 |
| Vd1/Vd4 | 1.00 | fd/fd3 | 0.80 |
| Vd2 | 20.4 | \|fd/fd3\| + \|fd/fd4\| | 0.96 |
| Vd3 | 20.4 | max(\|fd/fd3\|, \|fd/fd4\|) | 0.80 |

-continued

| 3rd Embodiment | | | |
|---|---|---|---|
| Vd4 | 20.4 | (\|1/fd1\| + \|1/fd2\|)/(\|1/fd3\| + \|1/fd4\|) | 0.76 |
| ΣVd | 81.6 | SL/TL | 0.85 |
| CT1/T12 | 1.50 | | |

4th Embodiment

Figure 7:
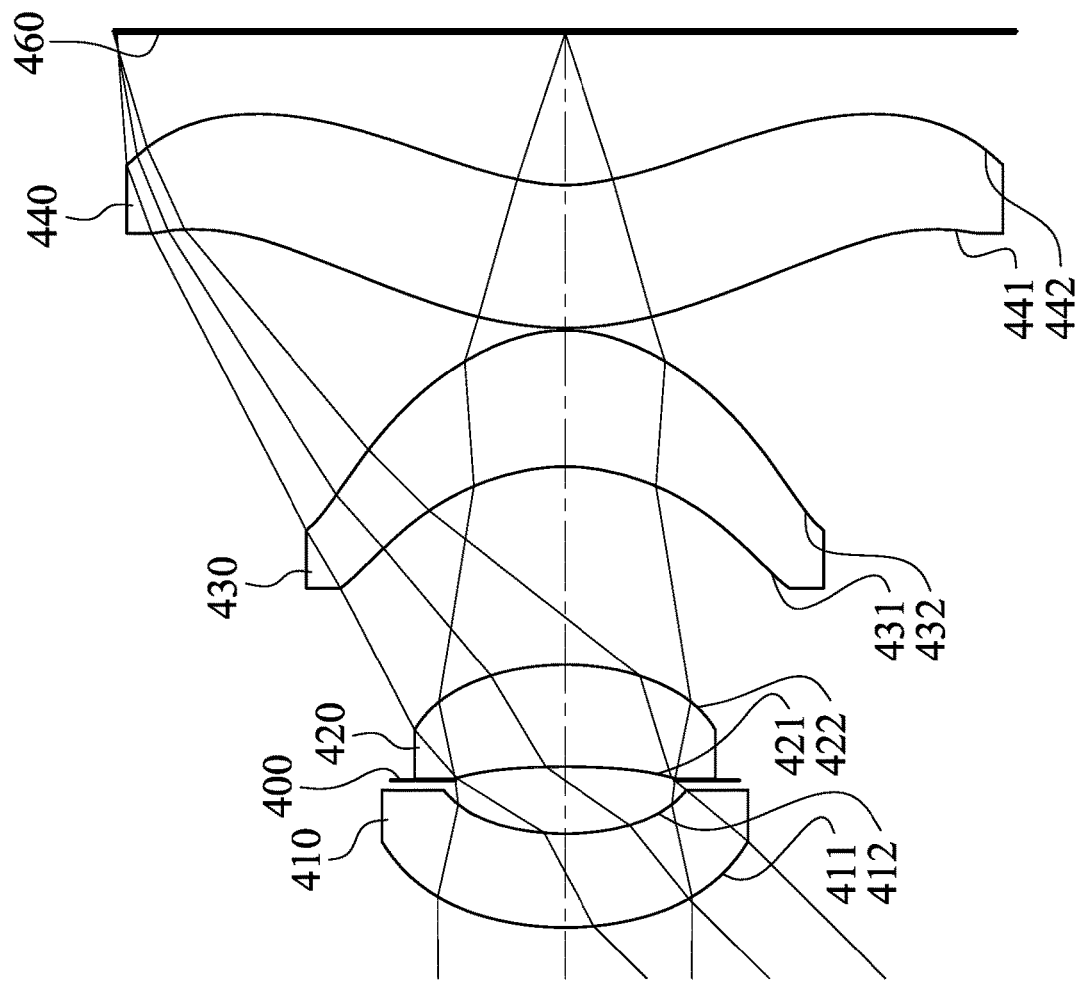
FIG. 7 is a schematic view of an electronic device according to the 4th embodiment of the present disclosure.
Figure 8:
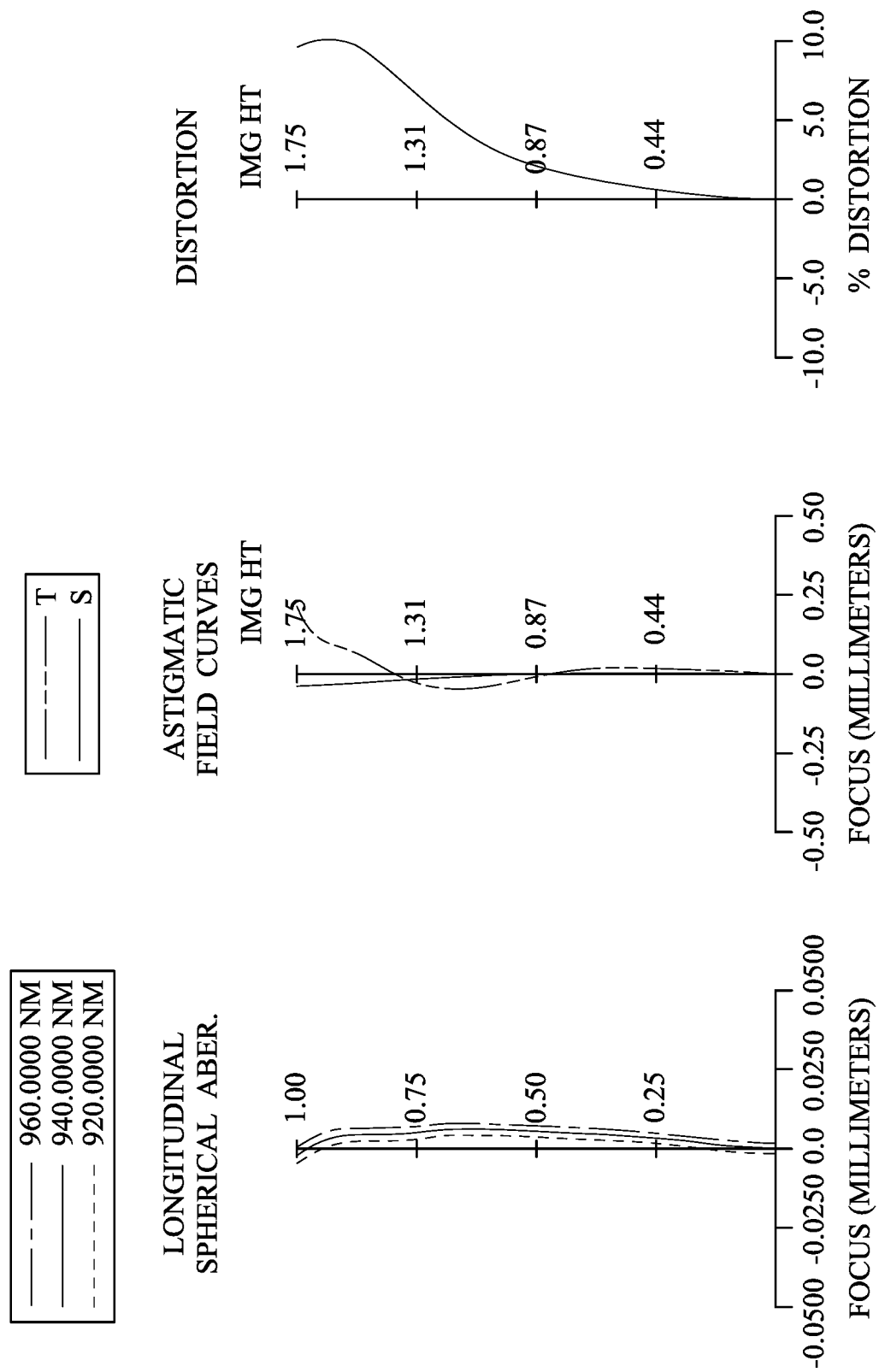
FIG. 8 shows spherical aberration curves, astigmatic field curves and a distortion curve of the electronic device according to the 4th embodiment.

FIG. 7 is a schematic view of an electronic device according to the 4th embodiment of the present disclosure. FIG. 8 shows spherical aberration curves, astigmatic field curves and a distortion curve of the electronic device according to the 4th embodiment. In FIG. 7, the electronic device includes an optical lens assembly (its reference numeral is omitted), wherein the optical lens assembly includes, in order from an outside to an inside, a first lens element 410, an aperture stop 400, a second lens element 420, a third lens element 430, a fourth lens element 440 and an inside conjugation surface 460. The optical lens assembly includes four lens elements (410, 420, 430 and 440) without additional one or more lens elements inserted between the first lens element 410 and the fourth lens element 440.

The first lens element 410 with negative refractive power has an outside surface 411 being convex in a paraxial region thereof and an inside surface 412 being concave in a paraxial region thereof. The first lens element 410 is made of a plastic material, and has the outside surface 411 and the inside surface 412 being both aspheric.

The second lens element 420 with positive refractive power has an outside surface 421 being concave in a paraxial region thereof and an inside surface 422 being convex in a paraxial region thereof. The second lens element 420 is made of a plastic material, and has the outside surface 421 and the inside surface 422 being both aspheric.

The third lens element 430 with positive refractive power has an outside surface 431 being concave in a paraxial region thereof and an inside surface 432 being convex in a paraxial region thereof. The third lens element 430 is made of a plastic material, and has the outside surface 431 and the inside surface 432 being both aspheric.

The fourth lens element 440 with negative refractive power has an outside surface 441 being convex in a paraxial region thereof and an inside surface 442 being concave in a paraxial region thereof. The fourth lens element 440 is made of a plastic material, and has the outside surface 441 and the inside surface 442 being both aspheric. Furthermore, each of the outside surface 441 and the inside surface 442 of the fourth lens element 440 includes at least one critical point in an off-axis region thereof.

The detailed optical data of the 4th embodiment are shown in Tables 7A and 7B, and the aspheric surface data are shown in Table 8 below.

TABLE 7A

4th Embodiment
f = 1.59 mm, Fno = 1.61, HFOV = 45.0 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | 1.242 | ASP | 0.365 | Plastic | 1.641 | 19.5 | −79.04 |
| 2 | | 1.073 | ASP | 0.207 | | | | |
| 3 | Ape. Stop | Plano | | 0.053 | | | | |
| 4 | Lens 2 | −2.958 | ASP | 0.397 | Plastic | 1.641 | 19.5 | 2.31 |
| 5 | | −1.040 | ASP | 0.772 | | | | |
| 6 | Lens 3 | −0.813 | ASP | 0.531 | Plastic | 1.641 | 19.5 | 1.84 |
| 7 | | −0.604 | ASP | 0.010 | | | | |
| 8 | Lens 4 | 1.278 | ASP | 0.555 | Plastic | 1.641 | 19.5 | −4.86 |
| 9 | | 0.753 | ASP | 0.600 | | | | |
| 10 | Inside conjugation surface | Plano | | — | | | | |

Reference wavelength is 940.0 nm.
Effective radius of Surface 5 is 0.585 mm.

TABLE 7B

4th Embodiment
fd = 1.52 mm

| Surface # | | Index | Focal Length |
|---|---|---|---|
| 0 | Outside conjugation surface | | |
| 1 | Lens 1 | 1.669 | −88.21 |
| 2 | | | |
| 3 | Ape. Stop | | |
| 4 | Lens 2 | 1.669 | 2.21 |
| 5 | | | |
| 6 | Lens 3 | 1.669 | 1.74 |
| 7 | | | |
| 8 | Lens 4 | 1.669 | −4.75 |
| 9 | | | |
| 10 | Inside conjugation surface | | |

Reference wavelength is 587.6 nm (d-line).

TABLE 8

Aspheric Coefficients

| Surface # | 1 | 2 | 4 | 5 |
|---|---|---|---|---|
| k= | −6.0399E−01 | −5.0265E+00 | 1.2585E+01 | −1.2856E+01 |
| A4= | 2.4218E−01 | 1.0636E+00 | −1.5753E−01 | −1.4941E+00 |
| A6= | 3.6557E−01 | 2.2335E+00 | −1.9142E+00 | 2.9042E+00 |
| A8= | −4.3131E−01 | −1.1485E+01 | 1.6396E+01 | 2.7618E+00 |
| A10= | 1.2690E+00 | 5.6090E+01 | −9.1465E+01 | −8.8844E+01 |

TABLE 8-continued

Aspheric Coefficients

| A12= | | 1.3354E+02 | 3.2034E+02 |
|---|---|---|---|
| A14= | | | −4.1379E+02 |

| Surface # | 6 | 7 | 8 | 9 |
|---|---|---|---|---|
| k= | −5.4814E−01 | −1.1315E+00 | −1.8645E+00 | −6.8699E+00 |
| A4= | 2.2866E−01 | 3.0196E−01 | −4.8631E−02 | 4.3969E−02 |
| A6= | −3.2073E−01 | −1.2726E+00 | −7.5137E−02 | −2.0916E−01 |
| A8= | −8.2726E−01 | 2.6891E+00 | 9.5695E−02 | 2.0274E−01 |
| A10= | 2.5898E+00 | −4.1102E+00 | −5.1304E−02 | −1.1586E−01 |
| A12= | −2.0211E+00 | 3.3323E+00 | 1.2120E−02 | 4.1039E−02 |
| A14= | 6.6296E−01 | −9.5129E−01 | −1.0040E−03 | −8.4306E−03 |
| A16= | | | | 7.5589E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7A, Table 7B and Table 8 as the following values and satisfy the following conditions:

4th Embodiment

| f [mm] | 1.59 | CT2/CT4 | 0.72 |
|---|---|---|---|
| Fno | 1.61 | TD [mm] | 2.89 |
| HFOV [deg.] | 45.0 | TL/IH | 1.99 |
| Nd1 | 1.669 | R1/R2 | 1.16 |
| Vd1 | 19.5 | R2/R7 | 0.84 |
| Vd1/Vd2 | 1.00 | R2/fd | 0.71 |
| Vd1/Vd3 | 1.00 | R8/fd | 0.50 |
| Vd1/Vd4 | 1.00 | fd/fd3 | 0.87 |
| Vd2 | 19.5 | \|fd/fd3\| + \|fd/fd4\| | 1.19 |
| Vd3 | 19.5 | max(\|fd/fd3\|, \|fd/fd4\|) | 0.87 |
| Vd4 | 19.5 | (\|1/fd1\| + \|1/fd2\|)/(\|1/fd3\| + \|1/fd4\|) | 0.59 |
| ΣVd | 77.8 | SL/TL | 0.84 |
| CT1/T12 | 1.40 | | |

5th Embodiment

Figure 9:
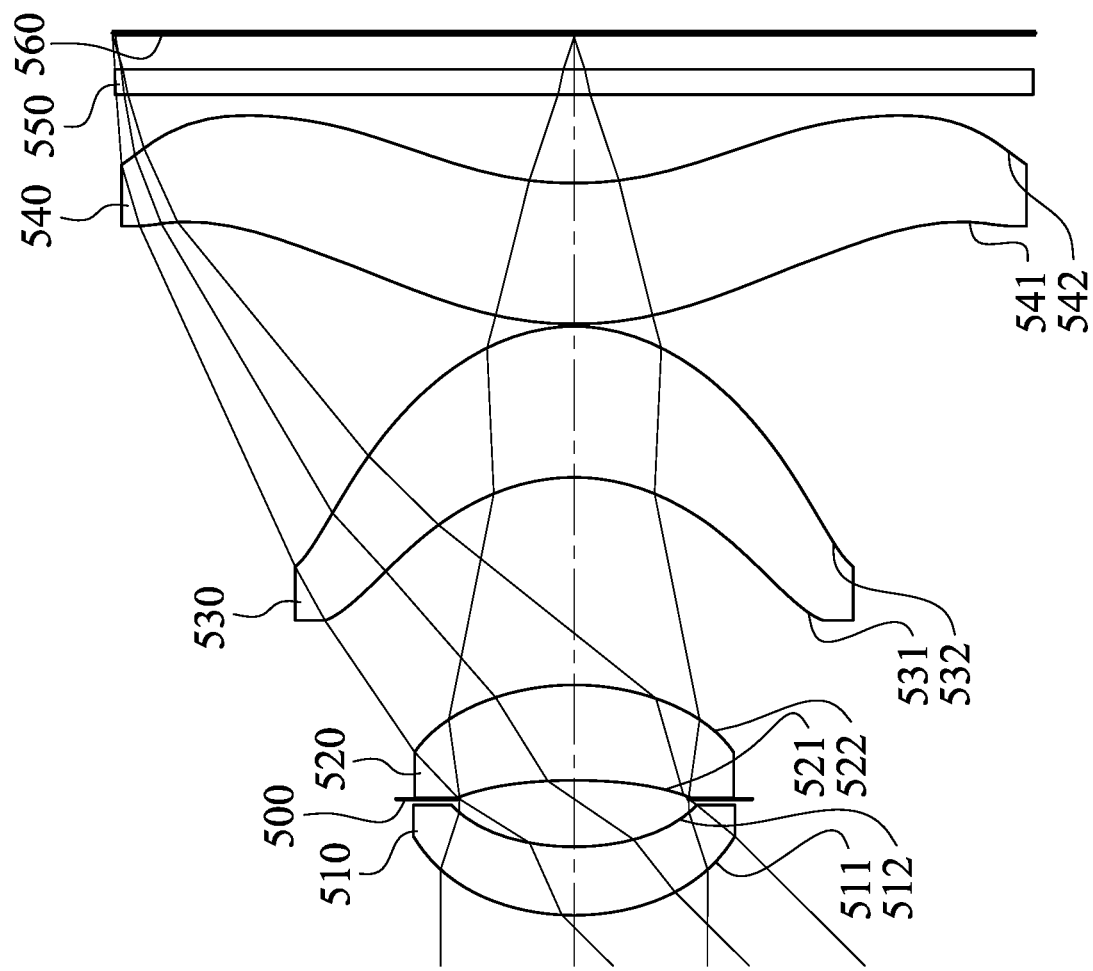
FIG. 9 is a schematic view of an electronic device according to the 5th embodiment of the present disclosure.
Figure 10:
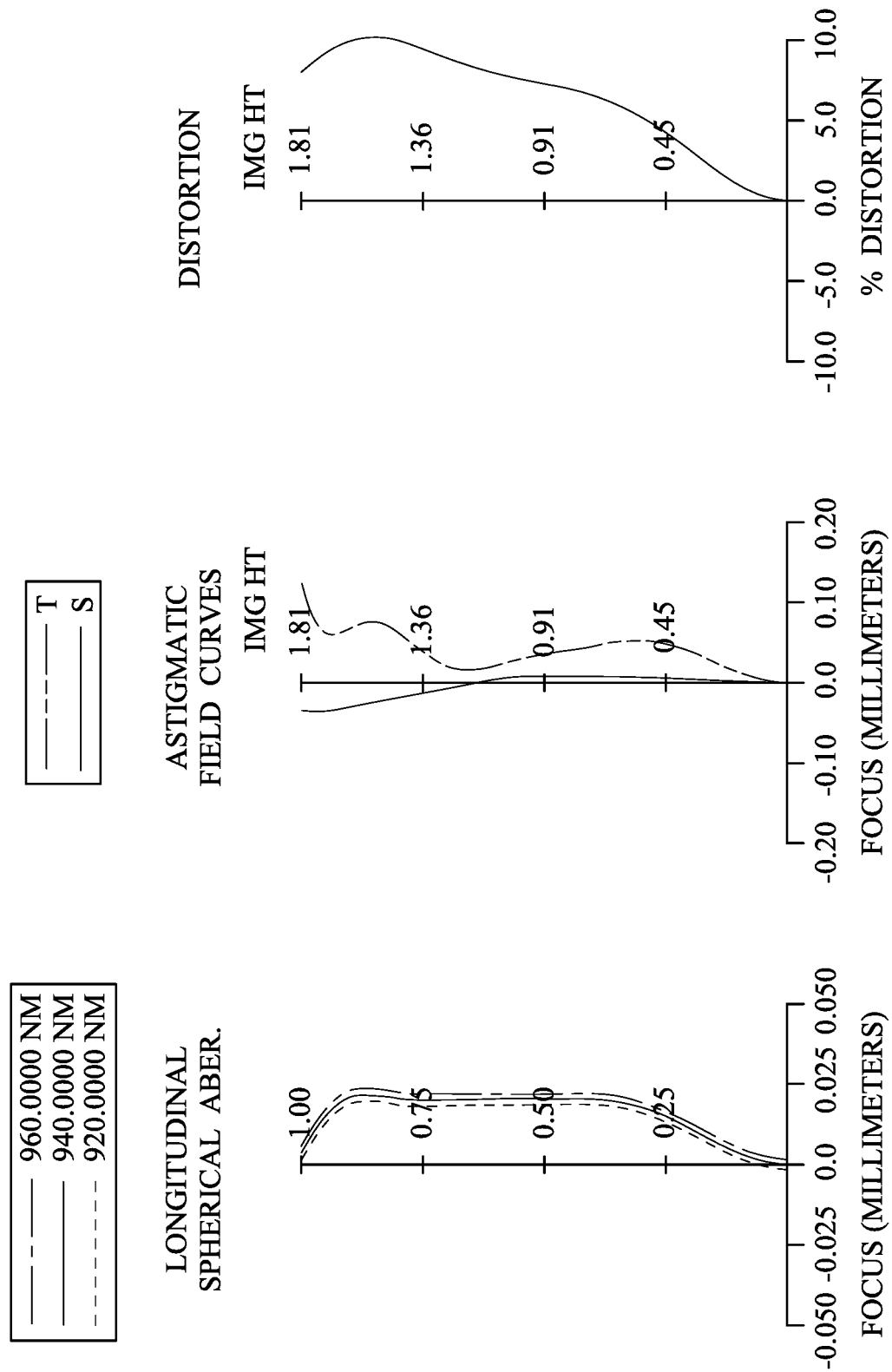
FIG. 10 shows spherical aberration curves, astigmatic field curves and a distortion curve of the electronic device according to the 5th embodiment.

FIG. 9 is a schematic view of an electronic device according to the 5th embodiment of the present disclosure. FIG. 10 shows spherical aberration curves, astigmatic field curves and a distortion curve of the electronic device according to the 5th embodiment. In FIG. 9, the electronic device includes an optical lens assembly (its reference numeral is omitted), wherein the optical lens assembly includes, in order from an outside to an inside, a first lens element 510, an aperture stop 500, a second lens element 520, a third lens element 530, a fourth lens element 540, a filter 550 and an inside conjugation surface 560. The optical lens assembly includes four lens elements (510, 520, 530 and 540) without additional one or more lens elements inserted between the first lens element 510 and the fourth lens element 540.

The first lens element 510 with positive refractive power has an outside surface 511 being convex in a paraxial region thereof and an inside surface 512 being concave in a paraxial region thereof. The first lens element 510 is made of a plastic material, and has the outside surface 511 and the inside surface 512 being both aspheric.

The second lens element 520 with positive refractive power has an outside surface 521 being concave in a paraxial region thereof and an inside surface 522 being convex in a paraxial region thereof. The second lens element 520 is made of a plastic material, and has the outside surface 521 and the inside surface 522 being both aspheric.

The third lens element 530 with positive refractive power has an outside surface 531 being concave in a paraxial region thereof and an inside surface 532 being convex in a paraxial region thereof. The third lens element 530 is made of a plastic material, and has the outside surface 531 and the inside surface 532 being both aspheric.

The fourth lens element 540 with positive refractive power has an outside surface 541 being convex in a paraxial region thereof and an inside surface 542 being concave in a paraxial region thereof. The fourth lens element 540 is made of a plastic material, and has the outside surface 541 and the inside surface 542 being both aspheric. Furthermore, each of the outside surface 541 and the inside surface 542 of the fourth lens element 540 includes at least one critical point in an off-axis region thereof.

The filter 550 is made of a glass material and located between the fourth lens element 540 and the inside conjugation surface 560, and will not affect the focal length of the optical lens assembly.

The detailed optical data of the 5th embodiment are shown in Tables 9A and 9B, and the aspheric surface data are shown in Table 10 below.

TABLE 9A

5th Embodiment
f = 1.67 mm, Fno = 1.58, HFOV = 45.2 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | 0.972 | ASP | 0.271 | Plastic | 1.641 | 19.5 | 9.29 |
| 2 | | 1.035 | ASP | 0.189 | | | | |
| 3 | Ape. Stop | Plano | | 0.074 | | | | |
| 4 | Lens 2 | −2.109 | ASP | 0.377 | Plastic | 1.641 | 19.5 | 2.71 |
| 5 | | −1.020 | ASP | 0.821 | | | | |
| 6 | Lens 3 | −0.801 | ASP | 0.597 | Plastic | 1.641 | 19.5 | 2.63 |
| 7 | | −0.701 | ASP | 0.010 | | | | |
| 8 | Lens 4 | 1.442 | ASP | 0.557 | Plastic | 1.641 | 19.5 | 14.42 |
| 9 | | 1.450 | ASP | 0.350 | | | | |
| 10 | Filter | Plano | | 0.100 | Glass | 1.508 | 64.2 | — |
| 11 | | Plano | | 0.143 | | | | |

TABLE 9A-continued

5th Embodiment
f = 1.67 mm, Fno = 1.58, HFOV = 45.2 deg.

| Surface # | Curvature Radius | Thickness | Material | Index | Abbe # | Focal Length |
|---|---|---|---|---|---|---|
| 12 | Inside conjugation surface | Plano | — | | | |

Reference wavelength is 940.0 nm.
Effective radius of Surface 5 is 0.630 mm.

TABLE 9B

5th Embodiment
fd = 1.62 mm

| Surface # | | Index | Focal Length |
|---|---|---|---|
| 0 | Outside conjugation surface | | |
| 1 | Lens 1 | 1.669 | 8.76 |
| 2 | | | |
| 3 | Ape. Stop | | |
| 4 | Lens 2 | 1.669 | 2.59 |
| 5 | | | |
| 6 | Lens 3 | 1.669 | 2.47 |
| 7 | | | |
| 8 | Lens 4 | 1.669 | 13.48 |
| 9 | | | |
| 10 | Filter | 1.517 | — |
| 11 | | | |
| 12 | Inside conjugation surface | | |

Reference wavelength is 587.6 nm (d-line).

TABLE 10

Aspheric Coefficients

| Surface # | 1 | 2 | 4 | 5 |
|---|---|---|---|---|
| k= | 5.8634E−01 | −4.1733E+00 | 7.8306E+00 | −1.8060E+01 |
| A4= | 1.2889E−01 | 9.3735E−01 | −1.7415E−01 | −1.9324E+00 |
| A6= | 1.1116E−01 | 1.4462E−01 | −1.1159E+00 | 8.2476E+00 |
| A8= | 3.2883E−02 | 1.0082E+00 | 1.0336E+01 | −3.1133E+01 |
| A10= | 1.7659E+00 | 1.4161E+01 | −5.1790E+01 | 6.4831E+01 |
| A12= | | | 8.1969E+01 | −5.7203E+01 |
| A14= | | | | −9.9270E+00 |

| Surface # | 6 | 7 | 8 | 9 |
|---|---|---|---|---|
| k= | −5.1704E−01 | −9.5378E−01 | −1.3946E+00 | −3.6371E+00 |
| A4= | −7.8171E−02 | −3.8642E−03 | 6.7368E−02 | 1.7683E−01 |
| A6= | 8.6137E−01 | −1.7672E−01 | −2.9215E−01 | −4.9344E−01 |
| A8= | −2.9824E+00 | 2.0628E−01 | 2.6041E−01 | 4.4014E−01 |
| A10= | 5.2777E+00 | −2.5365E−01 | −1.1197E−01 | −2.1173E−01 |
| A12= | −3.9481E+00 | 1.1391E−01 | 2.2991E−02 | 5.8806E−02 |
| A14= | 1.1316E+00 | 3.0979E−02 | −1.7837E−03 | −9.1865E−03 |
| A16= | | | | 6.4250E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9A, Table 9B and Table 10 as the following values and satisfy the following conditions:

| 5th Embodiment | | | |
|---|---|---|---|
| f [mm] | 1.67 | CT2/CT4 | 0.68 |
| Fno | 1.58 | TD [mm] | 2.90 |
| HFOV [deg.] | 45.2 | TL/IH | 1.92 |
| Nd1 | 1.669 | R1/R2 | 0.94 |
| Vd1 | 19.5 | R2/R7 | 0.72 |
| Vd1/Vd2 | 1.00 | R2/fd | 0.64 |
| Vd1/Vd3 | 1.00 | R8/fd | 0.90 |
| Vd1/Vd4 | 1.00 | fd/fd3 | 0.65 |
| Vd2 | 19.5 | \|fd/fd3\| + \|fd/fd4\| | 0.77 |
| Vd3 | 19.5 | max(\|fd/fd3\|, \|fd/fd4\|) | 0.65 |
| Vd4 | 19.5 | (\|1/fd1\| + \|1/fd2\|)/(\|1/fd3\| + \|1/fd4\|) | 1.05 |
| ΣVd | 77.8 | SL/TL | 0.87 |
| CT1/T12 | 1.03 | | |

6th Embodiment

Figure 11:
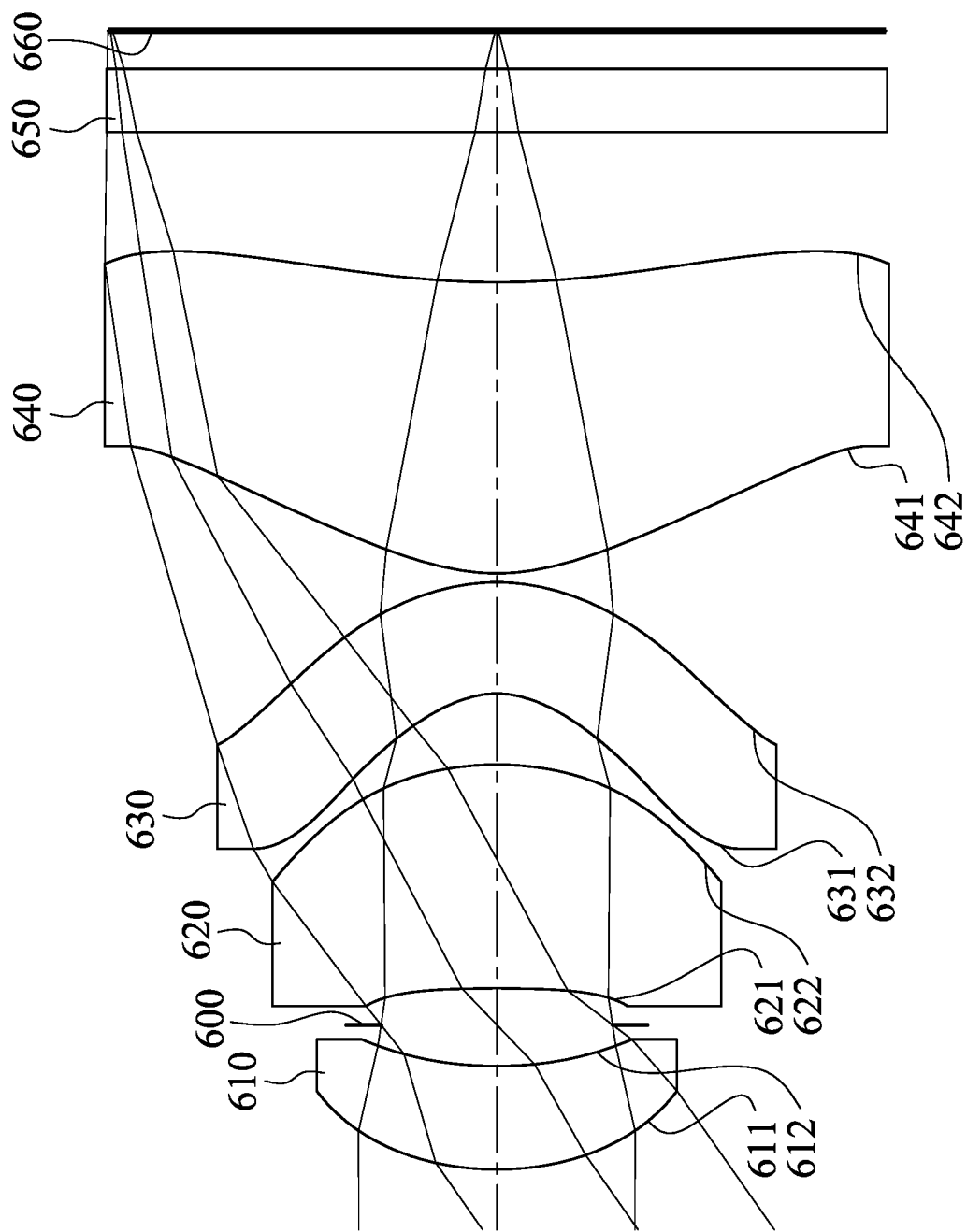
FIG. 11 is a schematic view of an electronic device according to the 6th embodiment of the present disclosure.
Figure 12:
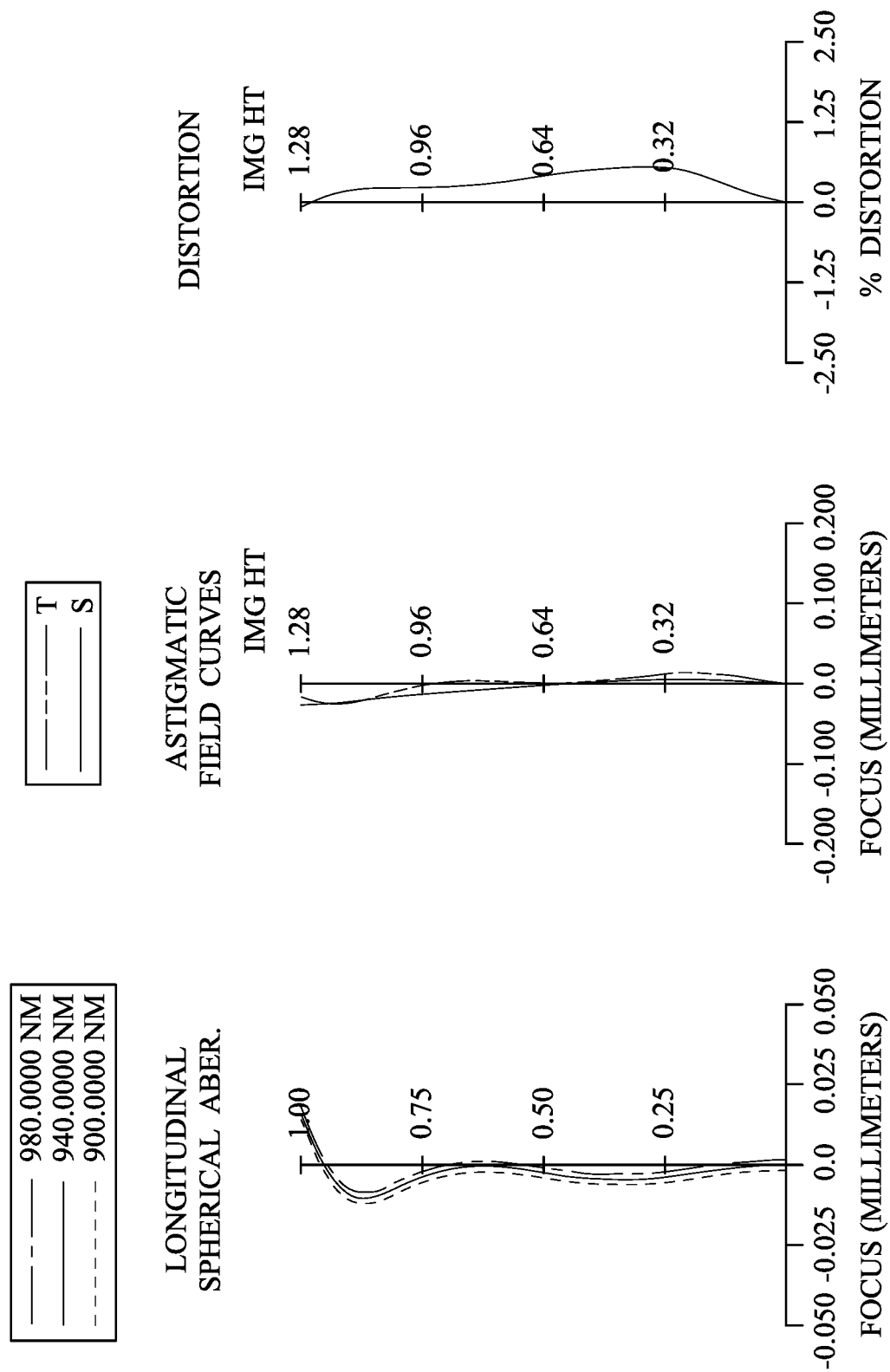
FIG. 12 shows spherical aberration curves, astigmatic field curves and a distortion curve of the electronic device according to the 6th embodiment.

FIG. 11 is a schematic view of an electronic device according to the 6th embodiment of the present disclosure. FIG. 12 shows spherical aberration curves, astigmatic field curves and a distortion curve of the electronic device according to the 6th embodiment. In FIG. 11, the electronic device includes an optical lens assembly (its reference numeral is omitted), wherein the optical lens assembly includes, in order from an outside to an inside, a first lens element 610, an aperture stop 600, a second lens element 620, a third lens element 630, a fourth lens element 640, a filter 650 and an inside conjugation surface 660. The optical lens assembly includes four lens elements (610, 620, 630 and 640) without additional one or more lens elements inserted between the first lens element 610 and the fourth lens element 640.

The first lens element 610 with positive refractive power has an outside surface 611 being convex in a paraxial region thereof and an inside surface 612 being concave in a paraxial region thereof. The first lens element 610 is made of a plastic material, and has the outside surface 611 and the inside surface 612 being both aspheric.

The second lens element 620 with positive refractive power has an outside surface 621 being concave in a paraxial region thereof and an inside surface 622 being convex in a paraxial region thereof. The second lens element 620 is made of a plastic material, and has the outside surface 621 and the inside surface 622 being both aspheric.

The third lens element 630 with negative refractive power has an outside surface 631 being concave in a paraxial region thereof and an inside surface 632 being convex in a paraxial region thereof. The third lens element 630 is made of a plastic material, and has the outside surface 631 and the inside surface 632 being both aspheric.

The fourth lens element 640 with positive refractive power has an outside surface 641 being convex in a paraxial region thereof and an inside surface 642 being concave in a paraxial region thereof. The fourth lens element 640 is made of a plastic material, and has the outside surface 641 and the inside surface 642 being both aspheric. Furthermore, the inside surface 642 of the fourth lens element 640 includes at least one critical point in an off-axis region thereof.

The filter 650 is made of a glass material and located between the fourth lens element 640 and the inside conjugation surface 660, and will not affect the focal length of the optical lens assembly.

The detailed optical data of the 6th embodiment are shown in Tables 11A and 11B, and the aspheric surface data are shown in Table 12 below.

TABLE 11A

6th Embodiment
f = 1.84 mm, Fno = 2.00, HFOV = 35.0 deg.

| Surface # | | Curvature Radius | | Thickness | Material | Index | Abbe # | Focal Length |
|---|---|---|---|---|---|---|---|---|
| 0 | Outside conjugation surface | Plano | | 1000.000 | | | | |
| 1 | Lens 1 | 0.972 | ASP | 0.344 | Plastic | 1.536 | 56.1 | 5.29 |
| 2 | | 1.295 | ASP | 0.137 | | | | |
| 3 | Ape. Stop | Plano | | 0.122 | | | | |
| 4 | Lens 2 | −4.092 | ASP | 0.745 | Plastic | 1.535 | 56.0 | 2.13 |
| 5 | | −0.948 | ASP | 0.236 | | | | |
| 6 | Lens 3 | −0.313 | ASP | 0.370 | Plastic | 1.535 | 56.0 | −1.62 |
| 7 | | −0.692 | ASP | 0.030 | | | | |
| 8 | Lens 4 | 0.715 | ASP | 0.969 | Plastic | 1.535 | 56.0 | 1.54 |
| 9 | | 2.820 | ASP | 0.500 | | | | |
| 10 | Filter | Plano | | 0.210 | Glass | 1.508 | 64.2 | — |
| 11 | | Plano | | 0.127 | | | | |
| 12 | Inside conjugation surface | Plano | | — | | | | |

Reference wavelength is 940.0 nm.

TABLE 11B

6th Embodiment
fd = 1.80 mm

| Surface # | | Index | Focal Length |
|---|---|---|---|
| 0 | Outside conjugation surface | | |
| 1 | Lens 1 | 1.545 | 5.19 |
| 2 | | | |
| 3 | Ape. Stop | | |
| 4 | Lens 2 | 1.544 | 2.09 |
| 5 | | | |
| 6 | Lens 3 | 1.544 | −1.60 |
| 7 | | | |
| 8 | Lens 4 | 1.544 | 1.52 |
| 9 | | | |
| 10 | Filter | 1.517 | — |
| 11 | | | |
| 12 | Inside conjugation surface | | |

Reference wavelength is 587.6 nm (d-line).

TABLE 12

Aspheric Coefficients

| Surface # | 1 | 2 | 4 | 5 |
|---|---|---|---|---|
| k= | 6.1836E−01 | 4.0166E+00 | −9.7783E+00 | 4.7583E−02 |
| A4= | 1.3739E−01 | −2.8248E−02 | −3.9856E−01 | 9.2090E−02 |
| A6= | 2.0678E−02 | 1.0450E+00 | −3.6645E−01 | −1.2572E+00 |
| A8= | 9.1300E−01 | −8.5701E+00 | 2.6609E+01 | −6.4258E−01 |
| A10= | | | −1.3357E+02 | 1.4704E+01 |
| A12= | | | | −2.9577E+01 |
| A14= | | | | 1.9416E+01 |

TABLE 12-continued

Aspheric Coefficients

| Surface # | 6 | 7 | 8 | 9 |
|---|---|---|---|---|
| k= | −1.8931E+00 | −1.0086E+00 | −3.9034E+00 | −8.4049E−01 |
| A4= | 4.3852E−01 | 3.1018E−01 | −1.0149E−01 | −5.0401E−02 |
| A6= | −9.1531E+00 | −2.1623E+00 | 1.5353E−01 | −1.2050E−01 |
| A8= | 3.4314E+01 | 5.1394E+00 | −1.3382E−01 | 1.9224E−01 |
| A10= | −5.1998E+01 | −4.9759E+00 | 6.1681E−02 | −1.3516E−01 |
| A12= | 3.7372E+01 | 1.8651E+00 | −1.4948E−02 | 4.1994E−02 |
| A14= | −1.0742E+01 | | | −5.0119E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11A, Table 11B and Table 12 as the following values and satisfy the following conditions:

| 6th Embodiment | | | |
|---|---|---|---|
| f [mm] | 1.84 | CT2/CT4 | 0.77 |
| Fno | 2.00 | TD [mm] | 2.95 |
| HFOV [deg.] | 35.0 | TL/IH | 2.95 |
| Nd1 | 1.545 | R1/R2 | 0.75 |
| Vd1 | 56.1 | R2/R7 | 1.81 |
| Vd1/Vd2 | 1.00 | R2/fd | 0.72 |
| Vd1/Vd3 | 1.00 | R8/fd | 1.56 |
| Vd1/Vd4 | 1.00 | fd/fd3 | −1.13 |
| Vd2 | 56.0 | $|fd/fd3| + |fd/fd4|$ | 2.32 |
| Vd3 | 56.0 | $\max(|fd/fd3|, |fd/fd4|)$ | 1.19 |
| Vd4 | 56.0 | $(|1/fd1| + |1/fd2|)/(|1/fd3| + |1/fd4|)$ | 0.52 |
| ΣVd | 224.0 | SL/TL | 0.87 |
| CT1/T12 | 1.33 | | |

7th Embodiment

Figure 13:
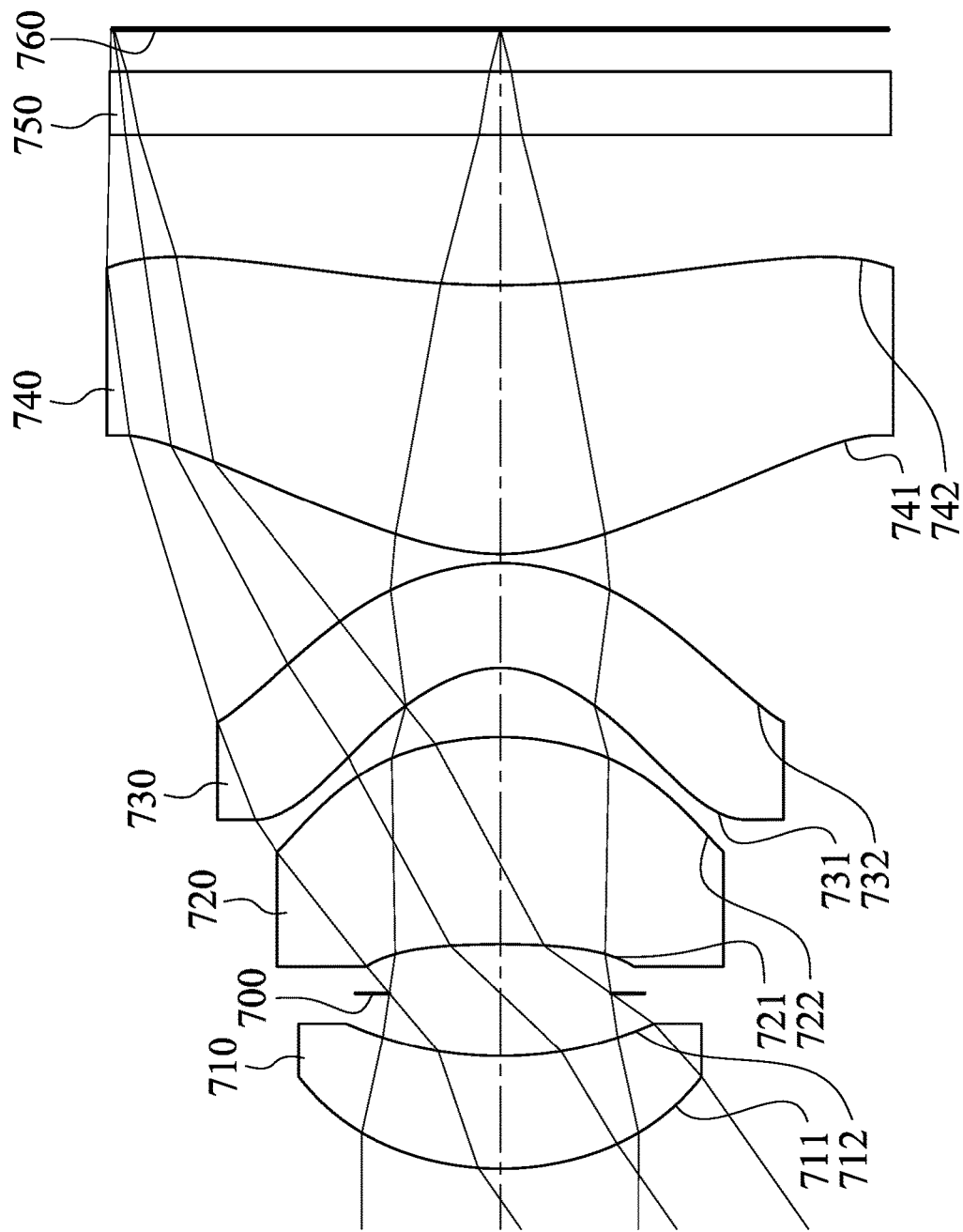
FIG. 13 is a schematic view of an electronic device according to the 7th embodiment of the present disclosure.
Figure 14:
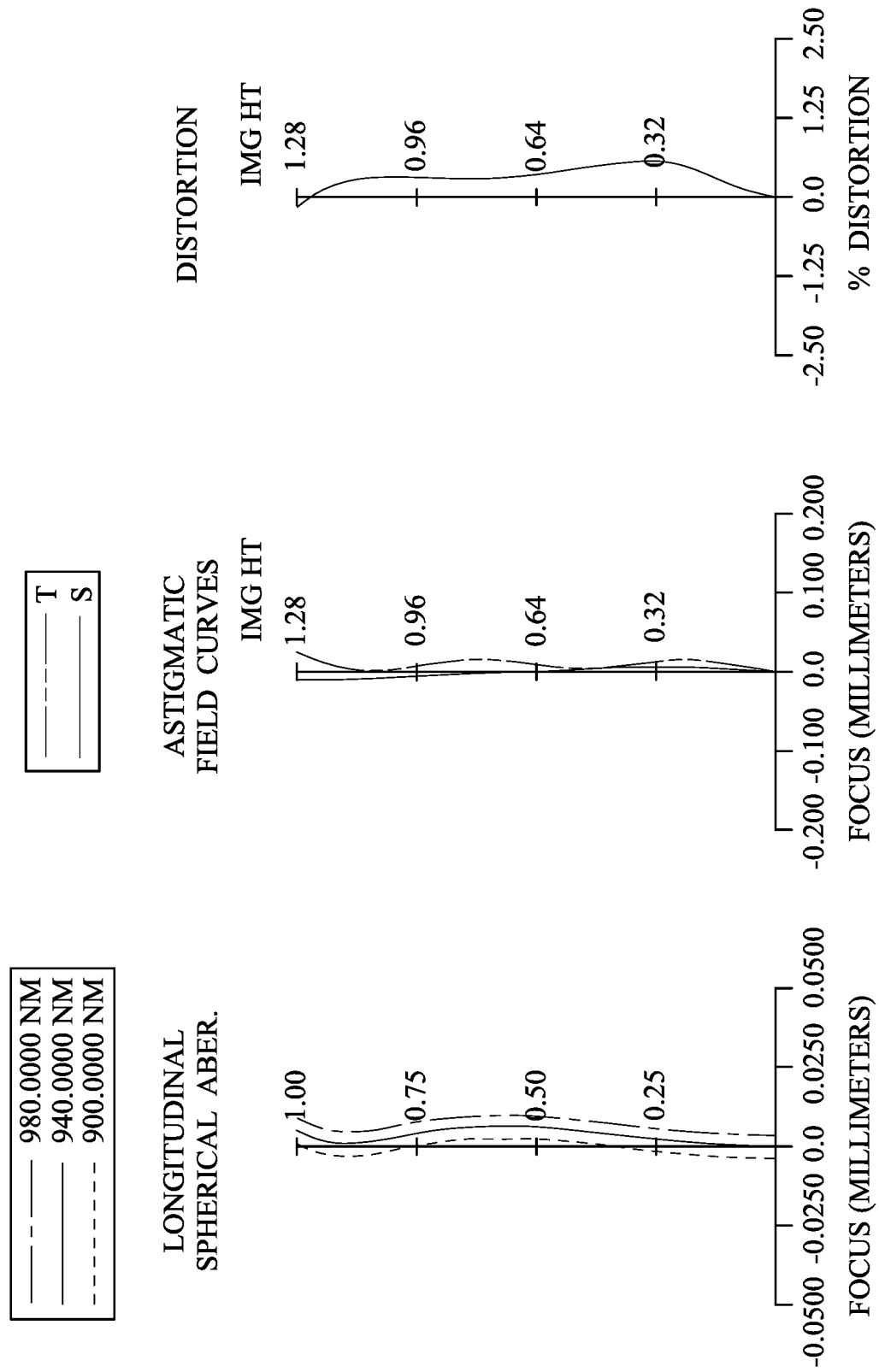
FIG. 14 shows spherical aberration curves, astigmatic field curves and a distortion curve of the electronic device according to the 7th embodiment.

FIG. 13 is a schematic view of an electronic device according to the 7th embodiment of the present disclosure. FIG. 14 shows spherical aberration curves, astigmatic field curves and a distortion curve of the electronic device according to the 7th embodiment. In FIG. 13, the electronic device includes an optical lens assembly (its reference numeral is omitted), wherein the optical lens assembly includes, in order from an outside to an inside, a first lens element 710, an aperture stop 700, a second lens element 720, a third lens element 730, a fourth lens element 740, a filter 750 and an inside conjugation surface 760. The optical lens assembly includes four lens elements (710, 720, 730 and 740) without additional one or more lens elements inserted between the first lens element 710 and the fourth lens element 740.

The first lens element 710 with positive refractive power has an outside surface 711 being convex in a paraxial region thereof and an inside surface 712 being concave in a paraxial region thereof. The first lens element 710 is made of a plastic material, and has the outside surface 711 and the inside surface 712 being both aspheric.

The second lens element 720 with positive refractive power has an outside surface 721 being concave in a paraxial region thereof and an inside surface 722 being convex in a paraxial region thereof. The second lens element 720 is made of a plastic material, and has the outside surface 721 and the inside surface 722 being both aspheric.

The third lens element 730 with negative refractive power has an outside surface 731 being concave in a paraxial region thereof and an inside surface 732 being convex in a paraxial region thereof. The third lens element 730 is made of a plastic material, and has the outside surface 731 and the inside surface 732 being both aspheric.

The fourth lens element 740 with positive refractive power has an outside surface 741 being convex in a paraxial region thereof and an inside surface 742 being concave in a paraxial region thereof. The fourth lens element 740 is made of a plastic material, and has the outside surface 741 and the inside surface 742 being both aspheric. Furthermore, the inside surface 742 of the fourth lens element 740 includes at least one critical point in an off-axis region thereof.

The filter 750 is made of a glass material and located between the fourth lens element 740 and the inside conjugation surface 760, and will not affect the focal length of the optical lens assembly.

The detailed optical data of the 7th embodiment are shown in Tables 13A and 13B, and the aspheric surface data are shown in Table 14 below.

TABLE 13A

7th Embodiment
f = 1.84 mm, Fno = 2.00, HFOV = 35.0 deg.

| Surface # | | Curvature Radius | | Thickness | Material | Index | Abbe # | Focal Length |
|---|---|---|---|---|---|---|---|---|
| 0 | Outside conjugation surface | Plano | | 1000.000 | | | | |
| 1 | Lens 1 | 1.005 | ASP | 0.374 | Plastic | 1.618 | 22.5 | 4.53 |
| 2 | | 1.344 | ASP | 0.209 | | | | |
| 3 | Ape. Stop | Plano | | 0.163 | | | | |
| 4 | Lens 2 | −2.924 | ASP | 0.689 | Plastic | 1.618 | 22.5 | 2.18 |
| 5 | | −1.005 | ASP | 0.229 | | | | |
| 6 | Lens 3 | −0.340 | ASP | 0.347 | Plastic | 1.618 | 22.5 | −1.56 |
| 7 | | −0.730 | ASP | 0.030 | | | | |
| 8 | Lens 4 | 0.778 | ASP | 0.893 | Plastic | 1.618 | 22.5 | 1.47 |
| 9 | | 3.090 | ASP | 0.500 | | | | |
| 10 | Filter | Plano | | 0.210 | Glass | 1.508 | 64.2 | — |
| 11 | | Plano | | 0.140 | | | | |
| 12 | Inside conjugation surface | Plano | | — | | | | |

Reference wavelength is 940.0 nm.

TABLE 13B

7th Embodiment
fd = 1.76 mm

| Surface # | | Index | Focal Length |
|---|---|---|---|
| 0 | Outside conjugation surface | | |
| 1 | Lens 1 | 1.642 | 4.33 |
| 2 | | | |
| 3 | Ape. Stop | | |
| 4 | Lens 2 | 1.642 | 2.09 |
| 5 | | | |
| 6 | Lens 3 | 1.642 | −1.52 |
| 7 | | | |
| 8 | Lens 4 | 1.642 | 1.41 |
| 9 | | | |
| 10 | Filter | 1.517 | — |
| 11 | | | |
| 12 | Inside conjugation surface | | |

Reference wavelength is 587.6 nm (d-line).

TABLE 14

Aspheric Coefficients

| Surface # | 1 | 2 | 4 | 5 |
|---|---|---|---|---|
| k= | −5.9630E−01 | 3.5943E+00 | −3.3220E+00 | 3.6458E−02 |
| A4= | 2.0767E−01 | −3.4294E−02 | −5.8724E−01 | −9.8875E−02 |
| A6= | 1.8033E−01 | 1.6371E−01 | −1.0831E+00 | −8.7868E−01 |
| A8= | 3.7078E−01 | −3.4760E+00 | 8.8810E−02 | −2.4206E+00 |
| A10= | | | −3.5630E+01 | 1.9241E+01 |
| A12= | | | | −3.5364E+01 |
| A14= | | | | 2.3156E+01 |

TABLE 14-continued

| Aspheric Coefficients | | | | |
|---|---|---|---|---|
| Surface # | 6 | 7 | 8 | 9 |
| k= | −1.9412E+00 | −9.9475E−01 | −4.5839E+00 | 3.8486E−01 |
| A4= | 4.7519E−01 | 2.8880E−01 | −7.3312E−02 | −4.6224E−02 |
| A6= | −9.5533E+00 | −2.0738E+00 | 9.1987E−02 | −1.4985E−01 |
| A8= | 3.6391E+01 | 5.2460E+00 | −5.5296E−02 | 2.5475E−01 |
| A10= | −5.8023E+01 | −5.3727E+00 | 1.1194E−02 | −1.9055E−01 |
| A12= | 4.4998E+01 | 2.0601E+00 | −1.9353E−03 | 6.4120E−02 |
| A14= | −1.4167E+01 | | | −8.2200E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13A, Table 13B and Table 14 as the following values and satisfy the following conditions:

| 7th Embodiment | |
|---|---|
| f [mm] | 1.84 |
| Fno | 2.00 |
| HFOV [deg.] | 35.0 |
| Nd1 | 1.642 |
| Vd1 | 22.5 |
| Vd1/Vd2 | 1.00 |
| Vd1/Vd3 | 1.00 |
| Vd1/Vd4 | 1.00 |
| Vd2 | 22.5 |
| Vd3 | 22.5 |
| Vd4 | 22.5 |
| ΣVd | 89.9 |
| CT1/T12 | 1.01 |
| CT2/CT4 | 0.77 |
| TD [mm] | 2.93 |
| TL/IH | 2.94 |
| R1/R2 | 0.75 |
| R2/R7 | 1.73 |
| R2/fd | 0.76 |
| R8/fd | 1.75 |
| fd/fd3 | −1.16 |
| \|fd/fd3\| + \|fd/fd4\| | 2.41 |
| max(\|fd/fd3\|, \|fd/fd4\|) | 1.25 |
| (\|1/fd1\| + \|1/fd2\|)/(\|1/fd3\| + \|1/fd4\|) | 0.52 |
| SL/TL | 0.85 |

8th Embodiment

Figure 15:
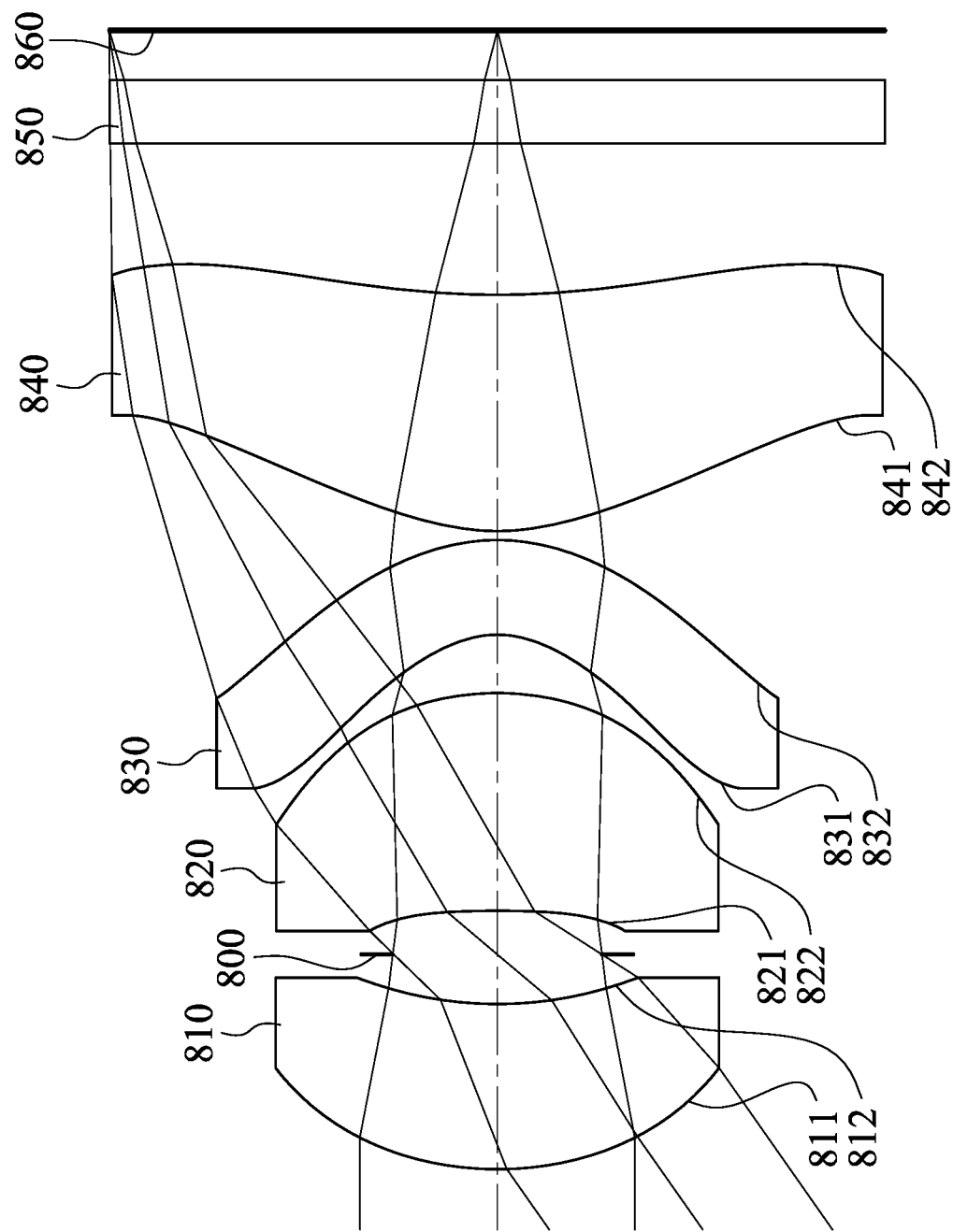
FIG. 15 is a schematic view of an electronic device according to the 8th embodiment of the present disclosure.
Figure 16:
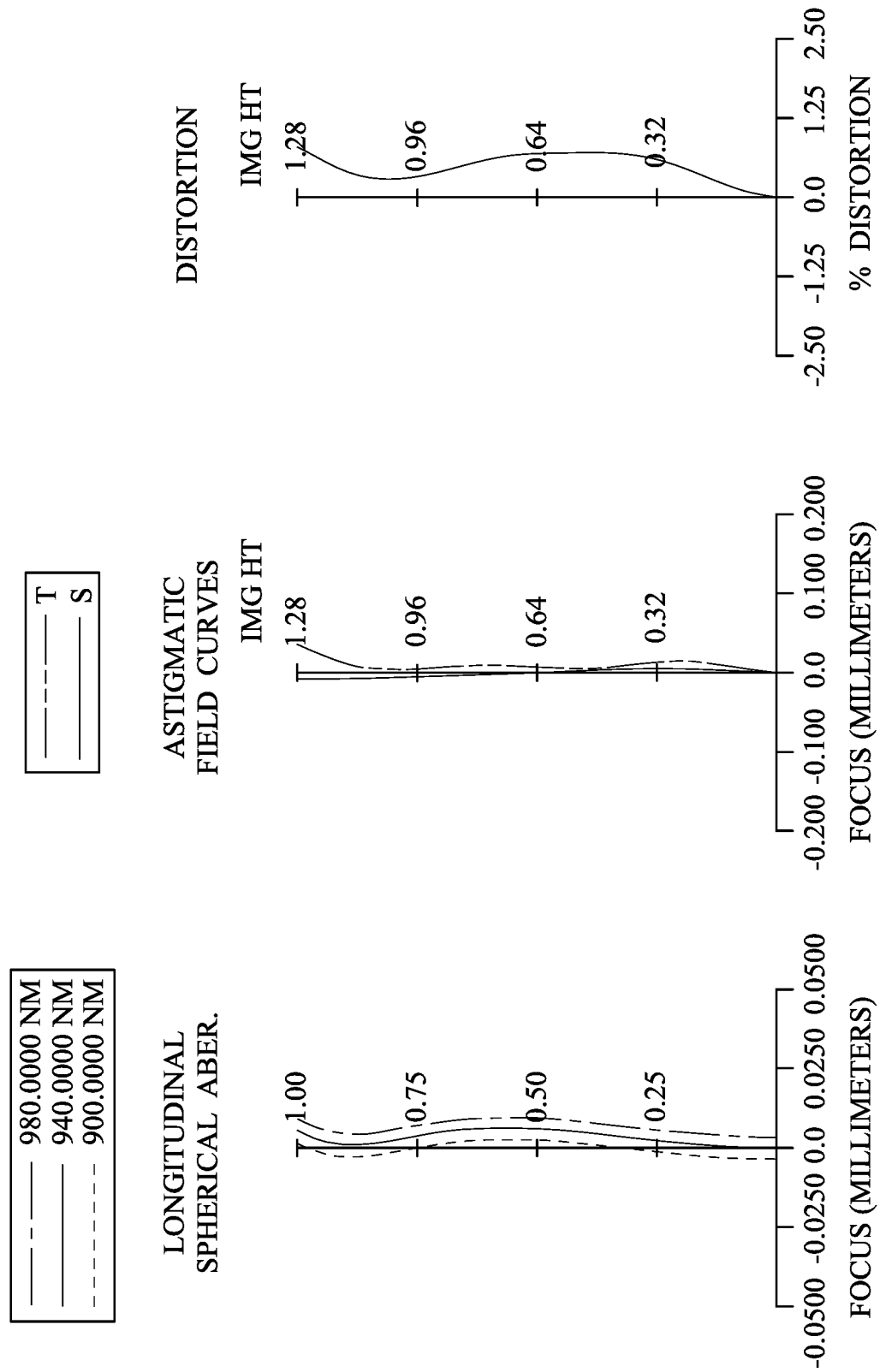
FIG. 16 shows spherical aberration curves, astigmatic field curves and a distortion curve of the electronic device according to the 8th embodiment.

FIG. 15 is a schematic view of an electronic device according to the 8th embodiment of the present disclosure. FIG. 16 shows spherical aberration curves, astigmatic field curves and a distortion curve of the electronic device according to the 8th embodiment. In FIG. 15, the electronic device includes an optical lens assembly (its reference numeral is omitted), wherein the optical lens assembly includes, in order from an outside to an inside, a first lens element 810, an aperture stop 800, a second lens element 820, a third lens element 830, a fourth lens element 840, a filter 850 and an inside conjugation surface 860. The optical lens assembly includes four lens elements (810, 820, 830 and 840) without additional one or more lens elements inserted between the first lens element 810 and the fourth lens element 840.

The first lens element 810 with positive refractive power has an outside surface 811 being convex in a paraxial region thereof and an inside surface 812 being concave in a paraxial region thereof. The first lens element 810 is made of a plastic material, and has the outside surface 811 and the inside surface 812 being both aspheric.

The second lens element 820 with positive refractive power has an outside surface 821 being concave in a paraxial region thereof and an inside surface 822 being convex in a paraxial region thereof. The second lens element 820 is made of a plastic material, and has the outside surface 821 and the inside surface 822 being both aspheric.

The third lens element 830 with negative refractive power has an outside surface 831 being concave in a paraxial region thereof and an inside surface 832 being convex in a paraxial region thereof. The third lens element 830 is made of a plastic material, and has the outside surface 831 and the inside surface 832 being both aspheric.

The fourth lens element 840 with positive refractive power has an outside surface 841 being convex in a paraxial region thereof and an inside surface 842 being concave in a paraxial region thereof. The fourth lens element 840 is made of a plastic material, and has the outside surface 841 and the inside surface 842 being both aspheric. Furthermore, the inside surface 842 of the fourth lens element 840 includes at least one critical point in an off-axis region thereof.

The filter 850 is made of a glass material and located between the fourth lens element 840 and the inside conjugation surface 860, and will not affect the focal length of the optical lens assembly.

The detailed optical data of the 8th embodiment are shown in Tables 15A and 15B, and the aspheric surface data are shown in Table 16 below.

TABLE 15A

8th Embodiment
f = 1.82 mm, Fno = 2.00, HFOV = 35.0 deg.

| Surface # | | Curvature Radius | | Thickness | Material | Index | Abbe # | Length |
|---|---|---|---|---|---|---|---|---|
| 0 | Outside conjugation surface | Plano | | 1000.000 | | | | |
| 1 | Lens 1 | 1.086 | ASP | 0.547 | Plastic | 1.634 | 20.4 | 5.12 |
| 2 | | 1.313 | ASP | 0.164 | | | | |
| 3 | Ape. Stop | Plano | | 0.145 | | | | |
| 4 | Lens 2 | −2.887 | ASP | 0.720 | Plastic | 1.617 | 23.5 | 1.88 |
| 5 | | −0.908 | ASP | 0.193 | | | | |
| 6 | Lens 3 | −0.334 | ASP | 0.313 | Plastic | 1.634 | 20.4 | −1.60 |
| 7 | | −0.679 | ASP | 0.030 | | | | |

TABLE 15A-continued

8th Embodiment
f = 1.82 mm, Fno = 2.00, HFOV = 35.0 deg.

| Surface # | | Curvature Radius | | Thickness | Material | Index | Abbe # | Length |
|---|---|---|---|---|---|---|---|---|
| 8 | Lens 4 | 0.774 | ASP | 0.782 | Plastic | 1.617 | 23.5 | 1.50 |
| 9 | | 2.881 | ASP | 0.500 | | | | |
| 10 | Filter | Plano | | 0.210 | Glass | 1.508 | 64.2 | — |
| 11 | | Plano | | 0.164 | | | | |
| 12 | Inside conjugation surface | Plano | | — | | | | |

Reference wavelength is 940.0 nm.
Effective radius of Surface 5 is 0.730 mm.

TABLE 15B

8th Embodiment
fd = 1.76 mm

| Surface # | | Index | Focal Length |
|---|---|---|---|
| 0 | Outside conjugation surface | | |
| 1 | Lens 1 | 1.660 | 4.86 |
| 2 | | | |
| 3 | Ape. Stop | | |
| 4 | Lens 2 | 1.639 | 1.82 |
| 5 | | | |
| 6 | Lens 3 | 1.660 | −1.56 |
| 7 | | | |
| 8 | Lens 4 | 1.639 | 1.45 |
| 9 | | | |
| 10 | Filter | 1.517 | — |
| 11 | | | |
| 12 | Inside conjugation surface | | |

Reference wavelength is 587.6 nm (d-line).

TABLE 16

Aspheric Coefficients

| | Surface # | | |
|---|---|---|---|
| 1 | 2 | 4 | 5 |
| k= −1.1773E+00 | 4.2787E+00 | 1.4436E+01 | −1.6411E−02 |
| A4= 2.0869E−01 | −9.8939E−02 | −5.5609E−01 | −2.3617E−01 |
| A6= 1.0093E−01 | −1.6956E−01 | −1.1558E+00 | 1.5467E−01 |
| A8= 1.9955E−01 | −4.9746E+00 | −1.9035E−02 | −6.1069E+00 |
| A10= | | −5.5220E+01 | 2.7565E+01 |
| A12= | | | −4.7288E+01 |
| A14= | | | 2.9985E+01 |

| | Surface # | | |
|---|---|---|---|
| 6 | 7 | 8 | 9 |
| k= −2.0087E+00 | −1.0909E+00 | −5.3036E+00 | −1.3323E+00 |
| A4= −1.8137E−01 | 2.0326E−01 | 3.6630E−02 | −4.0908E−02 |
| A6= −3.4733E+00 | −9.9821E−01 | −3.8820E−02 | −2.4040E−02 |
| A8= 1.4158E+01 | 2.6426E−01 | −2.5734E−02 | −4.7867E−02 |
| A10= −1.8049E+01 | −2.9200E+00 | 3.7060E−02 | 7.1935E−02 |
| A12= 9.0815E+00 | 1.2296E+00 | −1.3734E−02 | −3.5434E−02 |
| A14= −1.2211E+00 | | | 5.6570E−03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15A, Table 15B and Table 16 as the following values and satisfy the following conditions:

| 8th Embodiment | |
|---|---|
| f [mm] | 1.82 |
| Fno | 2.00 |
| HFOV [deg.] | 35.0 |
| Nd1 | 1.660 |
| Vd1 | 20.4 |
| Vd1/Vd2 | 0.87 |
| Vd1/Vd3 | 1.00 |
| Vd1/Vd4 | 0.87 |
| Vd2 | 23.5 |
| Vd3 | 20.4 |
| Vd4 | 23.5 |
| ΣVd | 87.8 |
| CT1/T12 | 1.77 |
| CT2/CT4 | 0.92 |
| TD [mm] | 2.89 |
| TL/IH | 2.93 |
| R1/R2 | 0.83 |
| R2/R7 | 1.70 |
| R2/fd | 0.75 |
| R8/fd | 1.64 |
| fd/fd3 | −1.13 |
| \|fd/fd3\| + \|fd/fd4\| | 2.34 |
| max(\|fd/fd3\|, \|fd/fd4\|) | 1.22 |
| (\|1/fd1\| + \|1/fd2\|)/(\|1/fd3\| + \|1/fd4\|) | 0.57 |
| SL/TL | 0.81 |

9th Embodiment

Figure 17:
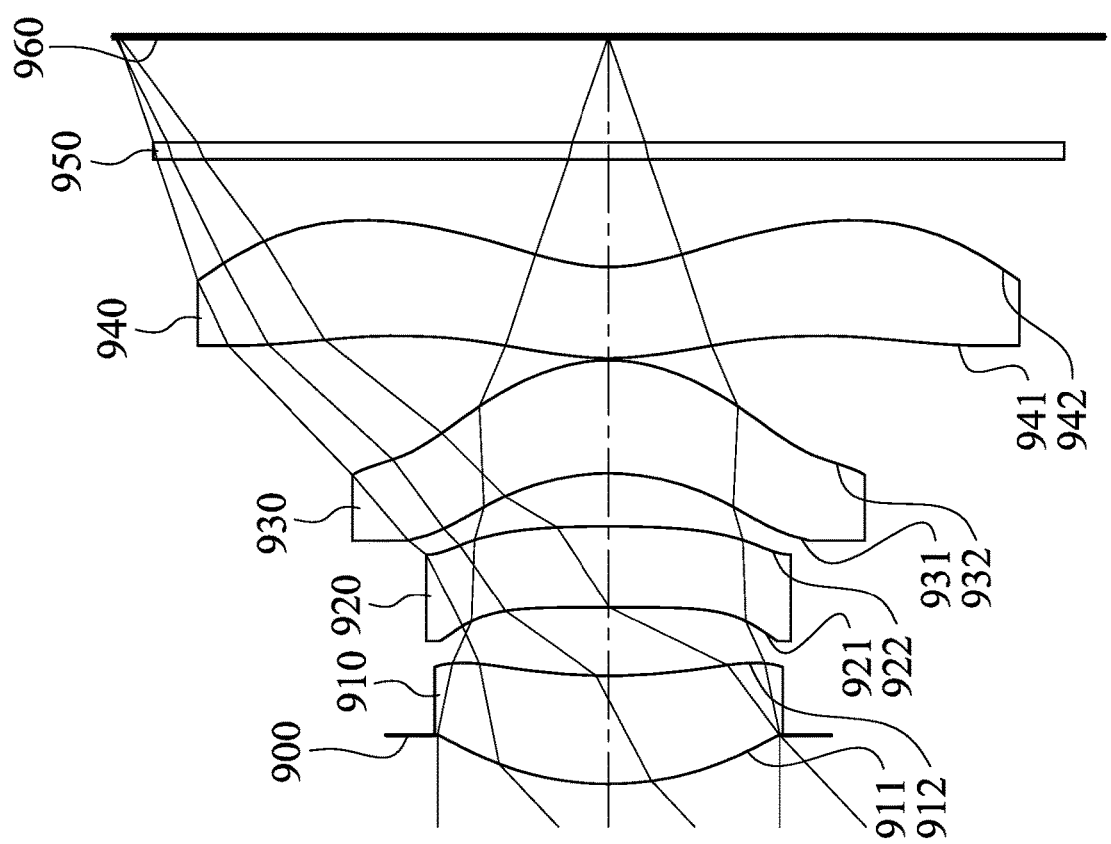
FIG. 17 is a schematic view of an electronic device according to the 9th embodiment of the present disclosure.
Figure 18:
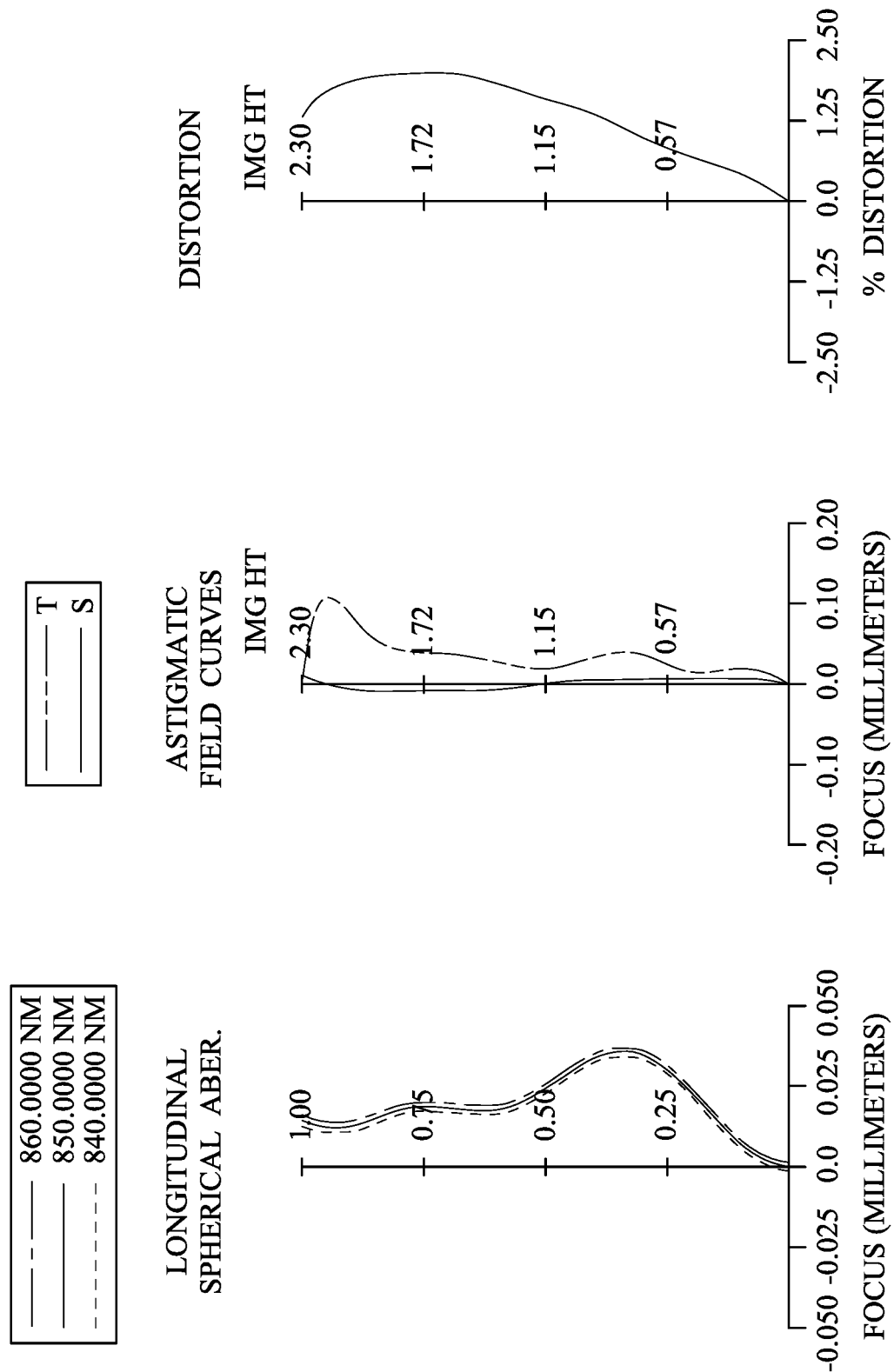
FIG. 18 shows spherical aberration curves, astigmatic field curves and a distortion curve of the electronic device according to the 9th embodiment.

FIG. 17 is a schematic view of an electronic device according to the 9th embodiment of the present disclosure. FIG. 18 shows spherical aberration curves, astigmatic field curves and a distortion curve of the electronic device according to the 9th embodiment. In FIG. 17, the electronic device includes an optical lens assembly (its reference numeral is omitted), wherein the optical lens assembly includes, in order from an outside to an inside, an aperture stop 900, a first lens element 910, a second lens element 920, a third lens element 930, a fourth lens element 940, a filter 950 and an inside conjugation surface 960. The optical lens assembly includes four lens elements (910, 920, 930 and 940) without additional one or more lens elements inserted between the first lens element 910 and the fourth lens element 940.

The first lens element 910 with positive refractive power has an outside surface 911 being convex in a paraxial region thereof and an inside surface 912 being concave in a paraxial region thereof. The first lens element 910 is made of a glass material, and has the outside surface 911 and the inside surface 912 being both aspheric.

The second lens element 920 with positive refractive power has an outside surface 921 being convex in a paraxial region thereof and an inside surface 922 being convex in a paraxial region thereof. The second lens element 920 is made of a plastic material, and has the outside surface 921 and the inside surface 922 being both aspheric.

The third lens element 930 with positive refractive power has an outside surface 931 being concave in a paraxial region thereof and an inside surface 932 being convex in a paraxial region thereof. The third lens element 930 is made of a plastic material, and has the outside surface 931 and the inside surface 932 being both aspheric.

The fourth lens element 940 with negative refractive power has an outside surface 941 being convex in a paraxial region thereof and an inside surface 942 being concave in a paraxial region thereof. The fourth lens element 940 is made of a plastic material, and has the outside surface 941 and the inside surface 942 being both aspheric. Furthermore, each of the outside surface 941 and the inside surface 942 of the fourth lens element 940 includes at least one critical point in an off-axis region thereof.

The filter 950 is made of a glass material and located between the fourth lens element 940 and the inside conjugation surface 960, and will not affect the focal length of the optical lens assembly.

The detailed optical data of the 9th embodiment are shown in Tables 17A and 17B, and the aspheric surface data are shown in Table 18 below.

TABLE 17A

9th Embodiment
f = 2.41 mm, Fno = 1.51, HFOV = 43.2 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Ape. Stop | Plano | | −0.228 | | | | |
| 2 | Lens 1 | 1.436 | ASP | 0.505 | Glass | 1.704 | 29.2 | 3.67 |
| 3 | | 2.759 | ASP | 0.318 | | | | |
| 4 | Lens 2 | 203.542 | ASP | 0.380 | Plastic | 1.637 | 20.4 | 9.52 |
| 5 | | −6.252 | ASP | 0.248 | | | | |
| 6 | Lens 3 | −1.025 | ASP | 0.525 | Plastic | 1.619 | 23.3 | 3.06 |
| 7 | | −0.795 | ASP | 0.010 | | | | |
| 8 | Lens 4 | 1.384 | ASP | 0.428 | Plastic | 1.629 | 21.8 | −4.47 |
| 9 | | 0.817 | ASP | 0.500 | | | | |
| 10 | Filter | Plano | | 0.080 | Glass | 1.510 | 64.2 | — |
| 11 | | Plano | | 0.493 | | | | |
| 12 | Inside conjugation surface | Plano | | — | | | | |

Reference wavelength is 850.0 nm.
Effective radius of Surface 5 is 0.850 mm

TABLE 17B

9th Embodiment
fd = 2.33 mm

| Surface # | | Index | Focal Length |
|---|---|---|---|
| 0 | Outside conjugation surface | | |
| 1 | Ape. Stop | | |
| 2 | Lens 1 | 1.722 | 3.57 |
| 3 | | | |
| 4 | Lens 2 | 1.660 | 9.20 |
| 5 | | | |
| 6 | Lens 3 | 1.639 | 2.94 |
| 7 | | | |
| 8 | Lens 4 | 1.650 | −4.37 |
| 9 | | | |
| 10 | Filter | 1.517 | — |
| 11 | | | |
| 12 | Inside conjugation surface | | |

Reference wavelength is 587.6 nm (d-line).

TABLE 18

Aspheric Coefficients

| | Surface # | | | |
|---|---|---|---|---|
| | 2 | 3 | 4 | 5 |
| k= | −1.3343E+00 | 6.3565E+00 | −8.9972E+01 | −4.8494E+01 |
| A4= | 3.5787E−02 | −4.9881E−02 | −3.0267E−01 | −9.6327E−02 |
| A6= | 1.7787E−01 | −4.0814E−01 | 6.2513E−01 | −9.2262E−01 |
| A8= | −6.5441E−01 | 1.5443E+00 | −6.3569E+00 | 3.3913E+00 |
| A10= | 1.0055E+00 | −5.2769E+00 | 2.5668E+01 | −8.7653E+00 |
| A12= | −5.4588E−01 | 8.1632E+00 | −6.5289E+01 | 1.2365E+01 |
| A14= | −1.7034E−01 | −6.6066E+00 | 8.7135E+01 | −7.0062E+00 |
| A16= | | 2.2806E+00 | −4.4184E+01 | 1.0664E+00 |

TABLE 18-continued

Aspheric Coefficients

| | Surface # | | | |
|---|---|---|---|---|
| | 6 | 7 | 8 | 9 |
| k= | 1.1219E−01 | −6.1301E+00 | −7.0290E−01 | −5.2049E+00 |
| A4= | 5.4399E−01 | −9.7256E−01 | −5.8326E−01 | −2.3673E−01 |
| A6= | −2.5780E+00 | 2.7659E+00 | 5.7715E−01 | 2.0545E−01 |
| A8= | 8.7026E+00 | −6.3750E+00 | −4.0796E−01 | −1.2917E−01 |
| A10= | −1.8769E+01 | 9.7826E+00 | 1.8578E−01 | 5.1537E−02 |
| A12= | 2.8770E+01 | −8.3215E+00 | −5.1432E−02 | −1.2748E−02 |
| A14= | −2.4759E+01 | 3.5985E+00 | 7.8871E−03 | 1.7819E−03 |

TABLE 18-continued

Aspheric Coefficients

| A16= | 8.7402E+00 | −6.2474E−01 | −5.1549E−04 | −1.0640E−04 |
|---|---|---|---|---|

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17A, Table 17B and Table 18 as the following values and satisfy the following conditions:

| 9th Embodiment | |
|---|---|
| f [mm] | 2.41 |
| Fno | 1.51 |
| HFOV [deg.] | 43.2 |
| Nd1 | 1.722 |
| Vd1 | 29.2 |
| Vd1/Vd2 | 1.43 |
| Vd1/Vd3 | 1.26 |
| Vd1/Vd4 | 1.34 |
| Vd2 | 20.4 |
| Vd3 | 23.3 |
| Vd4 | 21.8 |
| ΣVd | 94.7 |
| CT1/T12 | 1.59 |
| CT2/CT4 | 0.89 |
| TD [mm] | 2.41 |
| TL/IH | 1.52 |
| R1/R2 | 0.52 |
| R2/R7 | 1.99 |
| R2/fd | 1.18 |
| R8/fd | 0.35 |
| fd/fd3 | 0.79 |
| \|fd/fd3\| + \|fd/fd4\| | 1.33 |
| max(\|fd/fd3\|, \|fd/fd4\|) | 0.79 |
| (\|1/fd1\| + \|1/fd2\|)/(\|1/fd3\| + \|1/fd4\|) | 0.68 |
| SL/TL | 0.93 |

10th Embodiment

Figure 19:
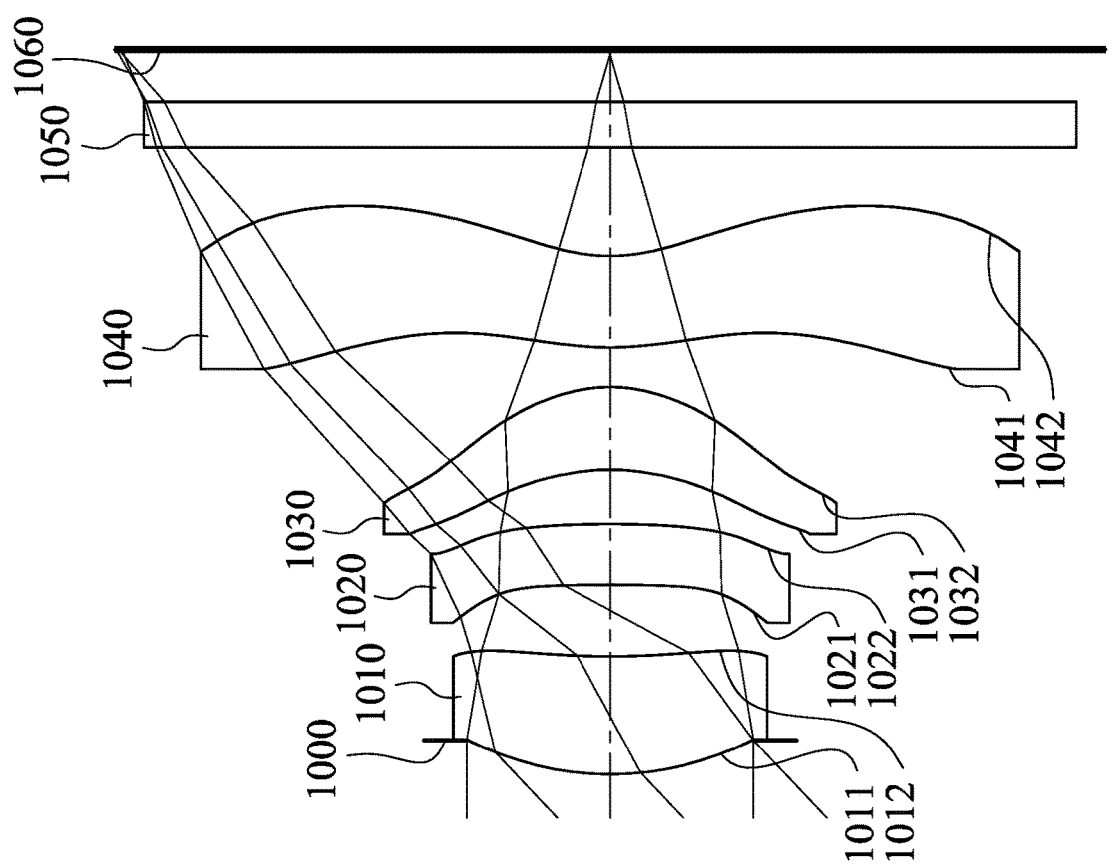
FIG. 19 is a schematic view of an electronic device according to the 10th embodiment of the present disclosure.
Figure 20:
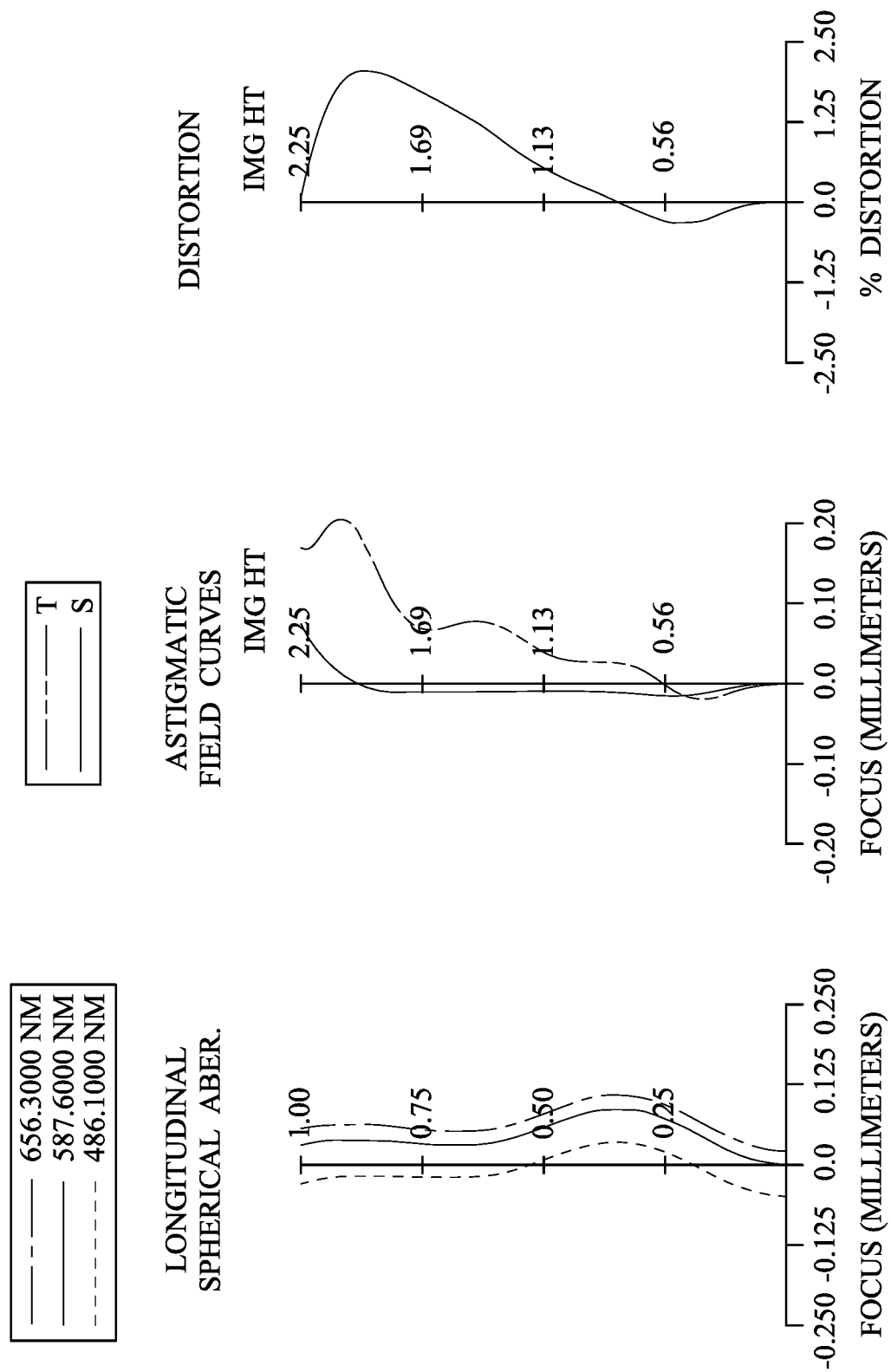
FIG. 20 shows spherical aberration curves, astigmatic field curves and a distortion curve of the electronic device according to the 10th embodiment.

FIG. 19 is a schematic view of an electronic device according to the 10th embodiment of the present disclosure. FIG. 20 shows spherical aberration curves, astigmatic field curves and a distortion curve of the electronic device according to the 10th embodiment. In FIG. 19, the electronic device includes an optical lens assembly (its reference numeral is omitted), wherein the optical lens assembly includes, in order from an outside to an inside, an aperture stop 1000, a first lens element 1010, a second lens element 1020, a third lens element 1030, a fourth lens element 1040, a filter 1050 and an inside conjugation surface 1060. The optical lens assembly includes four lens elements (1010, 1020, 1030 and 1040) without additional one or more lens elements inserted between the first lens element 1010 and the fourth lens element 1040.

The first lens element 1010 with positive refractive power has an outside surface 1011 being convex in a paraxial region thereof and an inside surface 1012 being concave in a paraxial region thereof. The first lens element 1010 is made of a plastic material, and has the outside surface 1011 and the inside surface 1012 being both aspheric.

The second lens element 1020 with positive refractive power has an outside surface 1021 being concave in a paraxial region thereof and an inside surface 1022 being convex in a paraxial region thereof. The second lens element 1020 is made of a plastic material, and has the outside surface 1021 and the inside surface 1022 being both aspheric.

The third lens element 1030 with positive refractive power has an outside surface 1031 being concave in a paraxial region thereof and an inside surface 1032 being convex in a paraxial region thereof. The third lens element 1030 is made of a plastic material, and has the outside surface 1031 and the inside surface 1032 being both aspheric.

The fourth lens element 1040 with negative refractive power has an outside surface 1041 being convex in a paraxial region thereof and an inside surface 1042 being concave in a paraxial region thereof. The fourth lens element 1040 is made of a plastic material, and has the outside surface 1041 and the inside surface 1042 being both aspheric. Furthermore, each of the outside surface 1041 and the inside surface 1042 of the fourth lens element 1040 includes at least one critical point in an off-axis region thereof.

The filter 1050 is made of a glass material and located between the fourth lens element 1040 and the inside conjugation surface 1060, and will not affect the focal length of the optical lens assembly.

The detailed optical data of the 10th embodiment are shown in Table 19, and the aspheric surface data are shown in Table 20 below.

TABLE 19

10th Embodiment
f = 2.36 mm, Fno = 1.80, HFOV = 43.4 deg.

| Surface # | | Curvature Radius | Thickness | Material | Index | Abbe # | Focal Length |
|---|---|---|---|---|---|---|---|
| 0 | Outside conjugation surface | Plano | Infinity | | | | |
| 1 | Ape. Stop | Plano | −0.156 | | | | |
| 2 | Lens 1 | 1.350 ASP | 0.542 | Plastic | 1.584 | 28.2 | 3.32 |
| 3 | | 3.785 ASP | 0.328 | | | | |
| 4 | Lens 2 | −16.605 ASP | 0.278 | Plastic | 1.656 | 21.3 | 13.10 |
| 5 | | −5.700 ASP | 0.249 | | | | |
| 6 | Lens 3 | −1.013 ASP | 0.380 | Plastic | 1.582 | 30.2 | 3.09 |
| 7 | | −0.738 ASP | 0.182 | | | | |
| 8 | Lens 4 | 1.467 ASP | 0.418 | Plastic | 1.688 | 18.7 | −3.11 |

TABLE 19-continued

10th Embodiment
f = 2.36 mm, Fno = 1.80, HFOV = 43.4 deg.

| Surface # | | Curvature Radius | | Thickness | Material | Index | Abbe # | Focal Length |
|---|---|---|---|---|---|---|---|---|
| 9 | | 0.769 | ASP | 0.500 | | | | |
| 10 | Filter | Plano | | 0.210 | Glass | 1.517 | 64.2 | — |
| 11 | | Plano | | 0.240 | | | | |
| 12 | Inside conjugation surface | Plano | | — | | | | |

Reference wavelength is 587.6 nm (d-line).
Effective radius of Surface 5 is 0.820 mm.

TABLE 20

Aspheric Coefficients

| | Surface # | | | |
|---|---|---|---|---|
| | 2 | 3 | 4 | 5 |
| k= | −1.5044E+00 | 1.0265E+01 | −9.0000E+01 | −3.2215E+01 |
| A4= | −1.3187E−01 | 3.4223E−02 | −5.6092E−01 | −1.7913E−01 |
| A6= | 2.1246E+00 | −2.0348E+00 | 2.1196E+00 | −9.4201E−01 |
| A8= | −1.2215E+01 | 1.0763E+01 | −1.7129E+01 | 6.7388E+00 |
| A10= | 3.6256E+01 | −3.4036E+01 | 6.8427E+01 | −2.7628E+01 |
| A12= | −5.4434E+01 | 5.0385E+01 | −1.8863E+02 | 5.4795E+01 |
| A14= | 3.2161E+01 | −2.5618E+01 | 2.9953E+02 | −4.9509E+01 |
| A16= | | −4.8799E+00 | −1.8799E+02 | 1.7088E+01 |

| | Surface # | | | |
|---|---|---|---|---|
| | 6 | 7 | 8 | 9 |
| k= | 9.5516E−02 | −5.5201E+00 | −6.7958E−01 | −4.3677E+00 |
| A4= | 6.6544E−01 | −1.2236E+00 | −6.3155E−01 | −2.9848E−01 |
| A6= | −3.3468E+00 | 4.0302E+00 | 5.2657E−01 | 2.8322E−01 |
| A8= | 1.2778E+01 | −1.1278E+01 | −2.9289E−01 | −1.8577E−01 |
| A10= | −2.9710E+01 | 1.9944E+01 | 1.0103E−01 | 7.8158E−02 |
| A12= | 4.5635E+01 | −1.8696E+01 | −1.9624E−02 | −1.9985E−02 |
| A14= | −3.9054E+01 | 8.5520E+00 | 1.8249E−03 | 2.7788E−03 |
| A16= | 1.3730E+01 | −1.5038E+00 | −5.0883E−05 | −1.5954E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | |
|---|---|
| f [mm] | 2.36 |
| Fno | 1.80 |
| HFOV [deg.] | 43.4 |
| Nd1 | 1.584 |
| Vd1 | 28.2 |
| Vd1/Vd2 | 1.33 |
| Vd1/Vd3 | 0.93 |
| Vd1/Vd4 | 1.51 |
| Vd2 | 21.3 |
| Vd3 | 30.2 |
| Vd4 | 18.7 |
| ΣVd | 98.4 |
| CT1/T12 | 1.65 |
| CT2/CT4 | 0.67 |
| TD [mm] | 2.38 |

-continued

| 10th Embodiment | |
|---|---|
| TL/IH | 1.47 |
| R1/R2 | 0.36 |
| R2/R7 | 2.58 |
| R2/fd | 1.60 |
| R8/fd | 0.33 |
| fd/fd3 | 0.76 |
| $\|fd/fd3\| + \|fd/fd4\|$ | 1.52 |
| $\max(\|fd/fd3\|, \|fd/fd4\|)$ | 0.76 |
| $(\|1/fd1\| + \|1/fd2\|)/(\|1/fd3\| + \|1/fd4\|)$ | 0.59 |
| SL/TL | 0.95 |

11th Embodiment

Figure 21:
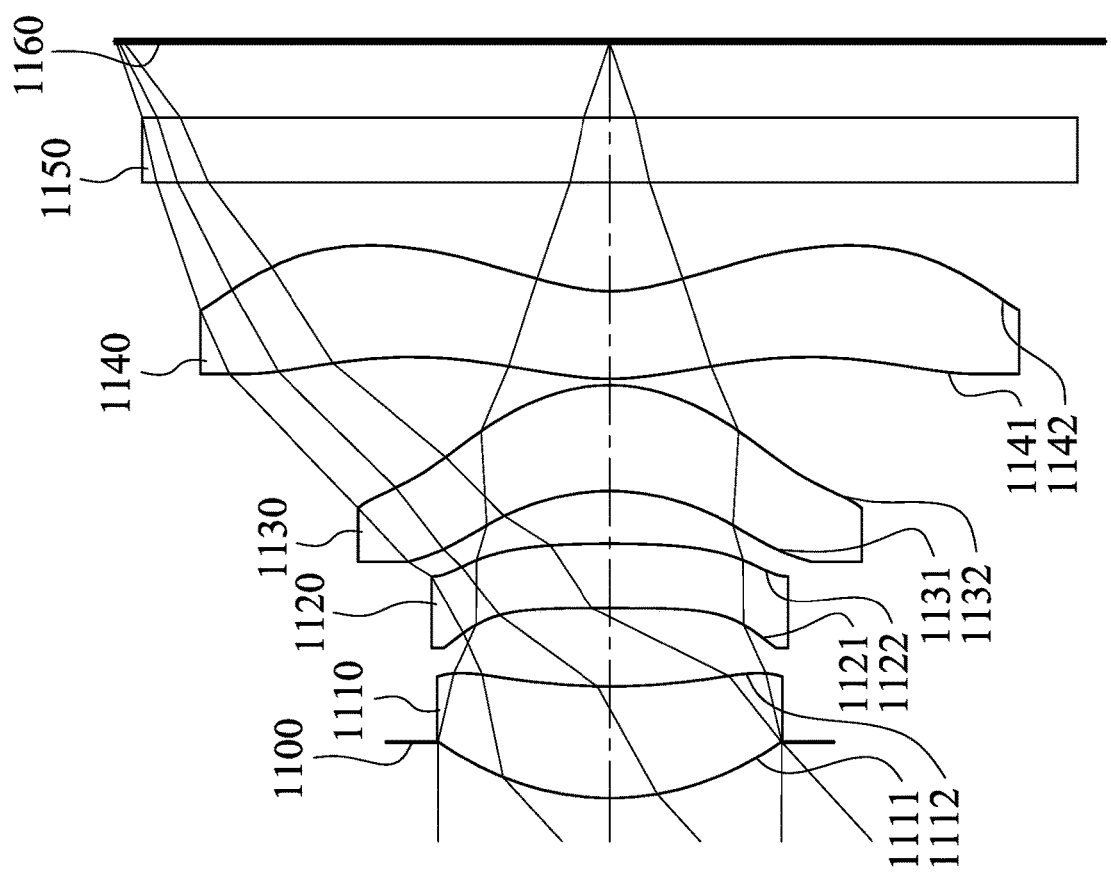
FIG. 21 is a schematic view of an electronic device according to the 11th embodiment of the present disclosure.
Figure 22:
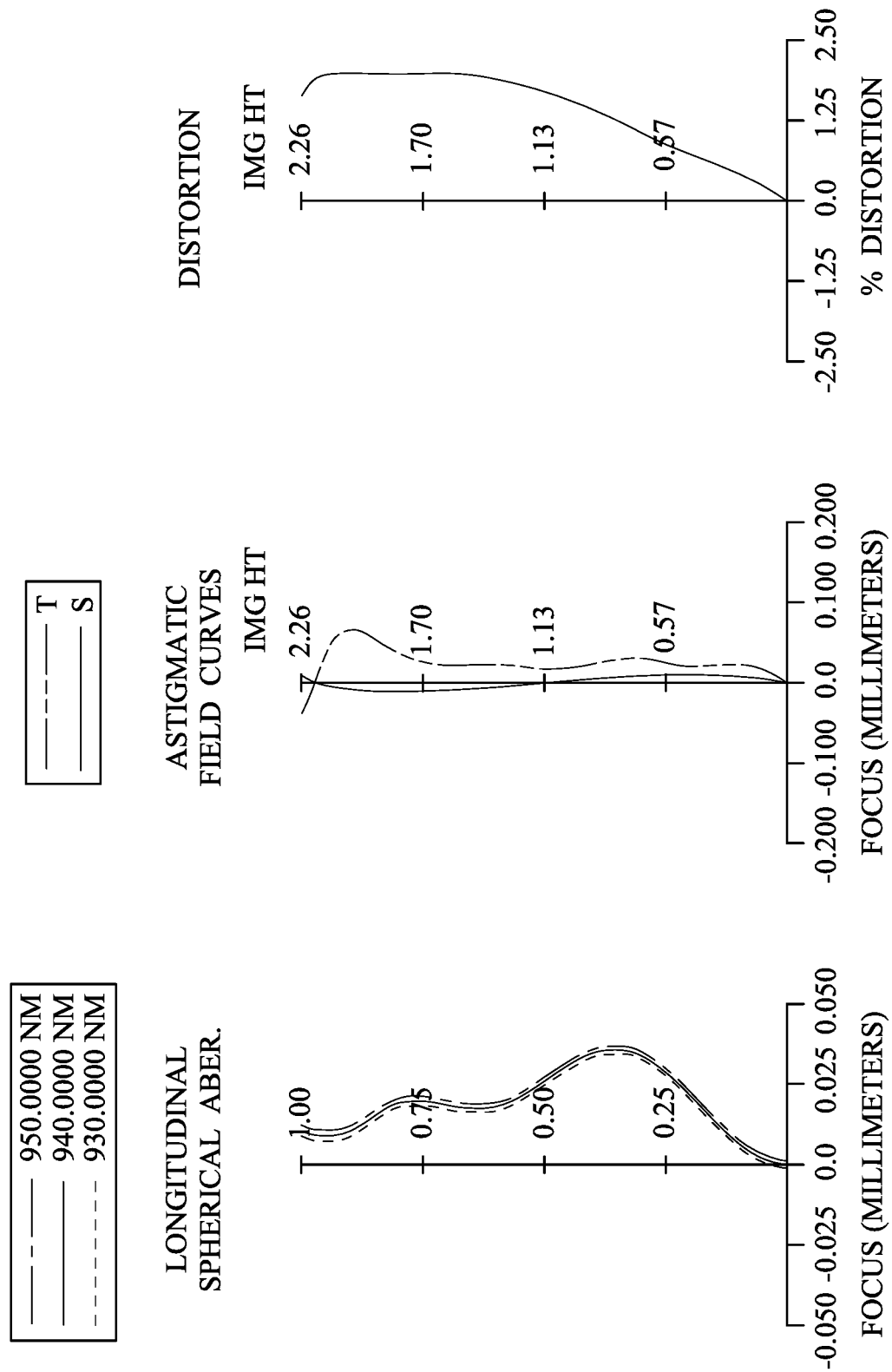
FIG. 22 shows spherical aberration curves, astigmatic field curves and a distortion curve of the electronic device according to the 11th embodiment.

FIG. 21 is a schematic view of an electronic device according to the 11th embodiment of the present disclosure. FIG. 22 shows spherical aberration curves, astigmatic field curves and a distortion curve of the electronic device according to the 11th embodiment. In FIG. 21, the electronic device includes an optical lens assembly (its reference numeral is omitted), wherein the optical lens assembly includes, in order from an outside to an inside, an aperture stop 1100, a first lens element 1110, a second lens element 1120, a third lens element 1130, a fourth lens element 1140, a filter 1150 and an inside conjugation surface 1160. The optical lens assembly includes four lens elements (1110, 1120, 1130 and 1140) without additional one or more lens elements inserted between the first lens element 1110 and the fourth lens element 1140.

The first lens element 1110 with positive refractive power has an outside surface 1111 being convex in a paraxial region thereof and an inside surface 1112 being concave in a paraxial region thereof. The first lens element 1110 is made of a plastic material, and has the outside surface 1111 and the inside surface 1112 being both aspheric.

The second lens element 1120 with positive refractive power has an outside surface 1121 being concave in a paraxial region thereof and an inside surface 1122 being convex in a paraxial region thereof. The second lens element 1120 is made of a plastic material, and has the outside surface 1121 and the inside surface 1122 being both aspheric.

The third lens element 1130 with positive refractive power has an outside surface 1131 being concave in a paraxial region thereof and an inside surface 1132 being convex in a paraxial region thereof. The third lens element 1130 is made of a plastic material, and has the outside surface 1131 and the inside surface 1132 being both aspheric.

The fourth lens element 1140 with negative refractive power has an outside surface 1141 being convex in a paraxial region thereof and an inside surface 1142 being concave in a paraxial region thereof. The fourth lens element 1140 is made of a plastic material, and has the outside surface 1141 and the inside surface 1142 being both aspheric. Furthermore, each of the outside surface 1141 and the inside surface 1142 of the fourth lens element 1140 includes at least one critical point in an off-axis region thereof.

The filter 1150 is made of a glass material and located between the fourth lens element 1140 and the inside conjugation surface 1160, and will not affect the focal length of the optical lens assembly.

The detailed optical data of the 11th embodiment are shown in Tables 21A and 21B, and the aspheric surface data are shown in Table 22 below.

TABLE 21A

11th Embodiment
f = 2.41 mm, Fno = 1.53, HFOV = 42.5 deg.

| Surface # | | Curvature Radius | Thickness | Material | Index | Abbe # | Focal Length |
|---|---|---|---|---|---|---|---|
| 0 | Outside conjugation surface | Plano | 600.000 | | | | |
| 1 | Ape. Stop | Plano | −0.257 | | | | |
| 2 | Lens 1 | 1.317 ASP | 0.513 | Plastic | 1.634 | 20.4 | 3.48 |
| 3 | | 2.778 ASP | 0.362 | | | | |
| 4 | Lens 2 | −28.731 ASP | 0.299 | Plastic | 1.634 | 20.4 | 11.77 |
| 5 | | −5.946 ASP | 0.243 | | | | |
| 6 | Lens 3 | −1.020 ASP | 0.487 | Plastic | 1.634 | 20.4 | 3.05 |
| 7 | | −0.791 ASP | 0.030 | | | | |
| 8 | Lens 4 | 1.381 ASP | 0.405 | Plastic | 1.634 | 20.4 | −4.42 |
| 9 | | 0.820 ASP | 0.500 | | | | |
| 10 | Filter | Plano | 0.300 | Glass | 1.508 | 64.2 | — |
| 11 | | Plano | 0.350 | | | | |
| 12 | Inside conjugation surface | Plano | — | | | | |

Reference wavelength is 940.0 nm.
Effective radius of Surface 5 is 0.820 mm.

TABLE 21B

11th Embodiment
fd = 2.31 mm

| Surface # | | Index | Focal Length |
|---|---|---|---|
| 0 | Outside conjugation surface | | |
| 1 | Ape. Stop | | |
| 2 | Lens 1 | 1.660 | 3.33 |
| 3 | | | |
| 4 | Lens 2 | 1.660 | 11.30 |
| 5 | | | |
| 6 | Lens 3 | 1.660 | 2.90 |
| 7 | | | |
| 8 | Lens 4 | 1.660 | −4.29 |
| 9 | | | |
| 10 | Filter | 1.517 | — |
| 11 | | | |
| 12 | Inside conjugation surface | | |

Reference wavelength is 587.6 nm (d-line).

TABLE 22

Aspheric Coefficients

| | Surface # | | | |
|---|---|---|---|---|
| | 2 | 3 | 4 | 5 |
| k= | −1.0753E+00 | 9.7802E+00 | 6.3171E+01 | 3.7325E+00 |
| A4= | 5.4959E−02 | −3.9630E−02 | −3.6536E−01 | −1.9598E−01 |
| A6= | 1.0492E−01 | −4.5565E−01 | 5.7047E−01 | −5.6492E−01 |
| A8= | −1.9484E−01 | 1.0801E+00 | −7.7681E+00 | 1.0803E+00 |
| A10= | −2.6211E−01 | −1.3355E+00 | 3.6161E+01 | −2.0683E+00 |
| A12= | 1.2488E+00 | −4.6404E+00 | −1.0187E+02 | 2.6479E+00 |
| A14= | −1.1864E+00 | 1.1437E+01 | 1.4684E+02 | 5.8189E−01 |
| A16= | | −7.6701E+00 | −7.9522E+01 | −1.2110E+00 |

TABLE 22-continued

Aspheric Coefficients

| | 6 | 7 | 8 | 9 |
|---|---|---|---|---|
| k= | 1.1229E−01 | −6.3936E+00 | −7.0024E−01 | −5.1268E+00 |
| A4= | 3.3200E−01 | −1.0902E+00 | −5.8244E−01 | −2.4265E−01 |
| A6= | −1.0344E+00 | 3.3258E+00 | 5.5162E−01 | 2.1541E−01 |
| A8= | 7.8602E−01 | −8.3756E+00 | −3.7434E−01 | −1.4747E−01 |
| A10= | 3.5442E+00 | 1.3896E+01 | 1.6127E−01 | 6.6425E−02 |
| A12= | −3.5166E+00 | −1.2822E+01 | −4.1668E−02 | −1.9002E−02 |
| A14= | −2.0857E+00 | 6.0361E+00 | 5.9602E−03 | 3.0844E−03 |
| A16= | 2.6553E+00 | −1.1414E+00 | −3.6815E−04 | −2.1130E−04 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21A, Table 21B and Table 22 as the following values and satisfy the following conditions:

| 11th Embodiment | |
|---|---|
| f [mm] | 2.41 |
| Fno | 1.53 |
| HFOV [deg.] | 42.5 |
| Nd1 | 1.660 |
| Vd1 | 20.4 |
| Vd1/Vd2 | 1.00 |
| Vd1/Vd3 | 1.00 |
| Vd1/Vd4 | 1.00 |
| Vd2 | 20.4 |
| Vd3 | 20.4 |
| Vd4 | 20.4 |
| ΣVd | 81.6 |
| CT1/T12 | 1.42 |
| CT2/CT4 | 0.74 |
| TD [mm] | 2.34 |
| TL/IH | 1.54 |
| R1/R2 | 0.47 |
| R2/R7 | 2.01 |
| R2/fd | 1.20 |
| R8/fd | 0.36 |
| fd/fd3 | 0.80 |
| \|fd/fd3\| + \|fd/fd4\| | 1.33 |
| max(\|fd/fd3\|, \|fd/fd4\|) | 0.80 |
| (\|1/fd1\| + \|1/fd2\|)/(\|1/fd3\| + \|1/fd4\|) | 0.67 |
| SL/TL | 0.93 |

12th Embodiment

Figure 23:
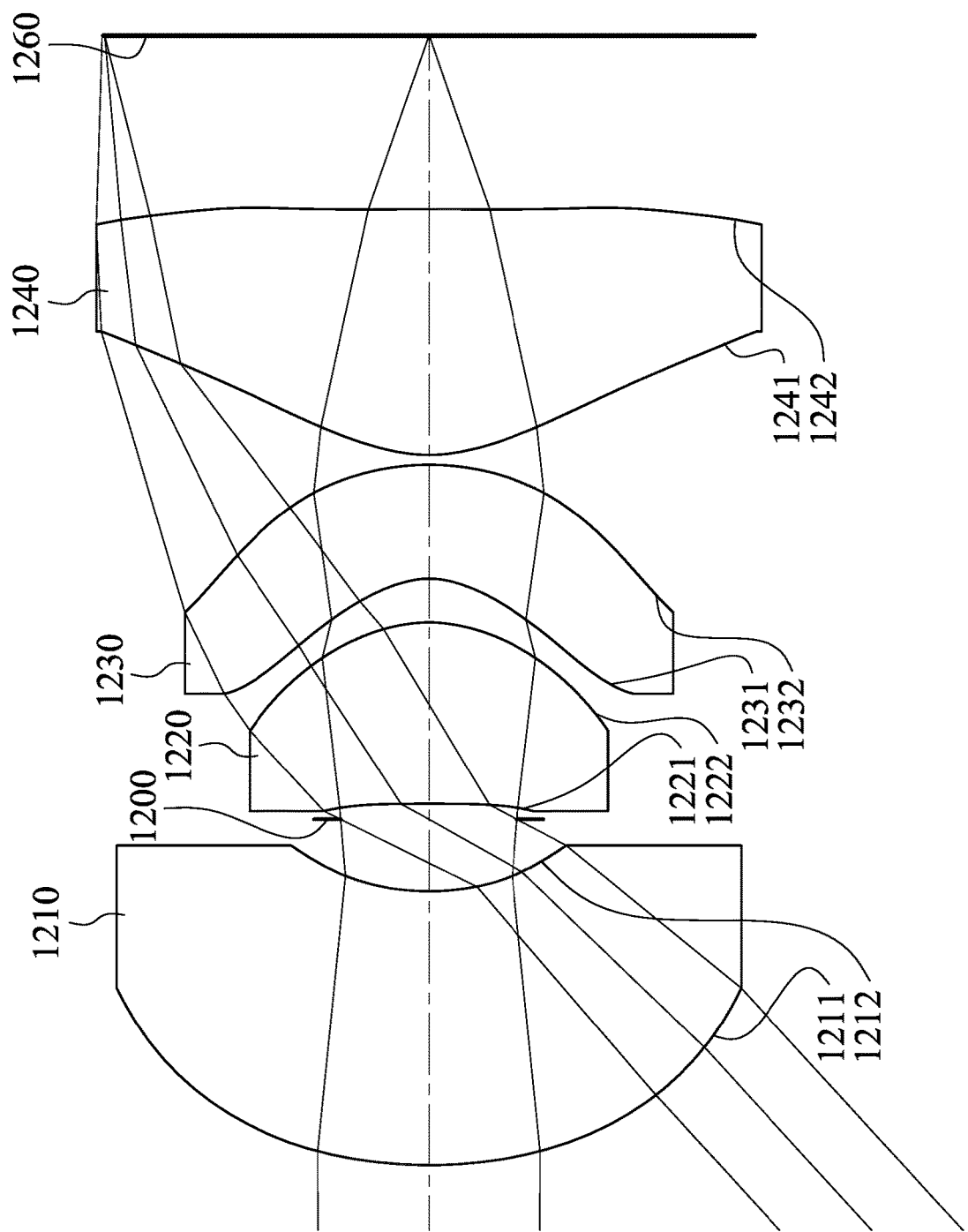
FIG. 23 is a schematic view of an electronic device according to the 12th embodiment of the present disclosure.
Figure 24:
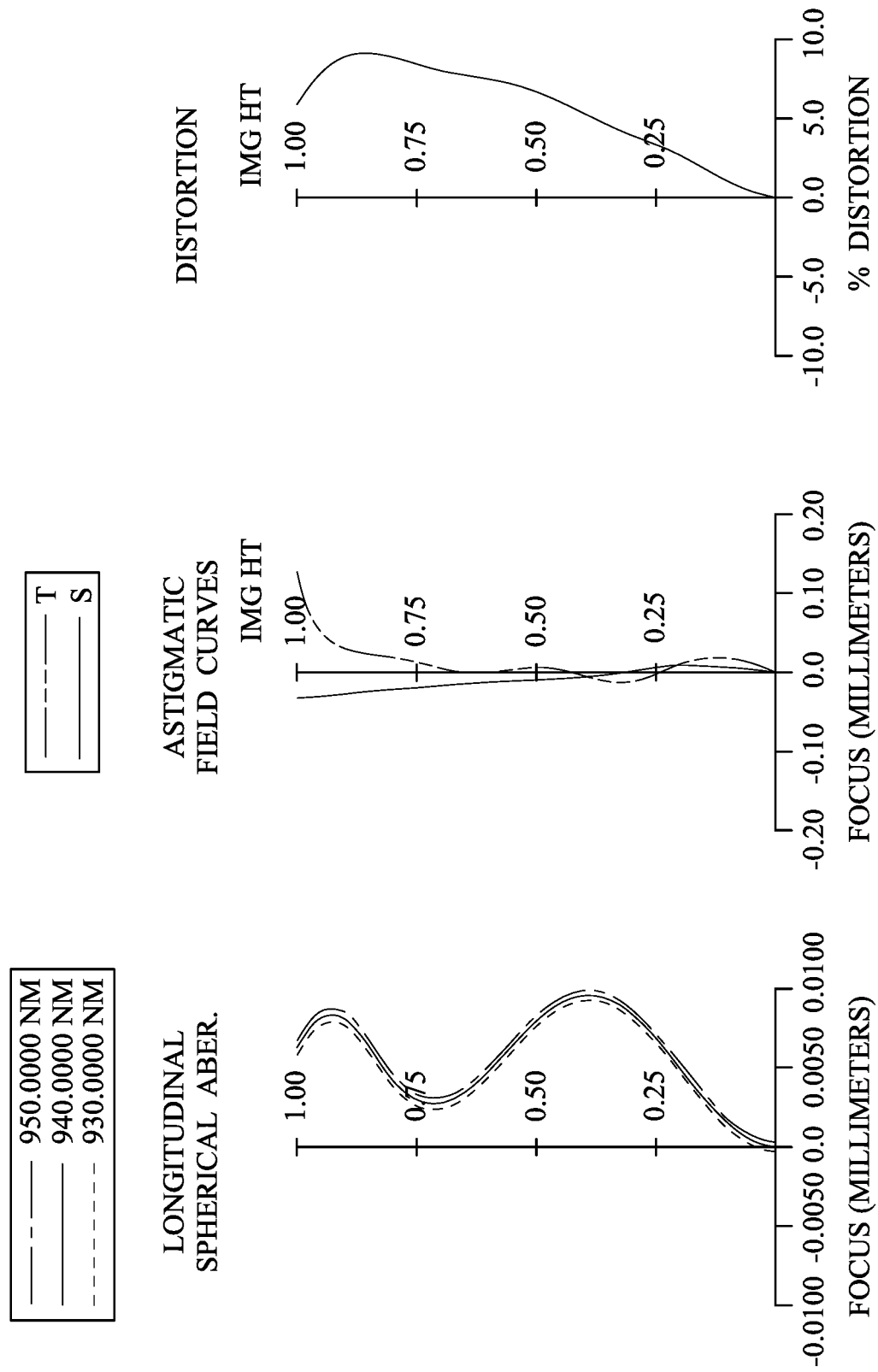
FIG. 24 shows spherical aberration curves, astigmatic field curves and a distortion curve of the electronic device according to the 12th embodiment.

FIG. 23 is a schematic view of an electronic device according to the 12th embodiment of the present disclosure. FIG. 24 shows spherical aberration curves, astigmatic field curves and a distortion curve of the electronic device according to the 12th embodiment. In FIG. 23, the electronic device includes an optical lens assembly (its reference numeral is omitted), wherein the optical lens assembly includes, in order from an outside to an inside, a first lens element 1210, an aperture stop 1200, a second lens element 1220, a third lens element 1230, a fourth lens element 1240 and an inside conjugation surface 1260. The optical lens assembly includes four lens elements (1210, 1220, 1230 and 1240) without additional one or more lens elements inserted between the first lens element 1210 and the fourth lens element 1240.

The first lens element 1210 with negative refractive power has an outside surface 1211 being convex in a paraxial region thereof and an inside surface 1212 being concave in a paraxial region thereof. The first lens element 1210 is made of a plastic material, and has the outside surface 1211 and the inside surface 1212 being both aspheric.

The second lens element 1220 with positive refractive power has an outside surface 1221 being concave in a paraxial region thereof and an inside surface 1222 being convex in a paraxial region thereof. The second lens element 1220 is made of a plastic material, and has the outside surface 1221 and the inside surface 1222 being both aspheric.

The third lens element 1230 with negative refractive power has an outside surface 1231 being concave in a paraxial region thereof and an inside surface 1232 being convex in a paraxial region thereof. The third lens element 1230 is made of a plastic material, and has the outside surface 1231 and the inside surface 1232 being both aspheric.

The fourth lens element 1240 with positive refractive power has an outside surface 1241 being convex in a paraxial region thereof and an inside surface 1242 being convex in a paraxial region thereof. The fourth lens element 1240 is made of a plastic material, and has the outside surface 1241 and the inside surface 1242 being both aspheric. Furthermore, the inside surface 1242 of the fourth lens element 1240 includes at least one critical point in an off-axis region thereof.

The detailed optical data of the 12th embodiment are shown in Tables 23A and 23B, and the aspheric surface data are shown in Table 24 below.

TABLE 23A

12th Embodiment
f = 1.03 mm, Fno = 1.50, HFOV = 42.5 deg.

| Surface # | | Curvature Radius | | Thickness | Material | Index | Abbe # | Focal Length |
|---|---|---|---|---|---|---|---|---|
| 0 | Outside conjugation surface | Plano | | 600.000 | | | | |
| 1 | Lens 1 | 1.422 | ASP | 0.846 | Plastic | 1.618 | 22.5 | −5.27 |
| 2 | | 0.765 | ASP | 0.222 | | | | |
| 3 | Ape. Stop | Plano | | 0.049 | | | | |
| 4 | Lens 2 | −7.695 | ASP | 0.560 | Plastic | 1.618 | 22.5 | 0.78 |
| 5 | | −0.466 | ASP | 0.135 | | | | |
| 6 | Lens 3 | −0.271 | ASP | 0.353 | Plastic | 1.634 | 20.4 | −0.90 |
| 7 | | −0.776 | ASP | 0.030 | | | | |
| 8 | Lens 4 | 0.510 | ASP | 0.759 | Plastic | 1.535 | 56.0 | 0.93 |
| 9 | | −8.998 | ASP | 0.535 | | | | |
| 10 | Inside conjugation surface | Plano | | — | | | | |

Reference wavelength is 940.0 nm.

TABLE 23B

12th Embodiment
fd = 1.01 mm

| Surface # | | Index | Focal Length |
|---|---|---|---|
| 0 | Outside conjugation surface | | |
| 1 | Lens 1 | 1.642 | −5.19 |
| 2 | | | |
| 3 | Ape. Stop | | |
| 4 | Lens 2 | 1.642 | 0.75 |
| 5 | | | |
| 6 | Lens 3 | 1.660 | −0.87 |
| 7 | | | |

TABLE 23B-continued

| 12th Embodiment fd = 1.01 mm | | | |
|---|---|---|---|
| Surface # | | Index | Focal Length |
| 8 | Lens 4 | 1.544 | 0.91 |
| 9 | | | |
| 10 | Inside conjugation surface | | |

Reference wavelength is 587.6 nm (d-line).

TABLE 24

| Aspheric Coefficients | | | | |
|---|---|---|---|---|
| Surface # | | | | |
| | 1 | 2 | 4 | 5 |
| k= | −7.4869E+00 | −4.7587E−01 | 9.9000E+01 | −7.4153E−01 |
| A4= | 4.2236E−01 | 5.9226E−01 | −1.4291E+00 | 1.6574E+00 |
| A6= | −2.7562E−01 | 4.2114E+00 | 1.4924E+01 | −1.1222E+01 |
| A8= | 2.5050E−01 | −2.3869E+01 | −2.7186E+02 | 4.5152E+01 |
| A10= | | | 1.1921E+03 | −7.4246E+01 |
| A12= | | | | −1.0727E+02 |
| A14= | | | | 3.4937E+02 |
| Surface # | | | | |
| | 6 | 7 | 8 | 9 |
| k= | −2.5394E+00 | −4.5848E−01 | −5.3201E+00 | 3.5645E+01 |
| A4= | 4.5493E−01 | −2.2310E−01 | 5.9458E−01 | 6.1050E−01 |
| A6= | −1.7076E+01 | 5.2812E−01 | −2.3503E+00 | −1.1581E+00 |
| A8= | 1.0074E+02 | −1.0538E+01 | 3.6851E+00 | −2.1566E+00 |
| A10= | −2.4822E+02 | 4.2676E+01 | −2.6567E+00 | 9.2076E+00 |
| A12= | 3.0275E+02 | −6.4731E+01 | 7.2622E−01 | −1.1452E+01 |
| A14= | −1.5186E+02 | 3.6523E+01 | | 6.2329E+00 |
| A16= | | | | −1.2626E+00 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23A, Table 23B and Table 24 as the following values and satisfy the following conditions:

| 12th Embodiment | |
|---|---|
| f [mm] | 1.03 |
| Fno | 1.50 |
| HFOV [deg.] | 42.5 |
| Nd1 | 1.642 |
| Vd1 | 22.5 |
| Vd1/Vd2 | 1.00 |
| Vd1/Vd3 | 1.10 |
| Vd1/Vd4 | 0.40 |
| Vd2 | 22.5 |
| Vd3 | 20.4 |
| Vd4 | 56.0 |
| ΣVd | 121.4 |
| CT1/T12 | 3.12 |
| CT2/CT4 | 0.74 |
| TD [mm] | 2.95 |
| TL/IH | 3.49 |
| R1/R2 | 1.86 |
| R2/R7 | 1.50 |
| R2/fd | 0.75 |
| R8/fd | −8.87 |
| fd/fd3 | −1.16 |

| 12th Embodiment | |
|---|---|
| \|fd/fd3\| + \|fd/fd4\| | 2.27 |
| max(\|fd/fd3\|, \|fd/fd4\|) | 1.16 |
| (\|1/fd1\| + \|1/fd2\|)/(\|1/fd3\| + \|1/fd4\|) | 0.68 |
| SL/TL | 0.69 |

13th Embodiment

Figure 26A:
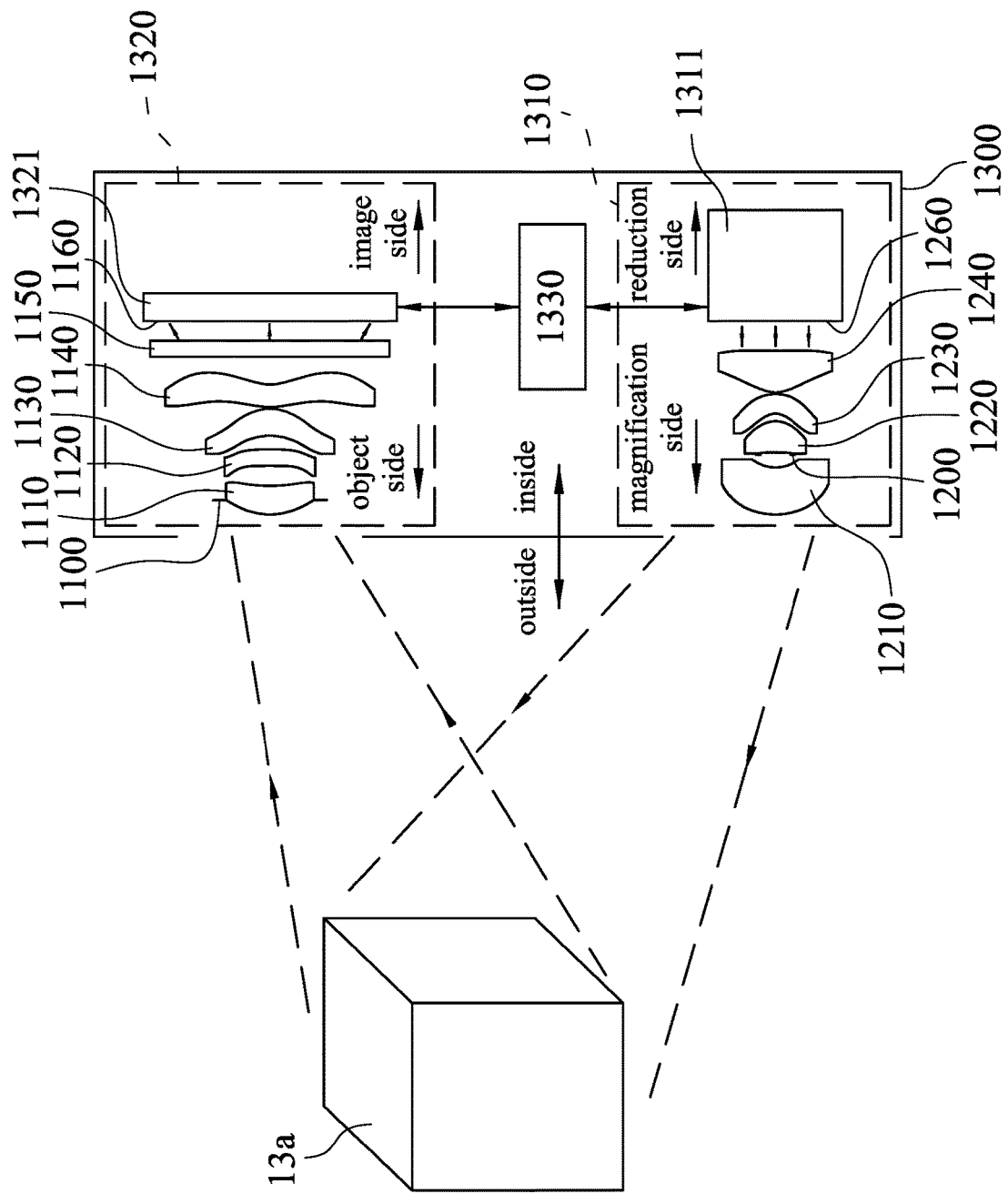
FIG. 26A is a schematic view of a sensing module of an electronic device according to the 13th embodiment of the present disclosure.
Figure 26C:
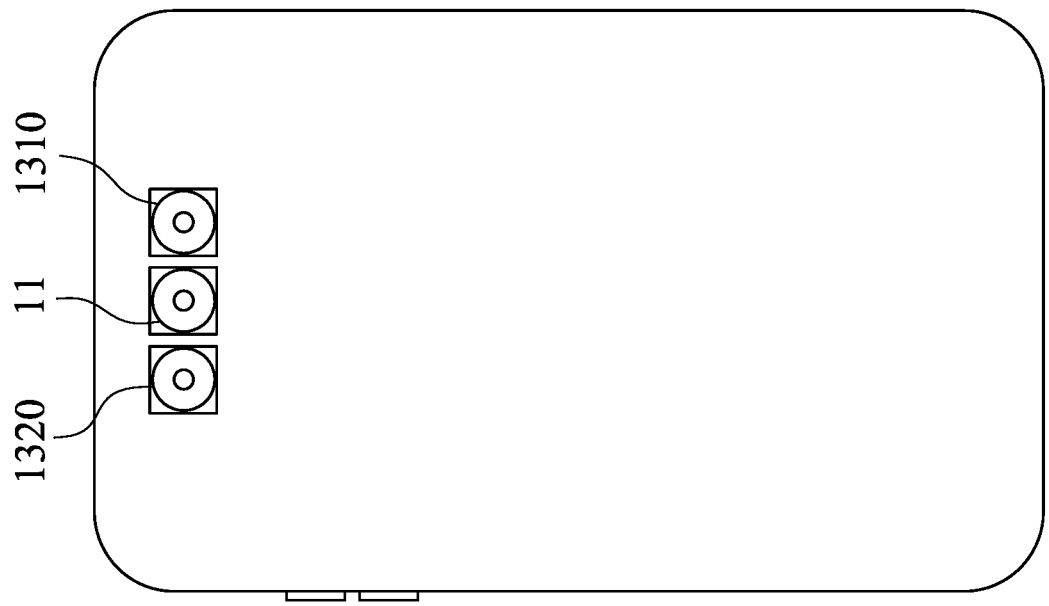
FIG. 26C is a schematic view of an appearance of the other side of the electronic device according to the 13th embodiment of the present disclosure.
Figure 26B:
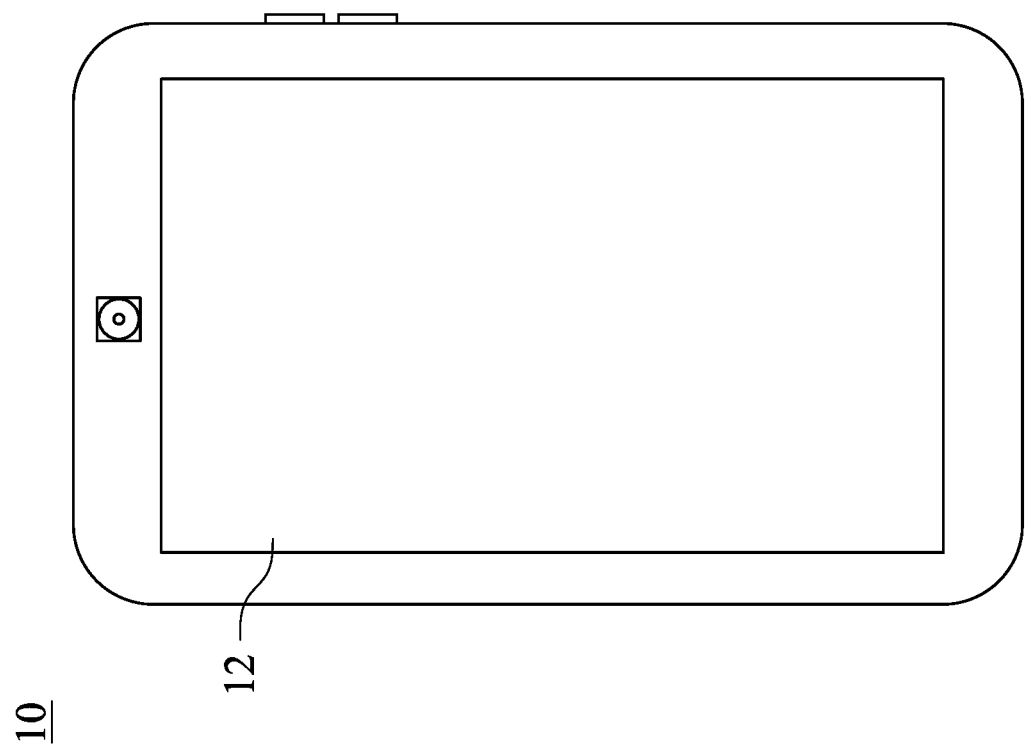
FIG. 26B is a schematic view of an appearance of one side of the electronic device according to the 13th embodiment of the present disclosure.

FIG. 26A is a schematic view of a sensing module 1300 of an electronic device 10 according to the 13th embodiment of the present disclosure. FIG. 26B is a schematic view of an appearance of one side of the electronic device 10 according to the 13th embodiment of the present disclosure. FIG. 26C is a schematic view of an appearance of the other side of the electronic device 10 according to the 13th embodiment of the present disclosure. In FIGS. 26A, 26B and 26C, the electronic device 10 according to the 13th embodiment is a tablet, which includes the sensing module 1300, an image capturing apparatus 11 and a display apparatus 12.

The sensing module 1300 includes a projection apparatus 1310, a receiving apparatus 1320 and a processor 1330, wherein the projection apparatus 1310 and the receiving apparatus 1320 are connected to the processor 1330. The projection apparatus 1310 includes the optical lens assembly (its reference numeral is omitted) according to the aforementioned 12th embodiment and at least one light source 1311, wherein the optical lens assembly includes, in order from an outside to an inside (that is, from a magnification side to a reduction side of the projection apparatus 1310), the first lens element 1210, the aperture stop 1200, the second lens element 1220, the third lens element 1230, the fourth lens element 1240 and the inside conjugation surface 1260, and the light source 1311 can be composed by a laser array, and can be vertical cavity surface emitting laser, which is disposed on the inside conjugation surface 1260 of the optical lens assembly. The receiving apparatus 1320 includes the optical lens assembly (its reference numeral is omitted) according to the aforementioned 11th embodiment and an image sensor 1321, wherein the optical lens assembly includes, in order from an outside to an inside (that is, from an object side to an image side of the receiving apparatus 1320), the aperture stop 1100, the first lens element 1110, the second lens element 1120, the third lens element 1130, the fourth lens element 1140, the filter 1150 and the inside conjugation surface 1160, and the image sensor 1321 is disposed on the inside conjugation surface 1160 of the optical lens assembly.

The light of the light source 1311 of the projection apparatus 1310 passes through the optical lens assembly thereof so as to form into a structured light and project on a sensed object 13a. The receiving apparatus 1320 receives the reflective light from the sensed object 13a, images on the image sensor 1321, and the received information can be calculated by the processor 1330 so as to obtain the relative distance of each portion of the sensed object 13a, further obtain the 3D-shaped variation on the surface of the sensed object 13a.

In the 13th embodiment, the projection apparatus 1310 and the receiving apparatus 1320 (including the optical lens assemblies, the light source 1311 and the image sensor 1321) can be applied to the infrared band (780 nm-1500 nm) so as to decrease the interference from the visible light and enhance the sensing precision. In the 13th embodiment, the projection apparatus 1310 and the receiving apparatus 1320 can be further applied to the narrow-band infrared (930 nm-950 nm) so as to decrease the noise interference.

The image capturing apparatus 11 includes the optical lens assembly (its reference numeral is omitted) according to the aforementioned 10th embodiment and an image sensor (its reference numeral is omitted) disposed on the inside conjugation surface 1060, wherein the image capturing apparatus 11 can be applied to the visible light (400 nm-700 nm).

The sensed object 13a can include the surrounding environment, the sensing module 1300 can be matched with the image capturing apparatus 11 and the display apparatus 12 so as to apply but not limited to the augmented reality function, so that users can interact with the surrounding environment.

Furthermore, in the 13th embodiment, the projection apparatus 1310 includes the optical lens assembly according to the aforementioned 12th embodiment and the receiving apparatus 1320 includes the optical lens assembly according to the aforementioned 11th embodiment, but the present disclosure will not be limited thereto. The projection apparatus 1310 and the receiving apparatus 1320 can include other optical lens assembly, such as, the projection apparatus 1310 can include the optical lens assembly according to the aforementioned 3rd embodiment, and the receiving apparatus 1320 can include the optical lens assembly according to the aforementioned 2nd embodiment, and will not detailed describe herein.

14th Embodiment

Figure 27A:
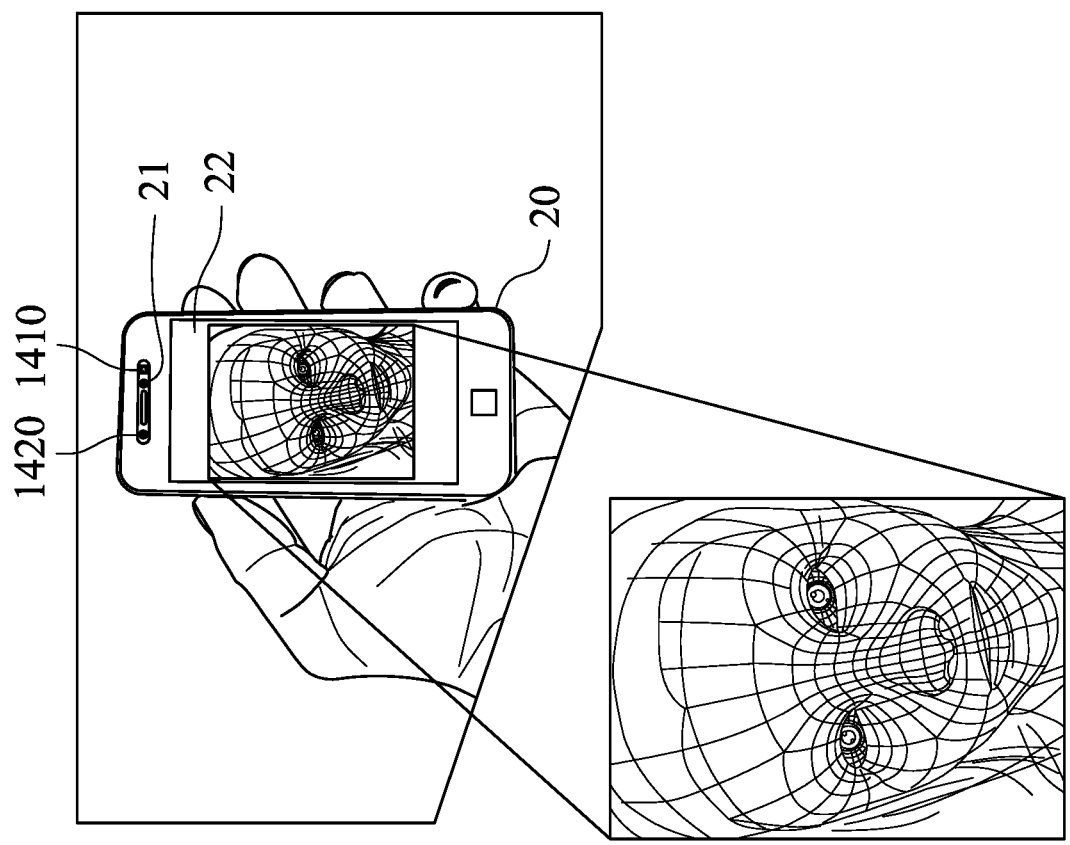
FIG. 27A is a schematic view of an appearance of the using state of an electronic device according to the 14th embodiment of the present disclosure.
Figure 27B:
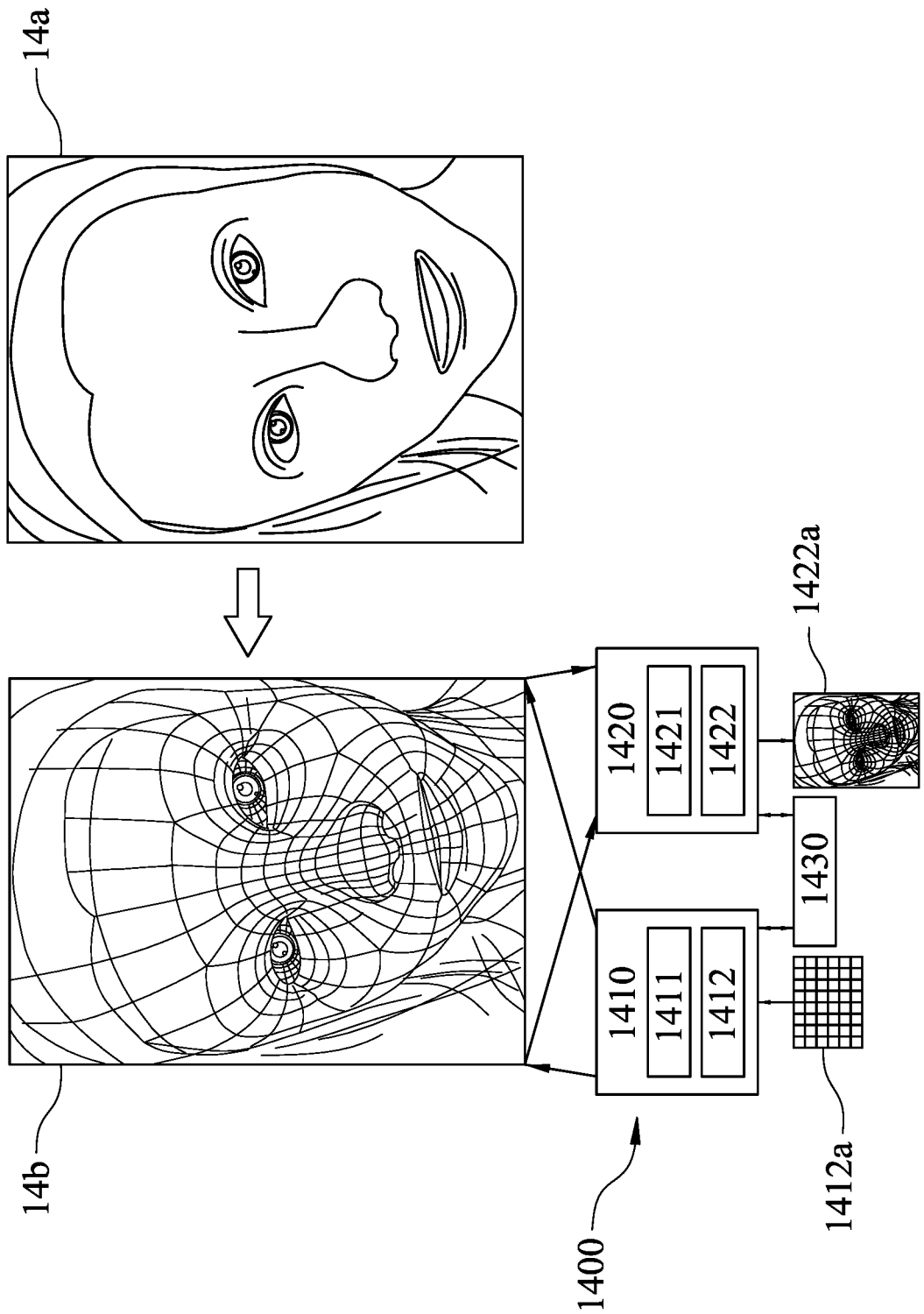
FIG. 27B is a schematic view of a sensing module of the electronic device according to the 14th embodiment of the present disclosure.

FIG. 27A is a schematic view of an appearance of the using state of an electronic device 20 according to the 14th embodiment of the present disclosure. FIG. 27B is a schematic view of a sensing module 1400 of the electronic device 20 according to the 14th embodiment of the present disclosure. According to the 14th embodiment, the electronic device 20 is a smartphone, which includes the sensing module 1400, an image capturing apparatus 21 and a display apparatus 22.

The sensing module 1400 includes a projection apparatus 1410, a receiving apparatus 1420 and a processor 1430, wherein the projection apparatus 1410 and the receiving apparatus 1420 are connected to the processor 1430. According to the 14th embodiment, the projection apparatus 1410 includes an optical lens assembly 1411 and a light source 1412, the receiving apparatus 1420 includes an optical lens assembly 1421 and an image sensor 1422, wherein the connecting relationship and functions of the projection apparatus 1410, the receiving apparatus 1420 and the processor 1430 can be the same with the projection apparatus 1310, the receiving apparatus 1320 and the processor 1330 stated in the 13th embodiment, and will not describe again herein.

The sensing module 1400 can be applied to face recognition function, in FIG. 27B, the light source 1412 can be composed by a laser array 1412a, which can form structured light with the optical lens assembly 1411 of the projection apparatus 1410, and project on an sensed object 14a, wherein the sensed object 14a is shown without an array image of projection, and the sensed object 14b is shown with an array image of projection. The optical lens assembly 1421 of the receiving apparatus 1420 receives the reflective light from the sensed object 14b, images on the image sensor 1422, and the received image 1422a can be calculated by the processor 1430 so as to obtain the relative distance of each portion of the sensed object 14b, further obtain the 3D-shaped variation on the surface of the sensed object 14b. Therefore, the security of the electronic device 20 in usage can be enhanced, but is not limited thereto. The image capturing apparatus 21 can be utilized to photographing, and can be matched to the sensing module 1400, wherein the obtained information of the receiving apparatus 1420 and the image capturing apparatus 21 can be shown on the display apparatus 22 after processing.

15th Embodiment

Figure 28:
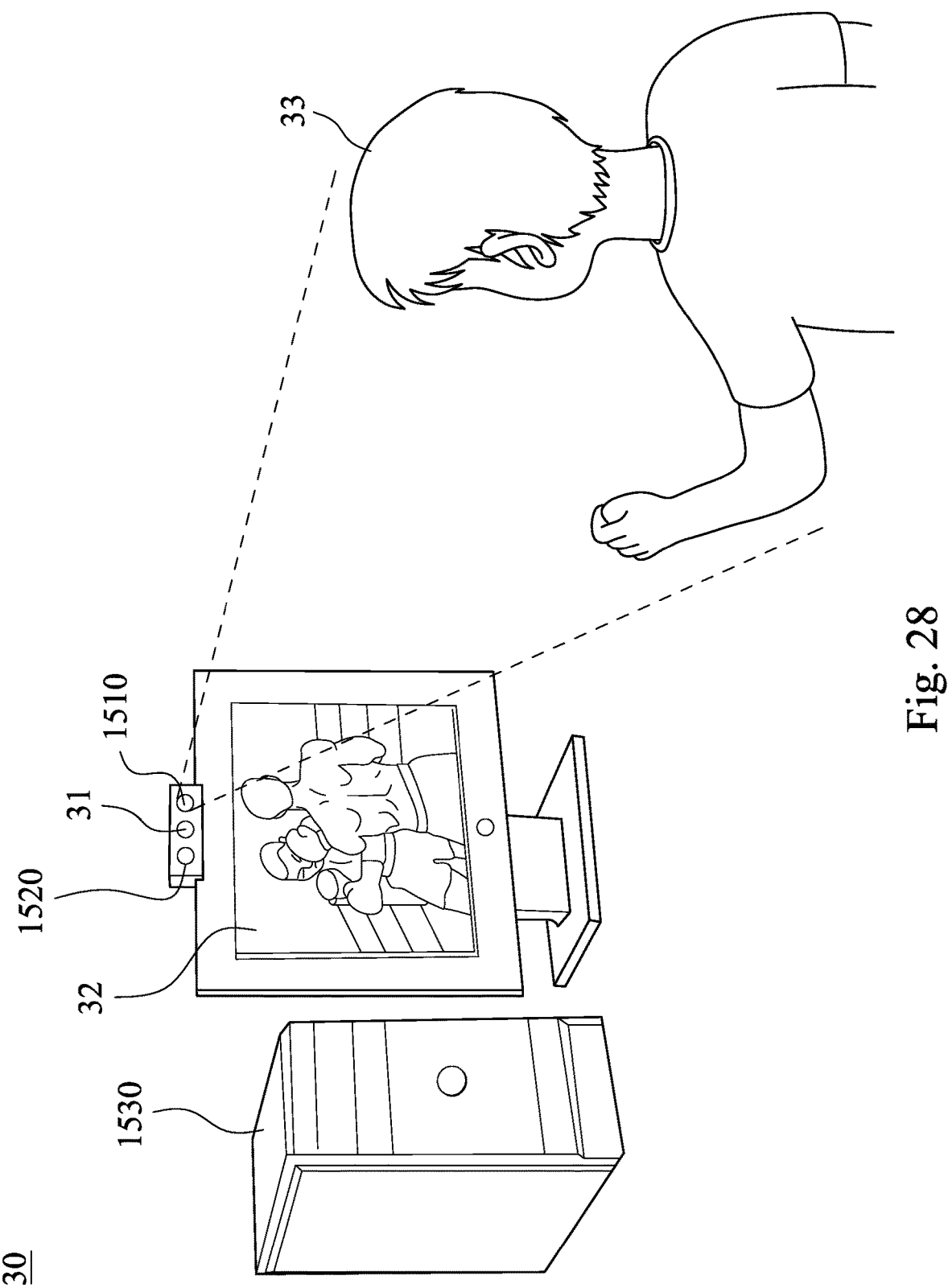
FIG. 28 is a schematic view of an electronic device according to the 15th embodiment of the present disclosure.

FIG. 28 is a schematic view of an electronic device 30 according to the 15th embodiment of the present disclosure. In the 15th embodiment, the electronic device 30 includes a sensing module (its reference numeral is omitted), an image capturing apparatus 31 and a display apparatus 32.

The sensing module includes a projection apparatus 1510, a receiving apparatus 1520 and a processor 1530, wherein the projection apparatus 1510 and the receiving apparatus 1520 are connected to the processor 1530. According to the 15th embodiment, the connecting relationship and functions of the projection apparatus 1510, the receiving apparatus 1520 and the processor 1530 can be the same with the projection apparatus 1310, the receiving apparatus 1320 and the processor 1330 stated in the 13th embodiment, and will not describe again herein.

According to the 15th embodiment, the sensing module can be utilized to capture the dynamic variation of the sensed object 33 so as to implement human-computer interaction, but is not limited thereto. The image capturing apparatus 31 can be utilized to photographing, and can be matched to the sensing module, wherein the obtained information of the receiving apparatus 1520 and the image capturing apparatus 31 can be shown on the display apparatus 32 after processing.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device, comprising at least one optical lens assembly, which comprises four lens elements, the four lens elements being in order from an outside to an inside:
   a first lens element having an outside surface being convex in a paraxial region thereof;
   a second lens element having an inside surface being convex in a paraxial region thereof;
   a third lens element; and
   a fourth lens element having an inside surface being concave in a paraxial region thereof, wherein at least one of an outside surface and the inside surface of the fourth lens element comprises at least one critical point in an off-axis region thereof;
   wherein, when a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, a focal length of the optical lens assembly is fd, a focal length of the third lens element is fd3, a focal length of the fourth lens element is fd4, a curvature radius of the outside surface of the first lens element is R1, a curvature radius of an inside surface of the first lens element is R2, and the following conditions are satisfied:

$0.65 < Vd1/Vd2 < 1.54$;

$0.65 < Vd1/Vd3 < 1.54$;

$0.65 < Vd1/Vd4 < 1.54$;

$10.0 < Vd1 < 38.0$;

$0.69 < |fd/fd3| + |fd/fd4|$; and $0.32 < R1/R2 < 1.64$.

2. The electronic device of claim 1, wherein when the measurement is made in accordance with the reference wavelength as the d-line, the Abbe number of the first lens element is Vd1, and the following condition is satisfied:

$12.0 < Vd1 < 34.0$.

3. The electronic device of claim 1, wherein when the measurement is made in accordance with the reference wavelength as the d-line, a sum of the Abbe numbers of the first lens element, the second lens element, the third lens element and the fourth lens element is ΣVd, and the following condition is satisfied:

$40.0 < \Sigma Vd < 155.0$.

4. The electronic device of claim 3, wherein when the measurement is made in accordance with the reference wavelength as the d-line, the sum of the abbe numbers of the first lens element, the second lens element, the third lens element and the fourth lens element is ΣVd, and the following condition is satisfied:

$45.0 < \Sigma Vd < 125.0$.

5. The electronic device of claim 1, wherein a central thickness of the second lens element is CT2, a central thickness of the fourth lens element is CT4, and the following condition is satisfied:

$0 < CT2/CT4 < 1.04$.

6. The electronic device of claim 1, wherein the curvature radius of the inside surface of the first lens element is R2, a curvature radius of the outside surface of the fourth lens element is R7, and the following condition is satisfied:

$0.25 < R2/R7 < 4.8$.

7. The electronic device of claim 1, wherein when the measurement is made in accordance with the reference wavelength as the d-line, the focal length of the optical lens assembly is fd, the focal length of the third lens element is fd3, the focal length of the fourth lens element is fd4, a maximum of two values of |fd/fd3| and |fd/fd4| is max(|fd/fd3|, |fd/fd4|), and the following condition is satisfied:

$0.43 < \max(|fd/fd3|, |fd/fd4|) < 2.7$.

8. The electronic device of claim 1, wherein when the measurement is made in accordance with the reference wavelength as the d-line, a focal length of the first lens element is fd1, a focal length of the second lens element is fd2, the focal length of the third lens element is fd3, the focal length of the fourth lens element is fd4, and the following condition is satisfied:

$0.38 < (|1/fd1| + |1/fd2|)/(|1/fd3| + |1/fd4|) < 1.5$.

9. The electronic device of claim 1, wherein an f-number of the optical lens assembly is Fno, a half of a maximum field of view of the optical lens assembly is HFOV, an axial distance between an outside surface of one of the lens elements closest to the outside and an inside surface of one of the lens elements closest to the inside is TD, an axial distance between the outside surface of the first lens element and an inside conjugation surface of the optical lens assembly is TL, a maximum radius of an optical effective region of the inside conjugation surface of the optical lens assembly is IH, and the following conditions are satisfied:

$1.0 < Fno < 2.3$;

5 degrees < HFOV < 50 degrees;

1 mm < TD < 5 mm; and $1.0 < TL/IH < 4.0$.

10. The electronic device of claim 1, wherein the first lens element has positive refractive power, and the second lens element has positive refractive power.

11. The electronic device of claim 10, wherein one of the third lens element and the fourth lens element has positive refractive power, the other one thereof has negative refractive power, and the inside surface of the fourth lens element comprises at least one critical point in an off-axis region thereof.

12. The electronic device of claim 1, wherein the first lens element has an inside surface being concave in a paraxial region thereof;
wherein the curvature radius of the inside surface of the first lens element is R2, when the measurement is made in accordance with the reference wavelength as the d-line, the focal length of the optical lens assembly is fd, and the following condition is satisfied:

$0 < R2/fd < 2.0$.

13. The electronic device of claim 1, wherein the second lens element has an outside surface being concave in a paraxial region thereof;
wherein a central thickness of the first lens element is CT1, an axial distance between the first lens element and the second lens element is T12, and the following condition is satisfied:

$0.80 < CT1/T12 < 3.5$.

14. The electronic device of claim 1, wherein the third lens element with positive refractive power has an inside surface being convex in a paraxial region thereof;
wherein, when the measurement is made in accordance with the reference wavelength as the d-line, the focal length of the optical lens assembly is fd, the focal length of the third lens element is fd3, and the following condition is satisfied:

$0 < fd/fd3 < 1.1$.

15. The electronic device of claim 1, wherein the third lens element has an outside surface being concave in a paraxial region thereof.

16. The electronic device of claim 1, wherein the outside surface of the fourth lens element is convex in a paraxial region thereof and comprises at least one critical point in an off-axis region thereof.

17. The electronic device of claim 1, wherein one of an outside surface and an inside surface of each of the first lens element, the second lens element, the third lens element and the fourth lens element is concave in a paraxial region thereof, and the other one thereof is convex in a paraxial region thereof.

18. The electronic device of claim 1, wherein the optical lens assembly further comprises an aperture stop disposed on an outside of the second lens element;
wherein an axial distance between the aperture stop and an inside conjugation surface of the optical lens assembly is SL, an axial distance between the outside surface of the first lens element and the inside conjugation surface of the optical lens assembly is TL, and the following condition is satisfied:

$0.70 < SL/TL < 1.1.$

19. The electronic device of claim 1, wherein the optical lens assembly is applied to an infrared band within a wavelength ranged from 780 nm to 1500 nm.

20. The electronic device of claim 1, further comprising:
a projection apparatus comprising the optical lens assembly and at least one light source, wherein the light source is disposed on an inside conjugation surface of the optical lens assembly.

21. The electronic device of claim 1, further comprising:
a receiving apparatus comprising the optical lens assembly and an image sensor, wherein the image sensor is disposed on an inside conjugation surface of the optical lens assembly.

22. The electronic device of claim 1, wherein a number of the optical lens assembly is at least two, and the electronic device further comprises:
a sensing module comprising:
a projection apparatus comprising one of the optical lens assemblies and at least one light source, wherein the light source is disposed on an inside conjugation surface of the optical lens assembly;
a receiving apparatus comprising another one of the optical lens assemblies and an image sensor, wherein the image sensor is disposed on an inside conjugation surface of the optical lens assembly;
wherein the light source of the projection apparatus is projected on a sensed object and is received by the receiving apparatus after a reflection, and is imaged on the image sensor.

23. An electronic device, comprising at least one optical lens assembly, which comprises four lens elements, the four lens elements being in order from an outside to an inside:
a first lens element;
a second lens element having an outside surface being concave in a paraxial region thereof and an inside surface being convex in a paraxial region thereof;
a third lens element having an outside surface being concave in a paraxial region thereof; and
a fourth lens element having an outside surface being convex in a paraxial region thereof and an inside surface being concave in a paraxial region thereof, wherein the outside surface of the fourth lens element comprises at least one critical point in an off-axis region thereof;
wherein at least one of the third lens element and the fourth lens element has positive refractive power, and the other one has negative refractive power;
wherein, when a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, a focal length of the optical lens assembly is fd, a focal length of the third lens element is fd3, a focal length of the fourth lens element is fd4, a curvature radius of an inside surface of the first lens element is R2, a curvature radius of the outside surface of the fourth lens element is R7, and the following conditions are satisfied:

$0.65 < Vd1/Vd2 < 1.54;$ $0.65 < Vd1/Vd3 < 1.54;$ $0.65 < Vd1/Vd4 < 1.54;$ $0.69 < |fd/fd3| + |fd/fd4| < 2.65;$ and $0.25 < R2/R7 < 4.8.$ 24. The electronic device of claim 23, wherein when the measurement is made in accordance with the reference wavelength as the d-line, a sum of the abbe numbers of the first lens element, the second lens element, the third lens element and the fourth lens element is ΣVd, and the following condition is satisfied:

$40.0 < \Sigma Vd < 155.0.$

25. The electronic device of claim 23, wherein a curvature radius of the inside surface of the fourth lens element is R8, when the measurement is made in accordance with the reference wavelength as the d-line, the focal length of the optical lens assembly is fd, and the following condition is satisfied:

$0 < R8/fd \leq 1.75.$

26. The electronic device of claim 23, wherein when the measurement is made in accordance with the reference wavelength as the d-line, the focal length of the optical lens assembly is fd, the focal length of the third lens element is fd3, the focal length of the fourth lens element is fd4, a maximum of two values of |fd/fd3| and |fd/fd4| is max(|fd/fd3|, |fd/fd4|), and the following condition is satisfied:

$0.53 < \max(|fd/fd3|, |fd/fd4|) < 1.8.$

* * * * *